(12) United States Patent
Inoue et al.

(10) Patent No.: US 7,722,056 B2
(45) Date of Patent: May 25, 2010

(54) DAMPING FORCE GENERATION SYSTEM AND VEHICLE SUSPENSION SYSTEM CONSTRUCTED BY INCLUDING THE SAME

(75) Inventors: Hirofumi Inoue, Toyota (JP); Takenari Yamaguchi, Toyota (JP); Takuhiro Kondo, Kani (JP)

(73) Assignees: Toyota Jidosha Kabushiki Kaisha, Toyota-shi (JP); Kayaba Industry Co., Ltd., Tokyo (JP)

( * ) Notice: Subject to any disclaimer, the term of this patent is extended or adjusted under 35 U.S.C. 154(b) by 204 days.

(21) Appl. No.: 11/911,407

(22) PCT Filed: Mar. 23, 2006

(86) PCT No.: PCT/JP2006/306609

§ 371 (c)(1),
(2), (4) Date: Oct. 12, 2007

(87) PCT Pub. No.: WO2006/112244

PCT Pub. Date: Oct. 26, 2006

(65) Prior Publication Data

US 2009/0079145 A1    Mar. 26, 2009

(30) Foreign Application Priority Data

Apr. 15, 2005   (JP)   .............................. 2005-118626

(51) Int. Cl.
*B60G 17/016* (2006.01)
(52) U.S. Cl. .............. 280/5.512; 280/5.514; 280/5.515; 280/6.154
(58) Field of Classification Search .................. 280/5.5, 280/5.507, 5.512, 5.514, 5.515, 5.519, 6.154
See application file for complete search history.

(56) References Cited

U.S. PATENT DOCUMENTS 4,776,437 A * 10/1988 Ishibashi et al. ......... 188/266.4

(Continued)

FOREIGN PATENT DOCUMENTS

DE      42 04 302 A1    8/1992

(Continued)

*Primary Examiner*—Toan C To
(74) *Attorney, Agent, or Firm*—Oblon, Spivak, McClelland, Maier & Neustadt, L.L.P.

(57) ABSTRACT

It is an object of the invention to improve the utility of an electromagnetic absorber system which is disposed in a suspension system of a vehicle and which generates a damping force by a generation force of a motor. The electromagnetic absorber system 18 is equipped with high-speed-motion responding means, thereby obviating an insufficiency of the damping force and a deterioration of the controllability in a high-speed stroke motion. More specifically, a hydraulic absorber 64 is provided in combination with the electromagnetic absorber system such that the hydraulic absorber 64 operates in the high-speed motion in which an electromotive force of the motor 68 exceeds a power source voltage Further, two motors having mutually different T-N characteristics are provided, and the two motors are selectively operated depending upon a stroke speed. Further, a variable resistor is interposed between the motor and the power source, and a resistance value of the variable resistor is increased in the high-speed motion to realize a decrease in a time constant of the motor, etc. Moreover, to cope with a large extent of unevenness of a road surface, an active stroke motion is performed by a drive force of the motor, thereby preventing the high-speed motion from being performed.

22 Claims, 33 Drawing Sheets

U.S. PATENT DOCUMENTS

| | | | | |
|---|---|---|---|---|
| 5,060,959 | A * | 10/1991 | Davis et al. | 280/5.514 |
| 5,360,089 | A * | 11/1994 | Nakamura et al. | 188/266.4 |
| 5,410,482 | A * | 4/1995 | Kimura et al. | 701/37 |
| 5,678,847 | A | 10/1997 | Izawa et al. | |
| 5,814,964 | A * | 9/1998 | Kimura | 318/685 |
| 5,818,193 | A * | 10/1998 | Sasaki | 318/685 |
| 5,983,150 | A * | 11/1999 | Sasaki | 701/48 |
| 6,507,778 | B2 * | 1/2003 | Koh | 701/37 |
| 6,598,885 | B2 * | 7/2003 | Delorenzis et al. | 280/5.507 |
| 7,005,816 | B2 * | 2/2006 | Hio et al. | 318/375 |
| 7,270,335 | B2 * | 9/2007 | Hio et al. | 280/5.5 |
| 2003/0075881 | A1 * | 4/2003 | Delorenzis et al. | 280/5.5 |
| 2004/0046335 | A1 | 3/2004 | Knox et al. | |
| 2004/0154886 | A1 * | 8/2004 | Hio et al. | 188/266 |
| 2007/0198149 | A1 * | 8/2007 | Nishioka et al. | 701/36 |
| 2008/0164111 | A1 * | 7/2008 | Inoue et al. | 188/297 |
| 2009/0121398 | A1 * | 5/2009 | Inoue | 267/140.14 |

FOREIGN PATENT DOCUMENTS

| | | |
|---|---|---|
| DE | 102 03 802 A1 | 10/2002 |
| JP | 4 126614 | 4/1992 |
| JP | 8 197931 | 8/1996 |
| JP | 3016260 | 3/2000 |
| JP | 2001 280417 | 10/2001 |
| JP | 2001 311452 | 11/2001 |
| JP | 2004 249976 | 9/2004 |
| JP | 2005 145119 | 6/2005 |
| JP | 2005 256887 | 9/2005 |
| JP | 2005 256888 | 9/2005 |
| JP | 2006 115558 | 4/2006 |

* cited by examiner

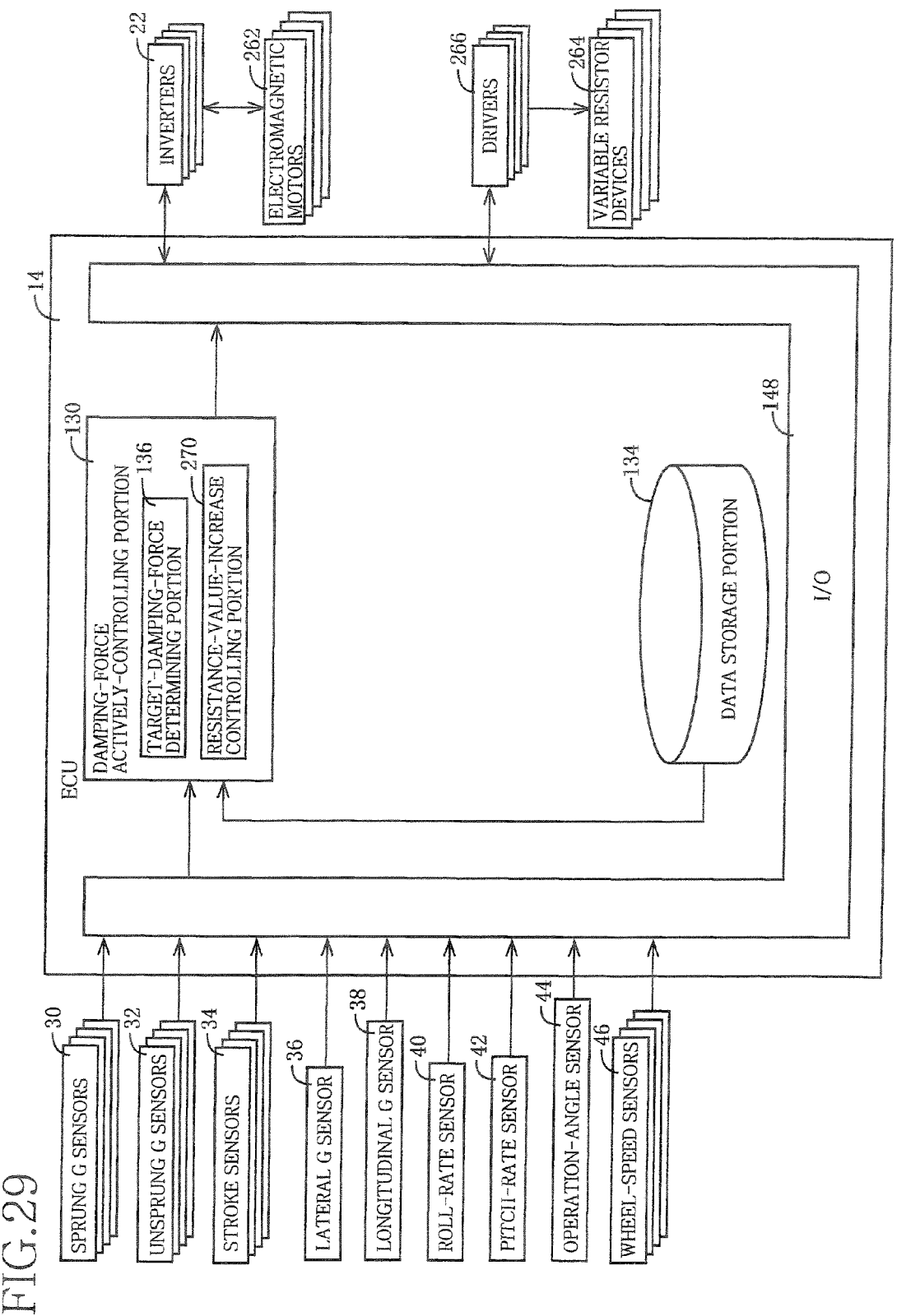

DAMPING FORCE GENERATION SYSTEM AND VEHICLE SUSPENSION SYSTEM CONSTRUCTED BY INCLUDING THE SAME

TECHNICAL FIELD

The present invention relates to a damping-force generating system which constitutes a suspension system for a vehicle and which generates a damping force with respect to a stroke motion in which a wheel and a body of the vehicle move toward and away from each other. In particular, the present invention relates to a damping-force generating system equipped with a damping-force generating device which generates a damping force that depends on a generation force generated by an electromagnetic motor and also relates to a suspension system for a vehicle constituted by including the damping-force generating system.

BACKGROUND ART

A conventional suspension system for a vehicle is equipped with a so-called hydraulic shock absorber by which is generated a damping force with respect to a motion of the wheel and the vehicle body toward and away from each other. Because such a motion can be considered to be a stroke motion of the wheel relative to the vehicle body, the motion will be hereinafter referred to as "stroke motion" where appropriate. Recently, in place of such a hydraulic damping-force generating device, there has been proposed a suspension system equipped with a damping-force generating device as disclosed in the following Patent Document, namely, a device configured to generate a damping force that depends on a generation force generated by an electromagnetic motor. Such a suspension system is a so-called electromagnetic suspension system (hereinafter abbreviated as "electromagnetic suspension" where appropriate). The electromagnetic suspension is configured to appropriately control the magnitude of the damping force by controlling the generation force of the electromagnetic motor. That is, the electromagnetic suspension is installed on the vehicle while utilizing good controllability of the electromagnetic suspension, thereby improving the ride comfort of the vehicle, the steering stability, and so on.

[Patent Document 1] JP-A-8-197931

DISCLOSURE OF THE INVENTION

(A) Summary of the Invention

The recently proposed electromagnetic suspension suffers from problems such as insufficiency of the damping force and deterioration of the controllability for controlling the damping force, in an instance where the stroke motion indicated above is performed at a high speed, namely, in an instance where a speed of the stroke motion (i.e., stroke speed) is inevitably high due to unevenness of the road surface, for instance. The above problems in the high-speed motion are just a few examples of problems experienced in the electromagnetic suspension. The electromagnetic suspension in the process of development suffers from various problems and has much room for improvement. The present invention has been made in the light of the situations described above. It is therefore an object of the invention to provide an electromagnetic suspension with high utility by resolving the problems experienced in the electromagnetic suspension and to provide a damping-force generating system for realizing the electromagnetic suspension system with high utility.

To achieve the object indicated above, a damping-force generating system according to the present invention constitutes a so-called electromagnetic suspension system and is characterized by comprising high-speed-motion responding means for responding to a high-speed stroke motion. A suspension system for a vehicle according to the present invention is characterized by comprising the damping-force generating system.

According to the present damping-force generating system equipped with the above-indicated high-speed-motion responding means, at least one of the problems which occur in the high-speed motion such as the insufficiency of the damping force and the deterioration of the controllability for controlling the damping force can be resolved or avoided, thereby improving the utility of the electromagnetic suspension system. Further, according to the present vehicle suspension system equipped with the above-indicated damping-force generating system, it is possible to realize the electromagnetic suspension with high utility.

(B) Forms of Claimable Invention

There will be described in detail various forms of an invention which is considered claimable (hereinafter referred to as "claimable invention" where appropriate). Each of the forms of the claimable invention is numbered like the appended claims and depends from the other form or forms, where appropriate, for easier understanding of the claimable invention. It is to be understood that the invention is not limited to the technical features or any combinations thereof which will be described, and shall be construed in the light of the following descriptions of the various forms and preferred embodiments of the claimable invention. It is to be further understood that a plurality of elements or features included in any one of the following forms of the claimable invention are not necessarily provided all together, and that any form in which one or more elements or one or more features is/are added to any one of the following forms and any form in which one or more elements or one or more features is/are deleted from any one of the following forms may be considered one form of the claimable invention. It is noted that the following forms (1)-(3) are forms as a presupposition of the claimable invention. Forms in which any of the forms (1)-(3) and any one or more of forms that follow the forms (1)-(3) are combined correspond to forms of the claimable invention.

A relationship between the following forms and the appended claims is as follows. The form (61) which depends from the form (1) corresponds to claim 1 in the CLAIMS. The form (62) which depends indirectly from the form (1) corresponds to claim 2. A form in which the technical features of the form (12) are added to claim 2 corresponds to claim 3. A form in which the technical features of the form (14) are added to claim 2 or 3 corresponds to claim 4. A form in which the technical features of the forms (15)-(18) are added to any one of claims 2-4 corresponds to claim 5. The form (63) which depends indirectly from the form (1) corresponds to claim 6. A form in which the technical features of the form (23) are added to claim 6 corresponds to claim 7. One kind of a form in which the technical features of the form (24) are added to claim 6 corresponds to claim 8. A form in which the technical features of the form (25) are added to any one of claims 6-8 corresponds to claim 9. A form in which the technical features of the forms (26) and (27) are added to claim 9 corresponds to claim 10. A form in which the technical features of the form (28) are added to claim 9 or 10 corresponds to claim 11. A form in which the technical features of the form (29) are added to any one of claims 9-11 corresponds to claim 12. A form in which the technical features of the form (30) are added to any one of claims 6-12 corresponds to claim 13. A form in which the technical features of the form (31) are added to claim 13 corresponds to claim 14. A form in which the technical features of the form (32) are added to claim 14 corresponds to claim 15. The form (64) which depends indirectly from the form (1) corresponds to claim 16. A form in which the technical features of the form (43) are added to claim 16 corresponds to claim 17. A form in which the technical features of the form (44) are added to claim 17 corresponds to claim 18. The form (65) which depends indirectly from the form (1) corresponds to claim 19. A form in which the technical features of the form (53) are added to claim 19 corresponds to claim 20. A form in which the technical features of the form (54) are added to claim 19 or 20 corresponds to claim 21. A form in which the technical features of the form (55) are added to one of any of claims 19-21 corresponds to claim 22. A form in which the technical features of the form (2) are added to any one of claims 1-22 corresponds to claim 23. A part of the form (71) corresponds to claim 24.

(1) A damping-force generating system which constitutes a part of a suspension system for a vehicle and which generates a damping force with respect to a stroke motion in which a wheel and a body of the vehicle move toward and away from each other, the damping-force generating system comprising:

a damping-force generating device which has an electromagnetic motor that operates depending upon the stroke motion and which generates the damping force that depends on a generation force generated by the electromagnetic motor.

As explained above, the above form (1) is a form as the presupposition of the claimable invention in which constituent elements are listed. The "damping-force generating device" in the form (1) may be called a so-called electromagnetic absorber device. A concrete mechanism of the damping-force generating device is not particularly limited, provided that the damping-force generating device is equipped with an electromagnetic motor as a source for the damping force and the motor is operable depending upon the stroke motion. For instance, there may be used a damping-force generating device that employs a screw mechanism explained below or other known mechanisms. The electromagnetic motor in the form (1) is not particularly limited, but there may be employed any types of motor such as a DC brushless motor, an induction motor, a synchronous motor, a stepping motor and a reluctance motor. As to the operation of the motor, the motor may be a rotation motor configured to output a force by rotation of a motor shaft as an output shaft or a linear motor configured such that a movable element or mover linearly operates. The damping-force generating device is not limited to the one configured to generate only the damping force, namely, the one configured to generate a force with respect to only a stroke motion caused by an external input (hereinafter referred to as "passive stroke motion" or "passive motion" where appropriate). For instance, the damping-force generating device may be configured to permit, owing to its own force, a positive stroke motion of the wheel and the vehicle body (hereinafter referred to as "active stroke motion" or "active motion" where appropriate).

(2) The damping-force generating system according to the above form (1), further comprising:

a rod member which is disposed on one of the wheel and the body of the vehicle such that the rod member is immovable in a direction of the stroke motion and on which an external thread is formed; and a nut member which is disposed on the other of the wheel and the body of the vehicle such that the nut member is immovable in the direction of the stroke motion and on which is formed an internal thread that engages the external thread, wherein the rod member and the nut member are movable relative to each other in a direction in which the rod member extends while rotating relative to each other in association with the stroke motion, and wherein the electromagnetic motor is configured to give a counter force that counters relative rotation of the rod member and the nut member.

The above form (2) employs an electromagnetic absorber device utilizing a so-called screw mechanism. In the form (2), where the above-indicated electromagnetic motor is the rotation motor, it is possible to easily convert a rotational force of the motor into a damping force with respect to the stroke motion, namely, into a damping force with respect to a linear motion. As the screw mechanism, a ball screw mechanism is preferably employed from the viewpoint of minimizing a frictional force.

(3) The damping-force generating system according to the above form (1) or (2), wherein, where the damping-force generating device is a first damping-force generating device which generates a first damping force as the damping force, the damping-force generating system further comprises a second damping-force generating device which generates a second damping force as the damping force that is different from the first damping force.

The above form (3) employs, in addition to the above-indicated electromagnetic absorber device, another absorber device. In the form (3), the damping force generated by the electromagnetic absorber device as the first damping-force generating device can be supplemented with a damping force generated by another absorber device as the second damping-force generating device. Accordingly, the damping-force generating system according to the form (3) can be constituted to offer various advantages such as a sufficiency of the damping force, a size reduction of the first damping-force generating device, and good controllability of the damping force of the system as a whole. The form (3) can employ, as the second damping-force generating device, various known absorber devices such as an absorber device utilizing an action of a liquid (hereinafter referred to as "hydraulic absorber device" where appropriate) and an electromagnetic absorber device which will be described.

(11) The damping-force generating system according to the above form (3), the second damping-force generating device is configured to generate the second damping force that depends on an action of a liquid.

In the above form (11), the so-called hydraulic absorber device is employable as the second damping-force generating device. As the hydraulic absorber device, there may be employed a conventional hydraulic absorber device of a cylinder type explained below or a device configured to generate a damping force which arises from a frictional force of a high-viscous liquid. More specifically described, such a device includes a housing in which the high-viscous liquid is filled and a disc, a propeller, etc., disposed in the housing so as to rotate in association with the stroke motion and is configured to generate the damping force owing to a frictional resistance of the liquid with respect to the rotation of the disc, etc.

(12) The damping-force generating system according to the above form (11), wherein the second damping-force generating device includes: a cylinder which is filled with a working fluid; a piston which is disposed in the cylinder to divide an interior of the cylinder and which moves relative to the cylinder in association with the stroke motion; and a fluid passage capable of giving a resistance to the fluid passing therethrough in association with the stroke motion, the second damping-force generating device generating the second damping force that depends on the resistance of the fluid passing through the fluid passage.

In the above form (12), the absorber of the cylinder type, namely, the so-called conventional hydraulic absorber, is employed as the above-indicated hydraulic absorber device. Where the conventional hydraulic absorber is employed, the fluid passage is constituted so as to include a portion that functions as a so-called orifice, for instance, and the damping force can be generated owing to the resistance of the fluid passing through the orifice portion. In this instance, the second damping-force generating device according to the form (12) may be configured to give a resistance to an inflow and an outflow of the working fluid or liquid between the two chambers in the cylinder divided by the piston, may be configured to provide, in addition to the two chambers in the cylinder, a buffer chamber that is held in fluid communication with one of the two chambers and configured to give a resistance to an inflow and an outflow of the fluid between the above-indicated one chamber and the buffer chamber, or may be configured to give a resistance to both of: the inflow and the outflow of the fluid between the two chambers; and the inflow and the outflow of the fluid between the above-indicated one chamber and the buffer chamber.

(13) The damping-force generating system according to the above form (11) or (12), wherein the second damping-force generating device is configured to generate the second damping force at least when a stroke speed which is a speed of the stroke motion is a speed at which an electromotive force generated in the electromagnetic motor exceeds a power source voltage.

In the above form (13), the second damping-force generating device generates a damping force at least when the speed of the stroke motion (hereinafter referred to as "stroke speed" where appropriate) exceeds a preset speed. The preset speed corresponds to a speed at which an electromotive force (e.g., emf) generated in the electromagnetic motor of the first damping-force generating device, more specifically, an electromotive force generated in the electromagnetic motor by the passive motion (i.e., a counter-electromotive force), is equal to a voltage of a power source which supplies an electric power to the motor. Such a speed is referred to as "emf•source-voltage equalized speed" where appropriate.

In the active motion, the electromagnetic motor of the electromagnetic absorber device generates a drive force owing to an electric power supplied from a suitable power source. On the other hand, in the passive motion, the motor is operated by the stroke motion. However, by utilizing the operational force of the motor generated by the electric power from the power source as a counter force against the stroke motion, it is possible to generate a damping force. Further, by controlling the electric power from the power source, the magnitude of the damping force can be controlled. Such an operational form is represented by a concept of "plugging (plugging braking)". In a case where the motor is operated in association with the passive motion, the damping force with respect to the passive motion can be generated by generating an electromotive force in the motor. By controlling the magnitude of the electromotive force, a time period during which the electromotive force is generated, etc., the damping force can be controlled. Such an operational form is represented by a concept of "short-circuiting braking", a concept of "shockless braking", or a concept of "regenerative braking". However, in the passive motion, when the damping force is generated and controlled by the operational form under the plugging or the regenerative braking, etc., the following problem may arise. That is, where the electromotive force generated in the motor exceeds the voltage of the power source for the motor, more specifically, where the voltage of the electromotive force normally exceeds the source voltage (except for a case in which the electromotive force momentarily and temporarily exceeds the source voltage such as a case of a surge voltage), the damping force cannot be controlled as desired. The form (13) described above is for coping with such a problem. According to the form (13), even in the passive motion in which the stroke speed exceeds the above-indicated emf•source-voltage equalized speed, the damping force can be sufficiently generated by the present system owing to the damping force generated by the hydraulic absorber device as the second damping-force generating device. That is, the form (13) solves the problem such as the deterioration of the controllability for controlling the damping force in the high-speed motion, thereby realizing the damping-force generating system with high utility.

The form (13) may be configured to generate the second damping force only when the stroke speed exceeds the emf•source-voltage equalized speed or to generate the second damping force also when the stroke speed is not higher than emf•source-voltage equalized speed. In the latter case, the second damping force generated when the stroke speed exceeds the emf•source-voltage equalized speed is preferably made larger than that when the stroke speed does not exceed the emf•source-voltage equalized speed, for instance. The form (13) may be arranged as a form which will be explained, namely, a form in which the second damping force is generated or increased under a control by a certain control device. Alternatively, the form (13) may be arranged as a form in which the second damping force is generated or increased owing to the mechanical structure of the second damping-force generating device, instead of the control by the control device described above.

(14) The damping-force generating system according to the above form (13), wherein the second damping-force generating device is configured such that, when the stroke speed is the speed at which the electromotive force generated in the electromagnetic motor exceeds the power source voltage, a gradient of increase in the second damping force with respect to an increase in the stroke speed is made larger than that when the stroke speed is a speed at which the electromotive force does not exceed the power source voltage.

The above form (14) includes a form in which a speed•damping-force characteristic relating to the second damping force, i.e., a characteristic of the magnitude of the damping forced relative to the stroke speed, is made as a characteristic in which the damping force abruptly rises to a certain extent when the stroke speed exceeds the emf•source-voltage equalized speed. Where the second damping-force generating device is constructed to have such a characteristic, it is possible to realize the damping-force generating system assuring sufficiently good controllability in the high-speed motion.

(15) The damping-force generating system according to any one of the above forms (11)-(14), wherein the second damping-force generating device includes a second-damping-force increasing mechanism which increases the second damping force owing to an action thereof.

According to the form (15), the second damping force generated by the second damping-force generating device is changeable at the same stroke speed. The second-damping-force increasing mechanism is not specifically limited in its structure. Where the above-indicated hydraulic absorber is employed as the second damping-force generating device, for instance, the second-damping-force increasing mechanism may be realized by a structure in which a cross sectional area of a fluid passage, more specifically, a cross sectional area of a portion of the fluid passage functioning as an orifice, is changeable. Where the above-indicated device utilizing the frictional resistance of the fluid is employed as the second damping-force generating device, the second-damping-force increasing mechanism may be realized by a structure in which a magnetorheological fluid (MR fluid), an electrorheological fluid (ER fluid) or the like is used as the working fluid and the viscosity of the fluid is changeable.

(16) The damping-force generating system according to the above form (15), further comprising a damping-force-increasing-mechanism controlling device which controls the action of the second-damping-force increasing mechanism on the basis of a stroke speed which is a speed of the stroke motion.

According to the form (16), the action of the second-damping-force increasing mechanism is controlled based on the stroke speed, whereby the second damping force is controlled. The form (16) may be configured to change continuously or in steps the effect of increasing the second damping force by the second-damping-force increasing mechanism in accordance with an increase in the stroke speed.

(17) The damping-force generating system according to the above form (16), wherein the damping-force-increasing-mechanism controlling device is configured to control the second-damping-force increasing mechanism to act when the stroke speed exceeds a preset speed.

The above form (17) includes a form in which the second-damping-force-increasing-mechanism controlling device is configured to control the second-damping-force increasing mechanism to act when the stroke speed exceeds a preset speed, in such a way that the second damping force generated at the same stroke speed is made larger when the stroke speed exceeds the preset speed than when the stroke speed does not exceed the preset speed.

(18) The damping-force generating system according to the above form (17), wherein the preset speed is determined on the basis of the stroke speed at which an electromotive force generated in the electromagnetic motor is equal to a power source voltage.

In the above form (18), the preset speed is determined on the basis of the above-indicated emf•source-voltage equalized speed. The form (18) includes a form wherein the preset speed is determined to be equal to the above-indicated emf•source-voltage equalized speed and the second-damping-force-increasing-mechanism controlling device is configured to control the second-damping-force increasing mechanism to act when the stroke speed exceeds the emf•source-voltage equalized speed. The form (18) effectively eliminates or prevents the deterioration of the controllability for controlling the damping force in the high-speed motion.

(21) The damping-force generating system according to the above form (3), wherein, where the electromagnetic motor is a first motor, the second damping-force generating device includes a second motor which is an electromagnetic motor different from the first motor and is configured to generate, as the second damping force, a damping force that depends on a generation force generated by the second motor.

In the above form (21), there is employed, as the second damping-force generating device for generating the second damping force, an electromagnetic absorber device configured to generate a damping force on the same principle as in the first damping-force generating device. The damping-force characteristics of the respective two electromagnetic absorber devices are made different from each other, whereby it is possible to construct the damping-force generating system offering a wide range of variations and various advantages.

(22) The damping-force generating system according to the above form (21), wherein the second damping-force generating device is configured such that, when a stroke speed that is a speed of the stroke motion is low, the second damping force which can be generated is made smaller than the first damping force which can be generated and such that, when the stroke speed is high, the second damping force which can be generated is made larger than the first damping force which can be generated.

The above form (22) is one arrangement of a form in which the speed•damping-force characteristics, i.e., the characteristics of the damping force to be generated relative to the stroke speed, in the respective first damping-force generating device and second damping-force generating device are made different from each other. Explained more specifically, the first damping-force generating device is configured to generate a large damping force when the stroke speed is comparatively low whereas the second damping-force generating device is configured to generate a large damping force when the stroke speed is comparatively high.

Generally, in the electromagnetic motor, an operational speed range in which the motor can generate a large force is limited. The operational speed range is a rotational speed range in which a large rotational torque is generated in a case where the motor is a rotation motor. Accordingly, where it is desired to cover a wide operational speed range by one electromagnetic absorber device, a relatively large-sized electromagnetic motor needs to be employed, inevitably increasing the size of the damping-force generating device. The above form (22) takes such situations into consideration. In the form (22), by using two electromagnetic absorber devices each using a motor having a relatively small size, for instance, a sufficient damping force is obtained over a wide range of the stroke speed. In the form (22), because it may be considered that the second damping-force generating device compensates a decrease in the damping force by the first damping-force generating device when the stroke speed is high, the form (22) is effective to prevent or eliminate the insufficiency of the damping force in the high-speed motion, whereby the damping-force generating system with high utility can be realized.

(23) The damping-force generating system according to the above form (21) or (22), wherein the first damping-force generating device and the second damping-force generating device are configured such that the first motor and the second motor operate at the same operational speed for the same stroke speed, and wherein the first motor and the second motor are configured such that, when a stroke speed that is a speed of the stroke motion is low, the generation force of the first motor which can be generated is made larger than the generation force of the second motor which can be generated and such that, when the stroke speed is high, the generation force of the second motor which can be generated is made larger than the generation force of the first motor which can be generated.

The above form (23) is one arrangement of the form wherein the speed•damping-force characteristics of the respective two electromagnetic absorber devices are made different from each other and speed•output characteristics of the respective two motors, i.e., output characteristics of the respective two motors relative to the operational speed thereof, are made different from each other. In short, there are combined, in the above form (23), a high speed motor in which a large output is obtained in a relatively high-speed motion (e.g., a high rotation motor where the motor is the rotation motor) and a low speed motor in which a large output is obtained in a relatively low-speed motion (e.g., a low rotation motor where the motor is the rotation motor). The form (23) is effective in a case where the reduction ratios of the respective decelerating mechanisms of the two damping-force generating devices are the same or substantially the same as each other, in a case where motor shafts of the respective two motors are common to each other, and so on.

(24) The damping-force generating system according to the above form (21) or (22), wherein the first damping-force generating device includes a first decelerator which decelerates an operational speed of the first motor down to the stroke speed and the second damping-force generating device includes a second decelerator which decelerates an operational speed of the second motor down to the stroke speed, the first decelerator and the second decelerator having mutually different reduction ratios.

The above form (24) is one arrangement of the form in which the speed•damping-force characteristics of the respective two electromagnetic absorber devices are made different from each other. More specifically described, the speed•damping-force characteristics are made different by making the reduction ratios of the respective decelerating mechanisms of the two absorber devices different from each other. The form (24) is effective in a case where the motors of the respective two electromagnetic absorber devices have the speed•output characteristics which are the same as or similar to each other. The above-described screw mechanism is a motive-force-converting mechanism for converting the rotational force into the linear force. That is, the screw mechanism is configured to control the rotational speed and the speed of the linear motion so as to have a predetermined ratio. Thus, the screw mechanism functions as a decelerating mechanism. Accordingly, in an arrangement that employs such a screw mechanism, it is possible to construct decelerating mechanisms having mutually different reduction ratios by changing the lead angle of the screw. In an arrangement which employs two motors that are identical in construction, for instance, where the first motor presents the characteristic of the low speed motor while the second motor presents the characteristic of the high speed motor, the reduction ratio of the first decelerating mechanism is made larger than that of the second decelerating mechanism. In this respect, the fact that the reduction ratio is large means that there exists a large speed difference between an input side and an output side of the decelerating mechanism.

(25) The damping-force generating system according to any one of the above forms (21)-(24), further comprising a motor-operation controlling device which controls operations of the first motor and the second motor.

In the above form (25), the operations of the motors of the respective two electromagnetic absorber devices are controlled by a suitable controlling device. Control forms effective when the speed•damping-force characteristics of the respective two absorber devices are made different from each other will be explained in the following forms.

(26) The damping-force generating system according to the above form (25), wherein the motor-operation controlling device includes a damping-force-equal-distribution controlling portion which controls the operations of the first motor and the second motor such that the first damping force and the second damping force are of the same magnitude.

The above form (26) is for executing a control in which the two damping-force generating devices bear the same magnitude of the damping force (hereinafter referred to as "damping-force-equal-distribution control where appropriate"). The form (26) is effective to eliminate or prevent one of the two damping-force generating devices from being overloaded, for instance.

(27) The damping-force generating system according to the above form (26), wherein the motor-operation controlling device includes a one-damping-force-increase controlling portion which controls the operations of the first motor and the second motor so as to increase the first damping force when a stroke speed that is a speed of the stroke motion is low and so as to increase the second damping force when the stroke speed is high, in a case where the damping force generated by the damping-force generating system is insufficient in a control of the operations of the first motor and the second motor in which the first damping force and the second damping force are of the same magnitude.

The above form (27) is for executing, when a necessary damping force cannot be obtained by the above-indicated damping-force-equal-distribution control, a control in which one of the first damping force and the second damping force is increased (hereinafter referred to as "one-damping-force-increasing control" where appropriate). In the form (27), the speed•damping-force characteristics of the respective damping-force generating devices are taken into account, and the damping force by any one of the two damping-force generating devices is selectively increased depending upon the stroke speed, thereby consequently assuring the damping force demanded of the present system. That is, the form (27) permits a control which makes full use of the speed•damping-force characteristics of the respective damping-force generating devices.

(28) The damping-force generating system according to one of the above forms (25)-(27), wherein the motor-operation controlling device includes a one-motor-non-electrifying controlling portion configured to control the second motor to be placed in a non-electrified state when a stroke speed that is a speed of the stroke motion is low and to control the first motor to be placed in the non-electrified state when the stroke speed is high.

In the above form (28), the speed•damping-force characteristics of the respective damping-force generating devices are taken into account, and only one of the damping-force generating devices is operated depending upon the stroke speed. As in the above form, there is executed a control which makes full use of the speed•damping-force characteristics of the damping-force generating devices. In a case where the motor is placed in the non-electrified state, the motor can be constructed to have a structure in which there is generated substantially no counter force that counters the stroke motion. The use of such a motor is effective to prevent a damping force generated by one of the damping-force generating devices whose motor is in the electrified state from being disturbed by the other of the damping-force generating devices whose motor is in the non-electrified state.

(29) The damping-force generating system according to any one of the above forms (25)-(28), wherein the motor-operation controlling device includes a one-motor-regenerative-operation controlling portion configured to control one of the first motor and the second motor to perform a regenerative operation.

The term "regenerative operation" used herein means an operation of the motor based on the principle of so-called "regenerative braking". By the regenerative operation of the motor, the electromotive force generated in the motor can be regenerated into the power source, thereby realizing a power-saving damping-force generating system. The above form (29) may be arranged to execute a control in which one of the first and the second motors exclusively performs the regenerative operation or to execute a control in which one of the first and the second motors performs, to the extent possible or preferentially, the regenerative operation. Such arrangements establish the power-saving system by a simple control.

(30) The damping-force generating system according to any one of the above forms (21)-(29), comprising: a rod member which is disposed on one of the wheel and the body of the vehicle such that the rod member is immovable in a direction of the stroke motion and rotatable and on which an external thread is formed; a nut member which is disposed on the other of the wheel and the body of the vehicle such that the nut member is immovable in the direction of the stroke motion and unrotatable and on which is formed an internal thread that engages the external thread, the rod member and the nut member being movable relative to each other in a direction in which the rod member extends while the rod member rotates in association with the stroke motion, wherein the first damping-force generating device is constituted by including the rod member, the nut member, and a mechanism of giving a counter force by which the first motor counters rotation of the rod member and the second damping-force generating device is constituted by including the rod member, the nut member, and a mechanism of giving a counter force by which the second motor counters the rotation of the rod member.

The above form (30) corresponds to a form in which the above-described screw mechanism is employed in the form in which the damping-force generating system is equipped with the two electromagnetic absorbers. According to the form (30), the first and the second damping-force generating devices are constituted by one screw mechanism and two electromagnetic motors, so that the damping-force generating system with a simple structure is realized.

(31) The damping-force generating system according to the above form (30), wherein each of the first motor and the second motor is a rotation motor and the rod member functions as a motor shaft of the first motor and as a motor shaft of the second motor.

In short, the above form (31) may be construed as a form in which the two motors are connected directly to the rod member that constitutes the screw mechanism. The form (31) realizes the damping-force generating system with a simplified structure.

(32) The damping-force generating system according to the above form (31), wherein a portion of the rod member functioning as the motor shaft of the second motor has a smaller diameter than a portion of the rod member functioning as the motor shaft of the first motor.

The high rotation motor tends to be rotated at a higher speed than the low rotation motor even when the same rotational torque is produced. Accordingly, the high rotation motor suffers from a large influence of inertia of the rod member as the motor shaft. The above form (32) takes this into consideration. In the form (32), the portion of the rod member functioning as the motor shaft of the second motor as the high rotation motor is made small, thereby decreasing the inertia in the second motor. As a result, it is possible to realize the damping-force generating system with good controllability.

(41) The damping-force generating system according to any one of the above forms (1)-(31), further comprising: a variable resistor device which is disposed between the electromagnetic motor and a power source thereof and which is controlled such that a resistance value is variable; and a resistor-device controlling device which controls the variable resistor device.

In the above form (41), the apparent or seeming time constant of the motor is changeable and the relationship between electromotive force generated in the motor and source voltage is changeable. With an increase in the resistance value of the variable resistor device, the apparent time constant of the motor decreases and a saturation characteristic is shifted to the range of the high-speed motion. In this instance, the damping-force generating device behaves as if it is equipped with the high speed motor. Further, the increase in the resistance value of the variable resistor device increases the stroke speed at which the electromotive force exceeds the source voltage, namely, the emf•source-voltage equalized speed can be shifted to the high-speed side, thereby enlarging the stroke speed range in which good damping-force control is executable. It is noted that the increase in the resistance value of the variable resistor device increases a consumption amount of the electric power by the resistor device, causing a power loss. When this is taken into consideration, the resistance value is preferably minimized.

(42) The damping-force generating system according to the above form (41), wherein the resistor-device controlling device includes a resistance-value-increase controlling portion configured to perform a control in which the resistance value of the variable resistor device when a stroke speed which is a speed of the stroke motion is high is made larger than that when the stroke speed is low.

The above form (42) takes account of the effect of increasing the resistance value as explained above. In the form (42), there is executed a control in which the resistance value of the variable resistor device is made large when the stroke speed is high. The form (42) is effective to eliminate or obviate various problems such as the deterioration of the controllability in the high-speed motion and the insufficiency of the damping force, thereby realizing the damping-force generating system with high utility. The form (42) may be configured to change the resistance value continuously or in steps in accordance with the stroke speed. The form (42) may be configured to increase the resistance value only when the stroke speed exceeds a prescribed speed.

(43) The damping-force generating system according to the above form (42), wherein the resistor-value-increase controlling portion is configured to perform a control in which the resistance value of the variable resistor device is increased when the stroke speed exceeds a preset speed In the above form (43), there is executed a control in which the resistance value is increased when the stroke speed exceeds a certain preset speed. Put another way, there is executed a control in which the resistance value is not increased until the stroke speed exceeds the preset speed. According to the form (43), the damping-force generating system can be configured to suffer from a minimum power loss.

(44) The damping-force generating system according to the above form (43), wherein the preset speed is determined on the basis of the stroke speed at which an electromotive force generated in the electromagnetic motor becomes equal to a power supply voltage.

In the form (44), the above-described preset speed is determined based on the emf•source-voltage equalized speed indicated above. The form (44) includes an arrangement wherein the preset speed is determined to be equal to the emf•source-voltage equalized speed and the resistance value of the variable resistor device is increased when the stroke speed exceeds the emf•source-voltage equalized speed. The form (44) eliminates or obviates various problems such as the deterioration of the controllability in the high-speed motion and the insufficiency of the damping force.

(51) The damping-force generating system according to one of the above forms (1)-(42), wherein the damping-force generating device is configured to perform an active stroke motion by driving the electromagnetic motor, the active stroke motion being the stroke motion by a drive force of the motor.

The above form (51) not only permits the electromagnetic absorber device to generate a damping force with respect to the stroke motion, but also permits the wheel and the vehicle body to positively move toward and away from each other by the drive force of the motor. The form (51) enables a roll amount of the vehicle body upon turning of the vehicle, a pitch amount of the vehicle body upon abrupt deceleration or abrupt acceleration, etc., to be positively suppressed. The form (51) further permits a stroke motion for responding to the unevenness of the road surface, a stroke motion in which the wheel follows the unevenness of the road surface, and the like, as explained below.

(52) The damping-force generating system according to the above form (51), further comprising: a road-surface-unevenness detecting device which is configured to detect an uneven condition of a road surface which the wheel passes; and an active-motion controlling device which is configured to control the damping-force generating device to perform the active stroke motion on the basis of the uneven condition of the road surface detected by the road-surface-unevenness detecting device.

The above form (52) permits the electromagnetic absorber device to perform the above-indicated active stroke motion (positive stroke motion) for responding to the unevenness of the road surface. The speed of the stroke motion due to the unevenness of the road surface tends to be relatively high. In particular when the degree of the unevenness is large, the speed of the stroke motion due to the unevenness of the road surface where the vehicle running speed is high is considerably high. In such a high-speed motion, the damping-force generating system constituted by the electromagnetic absorber device suffers from the insufficiency of the damping force explained above. In the form (52), to cope with the unevenness of the road surface, namely, to cope with the high-speed motion, the active stroke motion can be performed. The form (52) realizes the damping-force generating system with high utility. Specific controls are explained in detail in the following forms.

The "road-surface-unevenness detecting device" may be constructed as a device utilizing known techniques, and its detailed explanation is not given here. As the road-surface-unevenness detecting device, there may be employed a device constituted by including a detecting device such as a camera or a radar and a processing unit which is constituted principally by a computer, for instance, and which performs a suitable arithmetic processing and a suitable analyzing processing on data and information obtained by the detecting device.

(53) The damping-force generating system according to the above form (52), wherein the active-motion controlling device includes a concavity-responsive controlling portion which is configured to control the damping-force generating device to perform, on the basis of a concavity detected by the road-surface-unevenness detecting device, the active stroke motion for permitting the wheel and the body of the vehicle to move toward each other, before the wheel passes the concavity.

When the wheel passes the concavity of the road surface, the wheel performs a stroke motion in which the wheel moves away from the vehicle body (hereinafter referred to as "rebound motion" where appropriate). When the speed of the rebound motion is high, the ride comfort of the vehicle deteriorates due to interference of the wheel and a rebound stopper if the damping force is insufficient as described above. The above form (53) takes this into consideration. In the form (53), there is performed, prior to passing the concavity, a motion in which the wheel and the vehicle body move toward each other (hereinafter referred to as "bound motion" where appropriate) as the active stroke motion, in order to obtain a rebound stroke. In short, the form (53) may be considered as a preventive measure to deal with the situation which occurs in the high-speed motion

(54) The damping-force generating system according to the above form (52) or (53), wherein the active-motion controlling device includes a convexity-responsive controlling portion which is configured to control the damping-force generating device to perform, on the basis of a convexity detected by the road-surface-unevenness detecting device, the active stroke motion for permitting the wheel and the body of the vehicle to move away from each other, before the wheel passes the convexity.

The above form (54) is for dealing with a situation that is contrary to the situation in the form (53). When the wheel passes the convexity of the road surface, the wheel performs the bound motion. When the speed of the bound motion is high, the ride comport of the vehicle deteriorates due to interference of the wheel with a bound stopper if the damping force is insufficient as described above. The above form (54) takes this into consideration. In the form (54), there is performed, prior to passing the convexity, an active rebound motion in order to obtain a bound stroke. In short, like the form (53), the form (54) may be considered as a preventive measure to deal with the situation which occurs in the high-speed motion.

(55) The damping-force generating system according to any one of the above forms (52)-(54), wherein the active-motion controlling device includes an unevenness-following controlling portion which is configured to control the damping-force generating device to perform the active stroke motion following the uneven condition of the road surface detected by the road-surface-unevenness detecting device.

According to the above form (55), the unevenness of the road surface can be positively dealt with according to the principle different from those in the preceding two forms. By moving the wheel upward and downward following the unevenness of the road surface, the vehicle body can be controlled to be placed into a sky-hook state or state close thereto, thereby stabilizing the posture of the vehicle body. Further, the ride comfort of the vehicle can be sufficiently improved.

(61) The damping-force generating system according to the above form (1), further comprising high-speed-motion responding means for responding to the stroke motion whose speed is high.

As explained above, the conventional electromagnetic suspension system equipped with the electromagnetic absorber device suffers from various problems such as the insufficiency of the damping force and the deterioration of the controllability for controlling the damping force when the speed of the stroke motion is high. In the light of this, the damping-force generating system is provided with the high-speed-motion responding means recited in the above form (61). According to the form (61), at least a part of the problems described above can be eliminated or obviated. Therefore, it is possible to enhance the utility of the electromagnetic suspension system. Specific arrangements of the high-speed-motion responding means are explained below.

(62) The damping-force generating system according to the above form (61), wherein, where the damping-force generating device is a first damping-force generating device which generates a first damping force as the damping force, the damping-force generating system comprises, as the high-speed-motion responding means, a second damping-force generating device which generates a second damping force as the damping force that is different from the first damping force and that depends on an action of a liquid at least when a stroke speed which is a speed of the stroke motion is a speed at which an electromotive force generated in the electromagnetic motor exceeds a power source voltage.

The above form (62) corresponds to a form in which the technical features described in the forms (3), (11), and (13) are added to the form (61). That is, in the form (62), the damping-force generating system is equipped with a hydraulic absorber device as the second damping-force generating device, and the damping force by the device is generated at least in the high-speed motion. The above-indicated high-speed-motion responding means is realized by the structure. Because an explanation as to the effect of the form (62) overlaps the explanation made in the above-indicated forms that constitute the form (62), the explanation as to the effect of the form (62) is not given here. It is noted that the technical features described in one or more of the forms (2), (12), and (14)-(18) may be added to the form (62).

(63) The damping-force generating system according to the above form (61), wherein, where the damping-force generating device is a first damping-force generating device which generates a first damping force as the damping force and which includes a first motor as the electromagnetic motor, the damping-force generating system comprises, as the high-speed-motion responding means, a second damping-force generating device which includes a second motor that is an electromagnetic motor different from the first motor, which is configured to generate, as the second damping force, a damping force that depends on the generation force generated by the second motor, and which is configured such that, when a stroke speed that is a speed of the stroke motion is low, the second damping force which can be generated is made smaller than the first damping force which can be generated and such that, when the stroke speed is high, the second damping force which can be generated is made larger than the first damping force which can be generated.

The above form (63) corresponds to a form in which the technical features described in the forms (3), (21), and (23) are added to the form (61). That is, in the form (63), the damping-force generating system is equipped with another electromagnetic absorber device as the second damping-force generating device, and the damping force by the device is made relatively small when the stroke speed is low while the damping force by the device is made relatively large when the stroke speed is high. The above-indicated high-speed-motion responding means is realized by the structure. Because an explanation as to the effect of the form (63) overlaps the explanation made in the above-indicated forms that constitute the form (63), the explanation as to the effect of the form (63) is not given here. It is noted that the technical features described in one or more of the forms (2) and (23)-(32) may be added to the form (63).

(64) The damping-force generating system according to the above form (61), comprising, as the high-speed-motion responding means, a variable resistor device which is disposed between the electromagnetic motor and a power source thereof and which is controlled such that a resistance value is variable; and a resistor-device controlling device which controls the variable resistor device and which includes a resistance-value-increase controlling portion configured to perform a control in which the resistance value of the variable resistor device when a stroke speed which is a speed of the stroke motion is high is made large.

The above form (64) corresponds to a form in which the technical features described in the forms (41) and (42) are added to the form (61). In the form (63), the above-indicated high-speed-motion responding means is constituted by including the variable resistor device and the resistor-device controlling device having the resistance-value-increase controlling portion. Because an explanation as to the effect of the form (64) overlaps the explanation made in the above-indicated forms that constitute the form (64), the explanation as to the effect of the form (64) is not given here. It is noted that the technical features described in the form (43) or the technical features described in both of the forms (43) and (44) may be added to the form (64).

(65) The damping-force generating system according to the above form (61),
wherein the damping-force generating device is configured to perform an active stroke motion by driving the electromagnetic motor, the active stroke motion being the stroke motion by a drive force of the motor, and
wherein the damping-force generating system comprises, as the high-speed-motion responding means, a road-surface-unevenness detecting device configured to detect an uneven condition of a road surface which the wheel passes and an active-motion controlling device which is configured to control the damping-force generating device to perform the active stroke motion on the basis of the uneven condition of the road surface detected by the road-surface-unevenness detecting device.

The above form (65) corresponds to a form in which the technical features described in the forms (51) and (52) are added to the form (61). In short, the high-speed-motion responding means is realized by a structure in which the active stroke motion is performed when the high-speed motion is anticipated, for instance. Because an explanation as to the effect of the form (65) overlaps the explanation made in the above-indicated forms that constitute the form (65), the explanation as to the effect of the form (65) is not given here. It is noted that the technical features described in one or more of the forms (53)-(55) may be added to the form (65).

(71) A suspension system for a vehicle constituted by comprising the damping-force generating system according to any one of the above forms (1)-(65).

In brief, the above form (71) relates to an electromagnetic suspension system equipped with the damping-force generating system described in the forms explained above. Where the damping-force generating system equipped with the high-speed-motion responding means is employed, it is possible to eliminate or obviate at least a part of the problems experienced in the high-speed motion such as the insufficiency of the damping force and the deterioration of the controllability for controlling the damping force, thereby realizing the electromagnetic suspension system with high utility.

BRIEF DESCRIPTION OF THE DRAWINGS

FIG. 29 is a block diagram relating to functions of an electronic control unit (ECU) of the damping-force generating system according to the third embodiment.

BEST MODE FOR CARRYING OUT THE INVENTION

Figure 1:
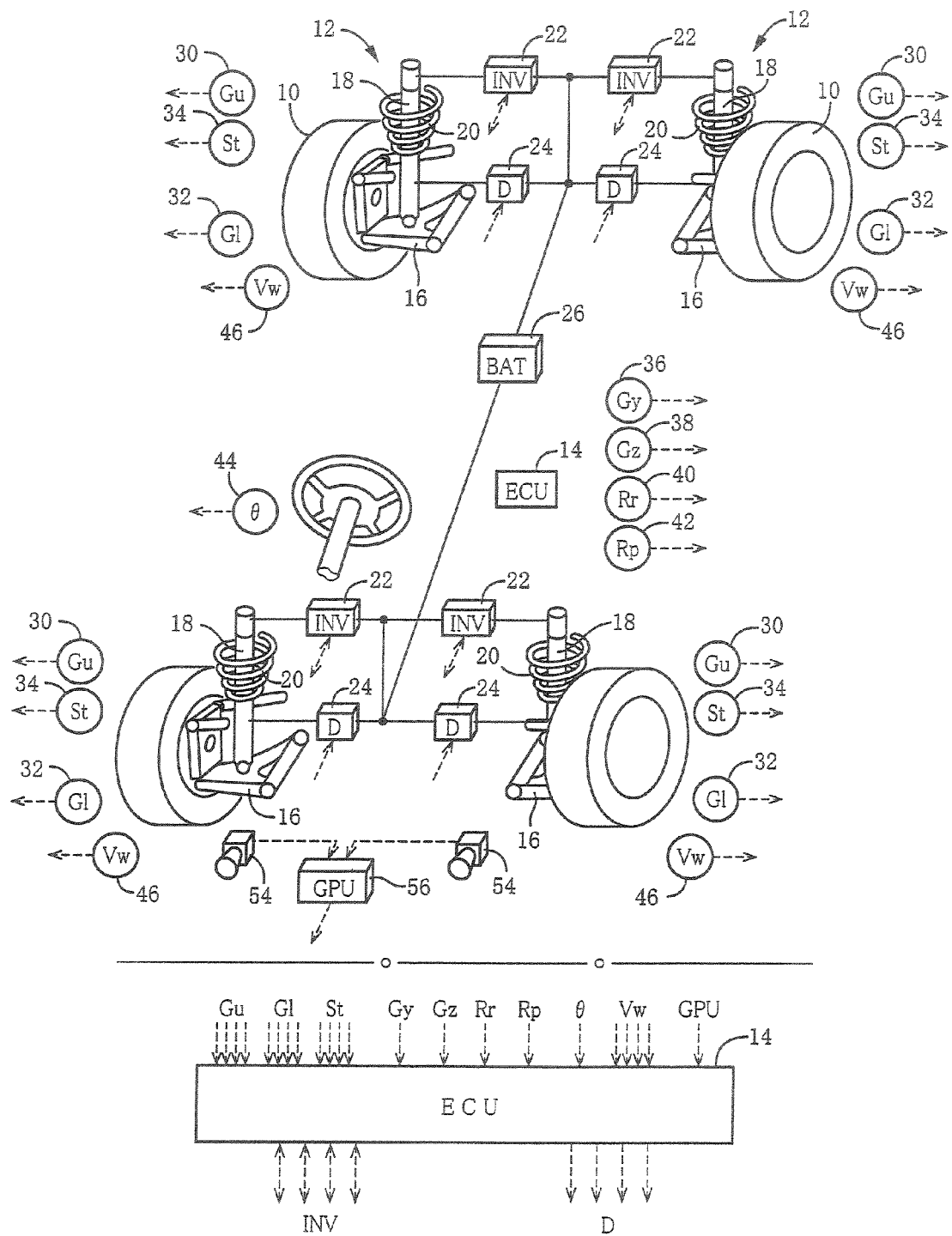
FIG. 1 is a schematic view illustrating an overall structure of a suspension system for a vehicle that employs a damping-force generating system according to a first embodiment of the claimable invention.

There will be described in detail some embodiments and modified examples thereof according to the claimable invention, referring to the drawings. It is to be understood, however, that the invention is not limited to the following embodiments but may be embodied with various changes and modifications, such as those described in the FORMS OF THE CLAIMABLE INVENTION, which may occur to those skilled in the art.

1. First Embodiment

The following first embodiment relates to a damping-force generating system which employs, as a first damping-force generating device, an electromagnetic absorber device that generates a damping force based on a force of an electromagnetic motor and which also employs, as a second damping-force generating device, a hydraulic absorber device that generates a damping force based on an action of a liquid.

i) Overall Structure of Suspension System

FIG. 1 schematically shows an overall structure of a suspension system for a vehicle in which is employed a damping-force generating system according to the first embodiment. The present suspension system is constituted by including four electromagnetic suspension apparatus 12 respectively for four wheels 10 (hereinafter simply referred to as "suspension apparatus 12") and a suspension electronic control device 14 (hereinafter simply referred to as "suspension ECU 14" or "ECU 14") as a control device for controlling each suspension apparatus 12. Each suspension apparatus 12 is of an ordinary independent suspension type and is constituted by including: an absorber 18 disposed between a lower arm 16 functioning as an unsprung member and a mount portion of a vehicle body functioning as a sprung member; and a suspension spring 20 which is a coil spring. As will be explained in detail, the absorber 18 includes an electromagnetic motor (hereinafter simply referred to as "motor" where appropriate) as a power source for generating a damping force, and an electromagnetic solenoid (hereinafter simply referred to as "solenoid" where appropriate). In the present suspension system, there are provided, for each suspension apparatus 12, an inverter 22 (indicated as "INV" in FIG. 1) as a drive circuit for the motor and a driver 24 (indicated as "D" in FIG. 1) as a drive circuit for the solenoid. The suspension system includes a battery 26 (indicated as "BAT" in FIG. 1) as a common power source for supplying an electric power to the motor and the solenoid via the inverter 22 and the driver 24 in each suspension apparatus 12. The motor and the solenoid in each suspension apparatus 12 are controlled by the ECU 14 via the inverter 22 and the driver 24, namely, the absorber 18 is controlled by the ECU 14, whereby each suspension apparatus 12 is controlled by the ECU 14. Thus, the damping-force generating system according to the present embodiment is constituted by including the absorbers 18, the inverters 22, the drivers 24 of the respective suspension apparatus 12, the ECU 14, the battery 26, etc.

The control of each suspension apparatus 12 by the ECU 14, specifically, the control of each absorber 18 by the ECU 14, is executed based on a running condition of the vehicle, a posture of the vehicle, etc. Accordingly, in the present suspension system, there are disposed, at various portions of the vehicle, various sensors for detecting the vehicle running condition, the vehicle posture, etc. The sensors are connected to the ECU 14. More specifically described, there are provided, for each suspension apparatus 12, a sprung G sensor 30 and an unsprung G sensor 32 respectively for detecting vertical acceleration of a sprung portion and vertical acceleration of an unsprung portion, a stroke sensor 34 for detecting a distance between the corresponding wheel and the vehicle body, a lateral G sensor 36 and a longitudinal G sensor 38 respectively for detecting lateral acceleration and longitudinal acceleration generated in the vehicle body, a roll-rate sensor 40 for detecting a roll rate of the vehicle body, a pitch-rate sensor 42 for detecting a pitch rate of the vehicle body, an operation-angle sensor 44 for detecting an operation angle of a steering wheel, and a wheel-speed sensor 46 for detecting a rotational speed of the corresponding wheel. The sensors described above are indicated in FIG. 1 as "Gu", "Gl" "St", "Gy", "Gz", "Rr", "Rp", "θ", and "Vw", respectively.

As will be explained, each suspension apparatus 12 is configured to perform a control depending upon a road surface condition. To this end, there are installed on the vehicle two CCD cameras 54 for obtaining image data of the road surface ahead of the vehicle and an image processing unit 56 (indicated as "GPU" in FIG. 1) for estimating the road surface condition on the basis of the image data obtained by the CCD cameras 54. The image processing unit 56 is connected to the ECU 14 so as to perform data communication.

ii) Structure of Absorber

Figure 2:
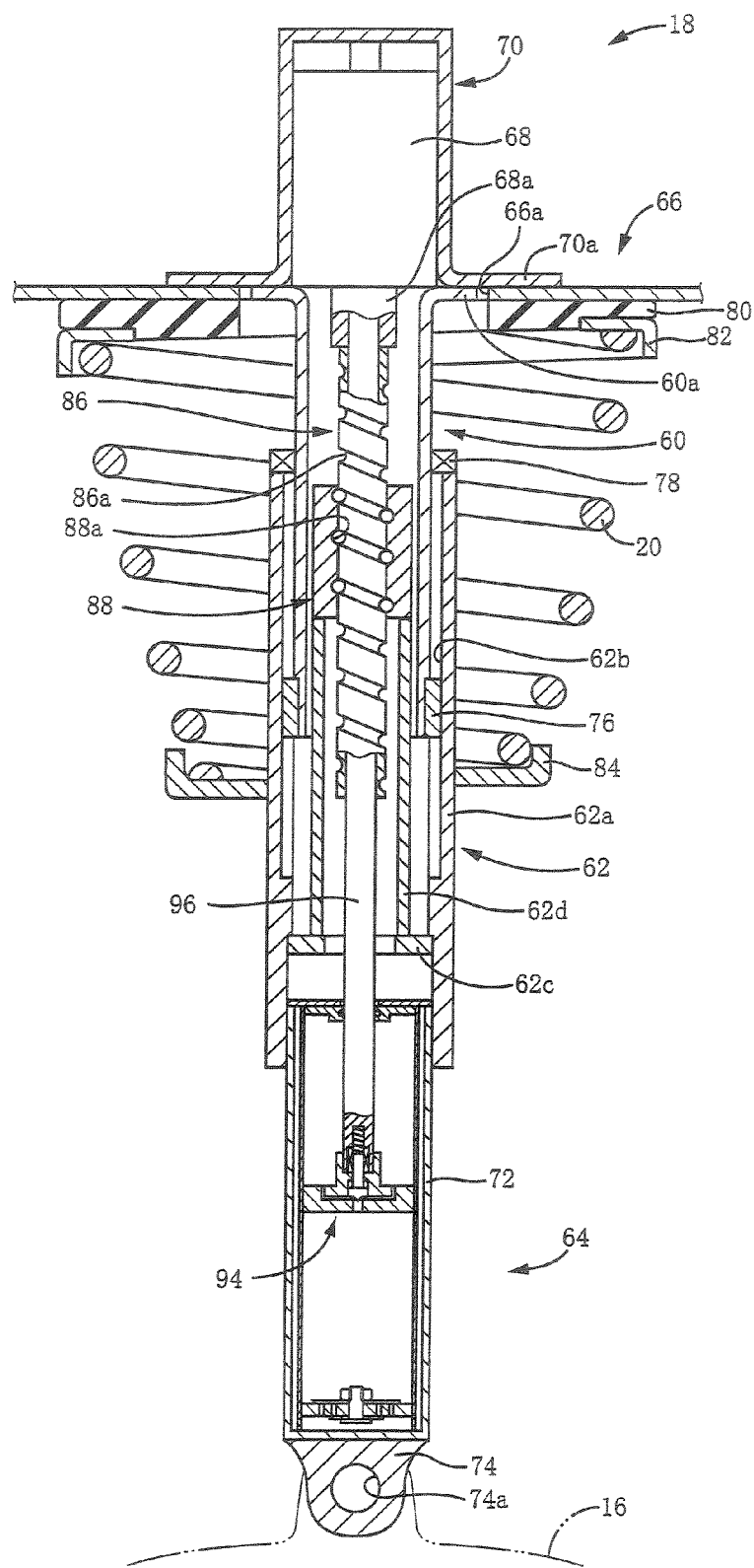
FIG. 2 is a cross-sectional view of an absorber of each suspension apparatus in the suspension system of FIG. 1.

FIG. 2 is a cross-sectional view of the absorber 18 of each suspension apparatus 12. The absorber 18 includes an upper tube 60, a lower tube 62, and a hydraulic cylinder device 64. The upper tube 60 is a cylindrical member having a flange portion 60a at its upper end and is fixed to a portion of the vehicle body, specifically, a mount portion 66 provided at an upper portion of a tire housing. Described in more detail, the flange portion 60a is fixed to a flange portion 70a of a motor casing 70 that accommodates a motor 68 which will be explained, and the flange portion 70a is fixed to the mount portion 66, whereby the upper tube 60 is fixed to the mount portion 66. The mount portion 66 is formed with a connection hole 66a. The integral unit of the upper tube 60 and the motor casing 70 is fixed to the mount portion 66 while passing through the connection hole 66a. The lower tube 62 has a cylindrical main body 62a which is fixed to a housing 72 of the cylinder device 64 such that an upper portion of the housing 72 is fitted in a lower portion of the main body 62a of the lower tube 62. The housing 72 of the cylinder device 64 may be referred to as "cylinder". A connecting member 74 having a shaft hole 74a is attached to a lower end of the housing 72 of the cylinder device 64. The cylinder device 64 is connected to a connecting portion of the lower arm 16 utilizing the shaft hole 74a, such that the cylinder device 64 is immovable in an axis direction of the absorber 18 while being rotatable. Thus, the lower tube 62 is provided on the lower arm 16 so as to be immovable in the axis direction. In the following description, the terms "axis" and "axis direction" respectively mean an axis of the absorber 18 and a direction of extension of the axis unless otherwise specified. Further, the axis direction is construed as coinciding with a direction of a stroke motion of the wheel and the vehicle body.

The upper tube 60 has an outside diameter slightly smaller than an inside diameter of the main body 62a of the lower tube 62. A lower portion of the upper tube 60 is fitted in an upper portion of the main body 62a of the lower tube 62. Two keys 76 are fixedly provided on an outer circumference of a lower end of the upper tube 60. The two keys 76 are fitted in respective two key grooves 62b formed in an inner circumferential surface of the main body 62a of the lower tube 62 so as to extend in the axis direction. In the thus constructed absorber 18, the upper tube 60 and the lower tube 62 are configured to be unrotatable relative to each other and movable relative to each other in the axis direction, whereby, in the stroke motion, the absorber 18 is configured to be telescopically movable in accordance with the stroke motion. At an upper end of the main body 62a of the lower tube 62, a dust seal 78 is attached. An upper retainer 82 is attached to an underside of the mount portion 66 via a vibration damping rubber 80 while a lower retainer 84 is attached to the main body 62a of the lower tube 62. The suspension spring 20 is disposed so as to be held by and between the upper and lower retainers 82, 84 and is configured to expand and contract in accordance with the stroke motion.

Within the motor casing 70, the electromagnetic motor 68 is accommodated so as to be fixed thereto. The motor 68 is fixed indirectly to the mount portion 66. A motor shaft 68a which is a rotational shaft of the motor 68 has an axis that coincides with the axis of the absorber 18 and extends downward by a certain distance. A rod member 86 on which an external thread 86a is formed is fixed to a lower end of the motor shaft 68a so as to be coaxial therewith. Both of the motor shaft 68a and the rod member 86 are hollow. At a lower portion of an inside of the main body 62c of the lower tube 62, there is provided a support ring 62c on which is disposed a support tube 62d that extends upward in the axis direction. To an upper end of the support sleeve 62d, there is fixed a nut member 88 on which an internal thread 88a is formed and which holds bearing balls. The internal thread 88a of the nut member 88 is held in engagement with the external thread 86a formed on the rod member, via the ball bearings. That is, the rod member 86 and the nut member 88 are connected to each other via a ball screw mechanism. According to the structure described above, in the stroke motion, the rod member 86 rotates and the motor shaft 68a, namely, the motor 68, is rotated in accordance with a relative movement of the rod member 86 and the nut member 88 in the axis direction. In this instance, it is possible to give, owing to a force of the motor 68, a counter force which counters the relative rotation of the rod member and the nut member 88. Owing to the counter force, there can be generated a damping force with respect to the stroke motion. On the contrary, where the motor 68 is driven to rotate, the rod member 86 and the nut member 88 can be moved relative to each other in the axis direction, thereby giving a propulsive force with respect to the stroke motion for allowing an active stroke motion (positive stroke motion).

Figure 3:
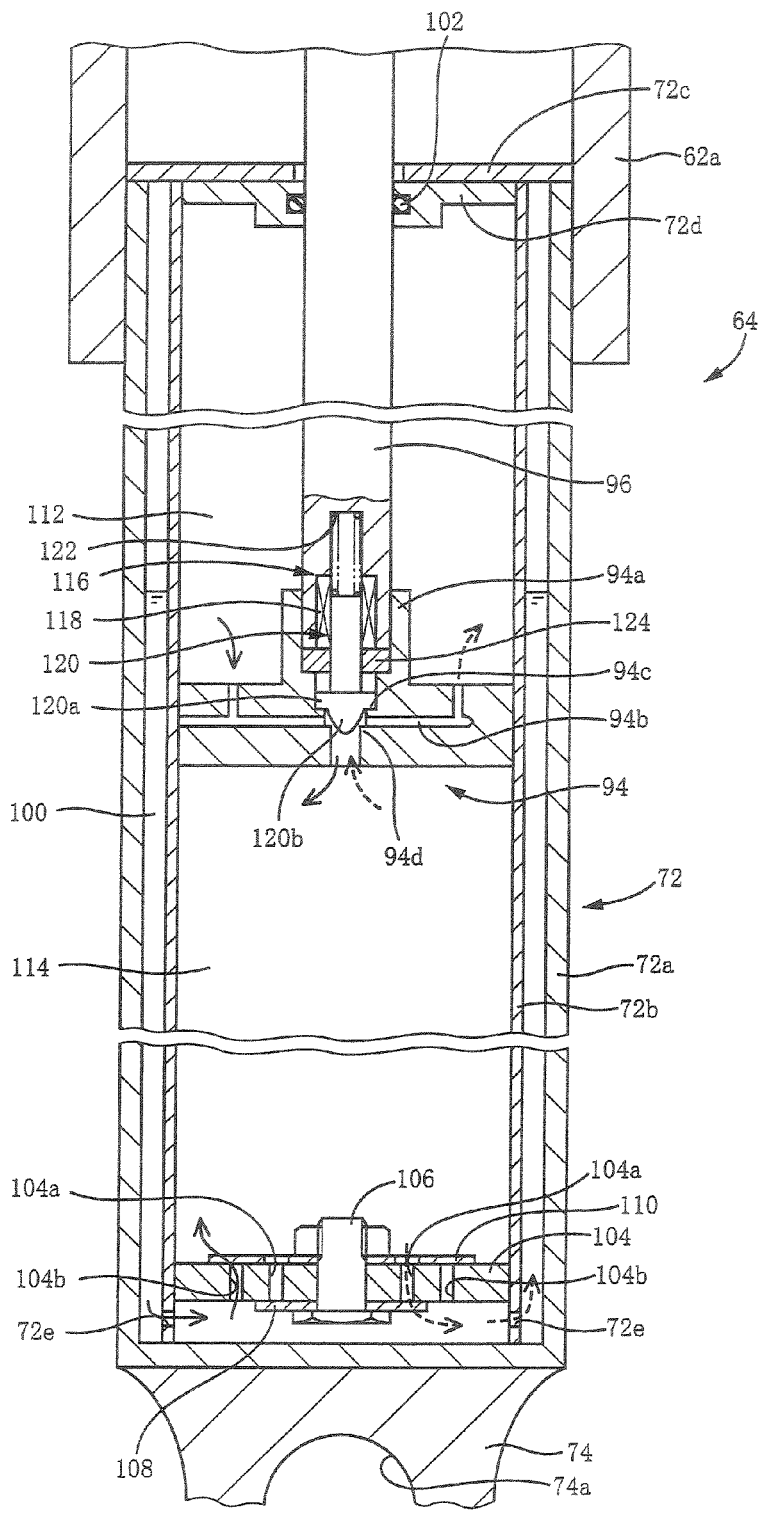
FIG. 3 is an enlarged cross-sectional view of a cylinder device of the absorber of FIG. 2.

The cylinder device 64 is a hydraulic cylinder device constituted principally by a housing 72 filled with a working fluid or liquid and a piston 94 which divides an interior of the housing 72 into two working-fluid chambers and which moves in the housing 72 in the axis direction while changing volumes of the respective two working-fluid chambers. A piston rod 96 connected at its one end to the piston 94 passes through the hollow rod member 86 and motor shaft 68a. The piston rod 96 is fixed at the other end thereof to an inner surface of an upper portion of the motor casing 70. According to the structure, the cylinder device 64 is configured such that the housing 72 and the piston 94 move relative to each other in the axis direction in accordance with the stroke motion. The cylinder device 64 will be explained in more detail with reference to the enlarged cross-sectional view of FIG. 3.

The housing 72 includes: a housing body 72a which is a cylindrical member having a closed end; an inner cylindrical member 72b inserted in the housing body 72a; and an outer lid 72c and an inner lid 72d which close respective upper ends of the housing body 72a and the inner cylindrical member 72b. A cylindrical space formed between the housing body 72a and the inner cylindrical member 72b is not filled, at its upper portion, with the working fluid and serves as a buffer chamber 100. The piston rod 96 passes through central openings respectively formed in the outer and inner lids 72c, 72d and extends into the housing 72. A seal member 102 is provided in the central opening of the inner lid 72d for assuring sealing between an outer circumferential surface of the piston rod 96 and an inner circumferential surface of the inner lid 72d that defines the central opening, for preventing leakage of the working fluid. At a lower portion of the inner cylindrical member 72b, a disc-like valve base member 104 is fixedly disposed. There are formed in the valve base member 104 two radially inner fluid passages 104a, 104a which are near to the center of the valve base member 104 and two radially outer fluid passages 104b, 104b which are remote from the center of the valve base member 104. The fluid passages 104a are closed by a valve plate 108 while the fluid passages 104b are closed by a valve plate 110, the valve plates 108, 110 being fastened to the valve base member 104 by a fastening member 106. In the vicinity of a lower end portion of the inner cylindrical member 72, there are formed communication holes 72e which permit fluid communication between an inner space of the inner cylindrical member 72b below the valve base member 104 and the buffer chamber 100.

Figure 4:
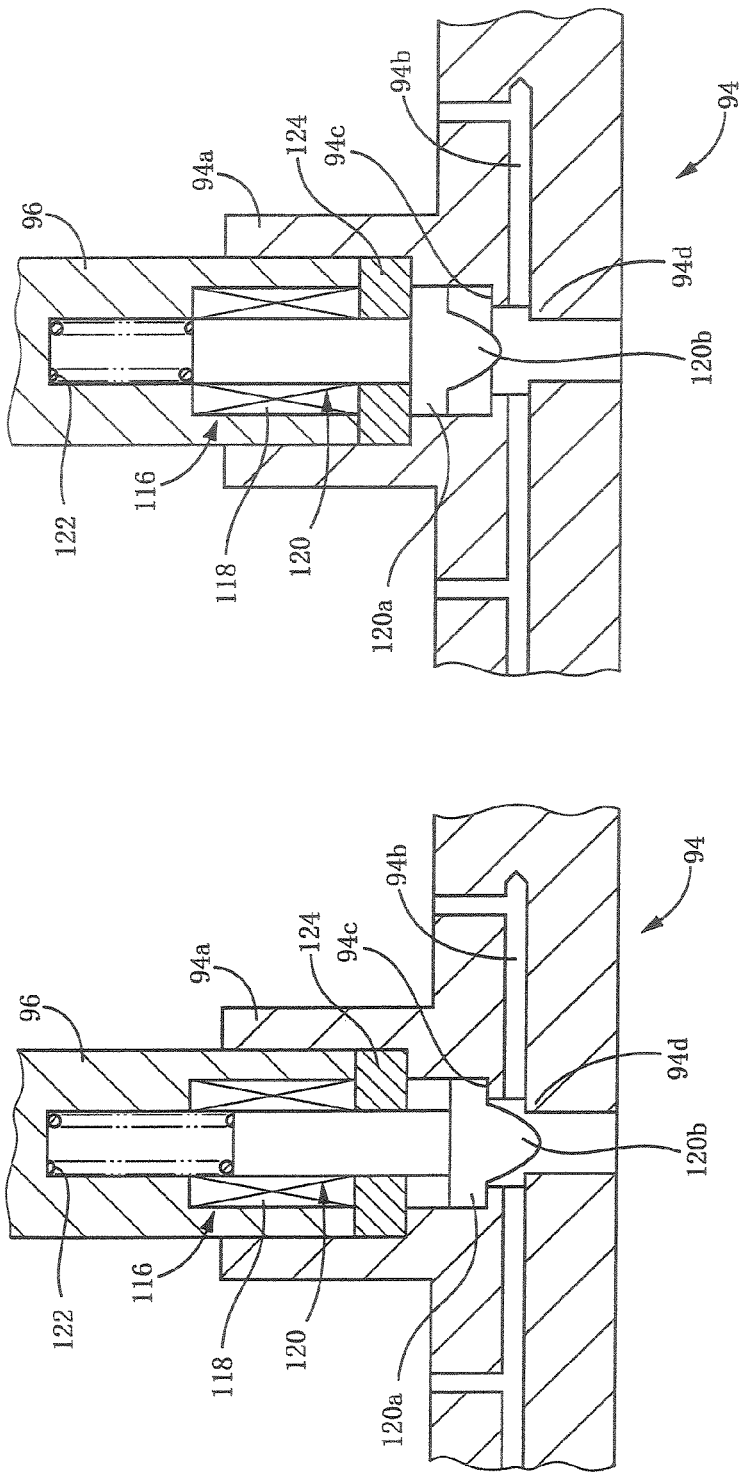
FIGS. 4A and 4B are enlarged cross-sectional views showing a state of a fluid passage formed in a piston when an electromagnetic solenoid of the cylinder device of FIG. 3 is in a non-energized state and when the solenoid is in an energized state, respectively.

The piston 94 has a boss portion 94a at which the piston 94 is connected to a lower end portion of the piston rod 96, and the piston 94 divides an interior of the housing 72, namely, an inner space of the inner cylindrical member 72b above the valve base member 104, into an upper fluid chamber 112 and a lower fluid chamber 114 as the two working-fluid chambers. The piston 94 is formed with a fluid passage 94b through which the upper fluid chamber 112 and the lower fluid chamber 114 are held in fluid communication with each other. In an inside of the lower end portion of the piston rod 96, namely, in an inside of the boss portion 94a of the piston 94, an electromagnetic solenoid 116 is disposed. The solenoid 116 is constituted by including a coil 118, a solenoid pin 120 as a movable element, and a spring 122 which biases the solenoid pin 120 downward. A guide ring 124 is interposed between the piston 94 and the lower end portion of the piston rod 96. The solenoid pin 120 is movable in the axis direction while being guided by the guide ring 124. The solenoid pin 120 has a flange portion 120a. A range of a movement of the flange portion 120a is limited between the guide ring 124 and an engaging step 94c which is located at a lower end of the boss portion 94a of the piston 94. When the solenoid 116, more specifically, the coil 118, is in a non-energized state shown in FIG. 4(a), the solenoid pin 120 is located at a lower movable-end owing to a biasing force of the spring 122. In the non-energized state, there exists only a slight clearance between a conical leading end portion 120b of the solenoid pin 120 and an upper edge 94d of a portion of the fluid passage 94b, which portion is open to the lower fluid chamber 114 and which extends in the axial direction. The slight clearance functions as an orifice, whereby a large resistance is given to passage of the working fluid through the fluid passage 94b. In the meantime, the solenoid 116 is configured, in an energized state, to steplessly change an operational mount of the solenoid pin 120 depending upon a magnitude of an electric current to be supplied to the coil 118 (i.e., a supply current). That is, the solenoid is configured to be like a linear valve. Described in detail, with an increase in the supply current, the solenoid pin 120 is located at a higher position. Accordingly, by changing the supply current, a cross sectional area of the clearance functioning as the orifice is steplessly changeable. It is noted that a state shown in FIG. 4(b) indicates the energized state of the coil 118 in which the supply current is considerably large. In this state, the solenoid pin 120 is located at the highest position and the leading end portion 120b of the solenoid pin 120 and the above-indicated upper edge 94d are relatively largely spaced apart from each other. Accordingly, substantially no resistance is given to the passage of the working fluid through the fluid passage 94.

When a stroke motion in a direction in which the wheel 10 and the mount portion 66 move away from each other, namely, a stroke motion in a rebound direction, is performed, the piston 94 moves upward relative to the housing 72. In association with the movement of the piston 94, the volume of the upper fluid chamber 112 decreases while the volume of the lower fluid chamber 114 increases. Consequently, as indicated by arrows in solid line in FIG. 3, a part of the working fluid in the upper fluid chamber 112 flows into the lower fluid chamber 114 via the fluid passage 94b of the piston 94 while, at the same time, a part of the working fluid in the buffer chamber 100 flows into the lower fluid chamber 114 via the fluid passages 104b of the valve base member 104 for compensating a difference between amounts of change in the volumes in the upper and lower fluid chambers 112, 114. On the contrary, when a stroke motion in a direction in which the wheel 10 and the mount portion 66 move toward each other, namely, a stroke motion in a bound direction, is performed, the piston 94 moves downward relative to the housing 72. In association with the movement of the piston 94, the volume of the upper fluid chamber 112 increases while the volume of the lower fluid chamber 114 decreases. Consequently, as indicated by arrows in broken line in FIG. 3, a part of the working fluid in the lower fluid chamber 114 flows into the upper fluid chamber 112 via the fluid passage 94b of the piston 94 while, at the same time, a part of the working fluid in the lower fluid chamber 114 flows into the buffer chamber 100 via openings formed in the valve plate 110 and the fluid passages 104a of the valve base member 104 for compensating a difference between amounts of change in the volumes in the upper and lower fluid chambers 112, 114.

The working fluid accommodated in the cylinder device 64 flows in the above-described manner in association with the stroke motion. By giving a resistance to the flow of the working fluid, there is given a damping force with respect to the stroke motion. The working fluid passing through the fluid passages 104a, 104a of the valve base member 104 pushes up or down the valve plates 108, 110 and flows between the valve plates 108, 110 and the base valve member 104. In this instance, there is given a resistance to the passage of the working fluid (hereinafter referred to as "valve-plate resistance" where appropriate). The valve-plate resistance is made to have substantially the same magnitude for the working fluid passing through either of the fluid passages 104a, 104b, and the magnitude of the valve-plate resistance is made comparatively small. In the non-energized state of the solenoid 116, the resistance to the passage of the working fluid through the fluid passage 94 formed in the piston 94 (hereinafter referred to as "piston resistance" where appropriate) is made considerably larger than the valve-plate resistance, and the damping force by the cylinder device 64 is determined based on the piston resistance. In the energized state of the solenoid 116, the piston resistance is made variable depending upon the magnitude of the supply current to the solenoid 116. Accordingly, in a range where the piston resistance exceeds the valve-plate resistance, the damping force can be varied by steplessly controlling the supply current. In a range where the piston resistance is below the valve-plate resistance as a result of an increase in the supply current to a certain extent, there is generated a comparatively small damping force that depends on the valve-plate resistance.

The absorber 18 constructed as explained above includes two damping-force generating devices (two absorber devices). More specifically explained, the absorber 18 includes, as a first damping-force generating device which is one of the two damping-force generating devices, an electromagnetic damping-force generating device constituted by including the motor 68, the rod member 86, the nut member 88, etc., and includes, as a second damping-force generating device which is the other of the two damping-force generating devices, a hydraulic damping-force generating device which is constituted by including the cylinder device 64 and which depends on the action of the liquid. In the present absorber 18, the first and second damping-force generating devices are configured to generate a first damping force and a second damping force, respectively, and a sum of the first damping force and the second damping force is equal to the damping force generated by the present absorber 18. The solenoid 116 incorporated in the piston 94 of the cylinder device 64 is configured to change the cross sectional area of the fluid passage 94b of the piston 94, and the second damping-force generating device is configured to change the magnitude of the second damping force owing to the actuation of the solenoid 116. That is, in the present absorber 18, a second-damping-force-increasing mechanism is constituted by including the solenoid 116.

iii) Damping Force by Motor

Figure 5:
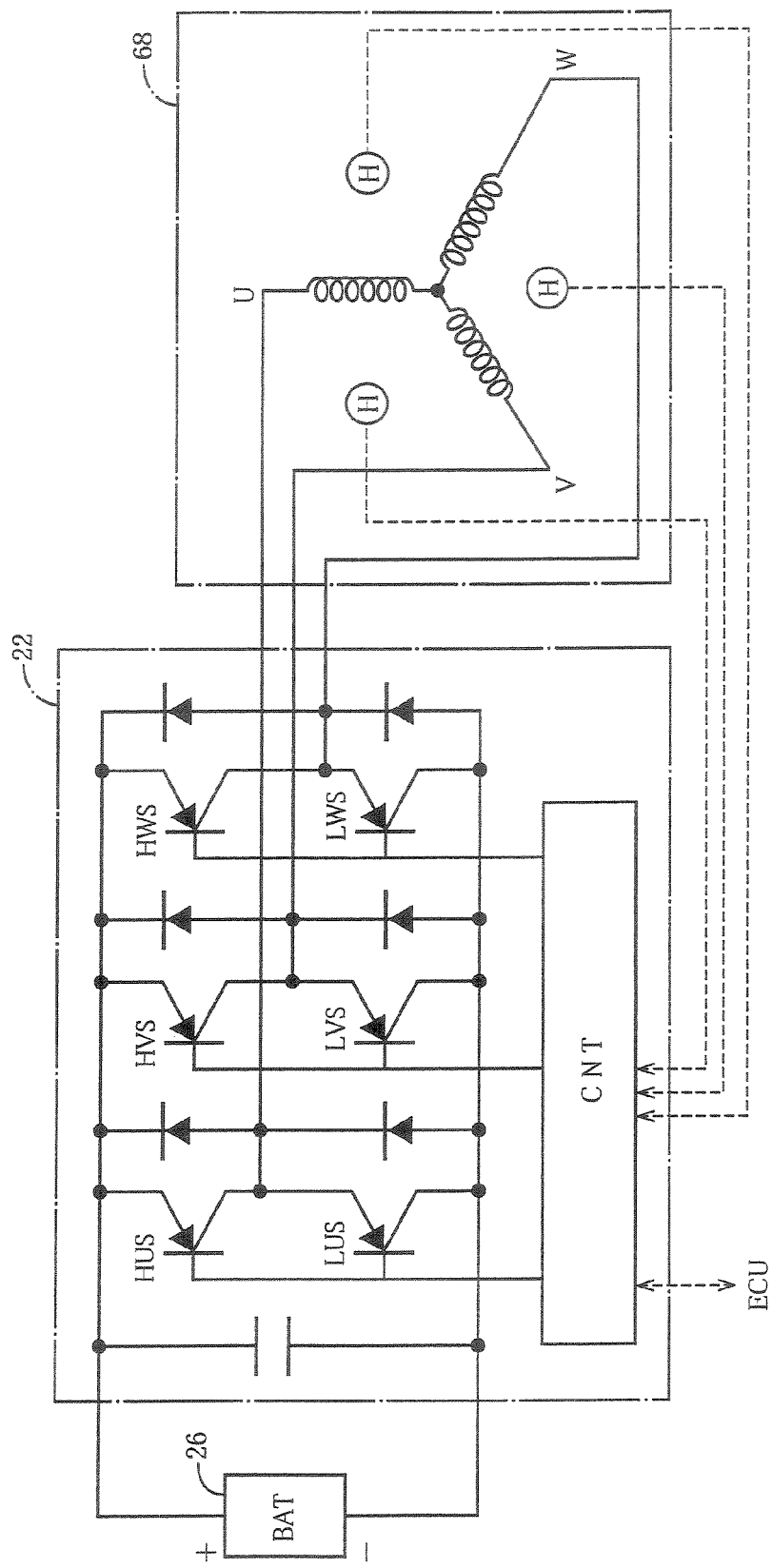
FIG. 5 is a circuit diagram of an inverter which performs an electrifying control of an electromagnetic motor of the absorber of FIG. 2.

In the present absorber 18, the electromagnetic motor 68 is a star-connected (γ-connected), three-phase brushless motor and an electric current passing through the motor 68 is controlled by the inverter 22. The inverter 22 has a known, ordinary structure as indicated by the circuit diagram of FIG. 5. The inverter 22 has plus-side switching elements and minus-side switching elements for respective three phases (u, v, w) of the motor, namely, six switching elements HUS, HVS, HWS, LUS, LVS, LWS. A controller CNT judges a motor rotational angle (an electric angle) based on signals detected by Hall elements H provided in the motor 68 and controls the six switching elements HUS, HVS, HWS, LUS, LVS, LWS to be opened and closed based on the motor rotational angle. The present inverter 22 is configured such that the controller CNT controls the motor 68 according to a so-called 120° electrifying drive system and such that an electrifying pattern is changed depending upon a direction in which the motor 68 gives a rotational torque to the rod member 86. The direction indicated above hereinafter referred to as "torque-giving direction" where appropriate. Further, the inverter 22 electrifies the motor 68 according to a pulse width modulation (PWM) control in which the controller CNT changes a duty ratio, i.e., a ratio of a pulse-on time to a pulse-off time of electrifying pulses, thereby changing the magnitude of the rotational torque. That is, the duty ratio is made large, whereby the amount of the electric current passing through the motor 68 is made large and the rotational torque generated by the motor 68 is accordingly made large. On the contrary, the duty ratio is made small, whereby the amount of the electric current passing through the motor 68 is made small and the rotational torque generated by the motor 68 is accordingly made small. In other words, the motor 68 is subjected to a so-called torque control. In this connection, the ECU 14 transmits command signals of the torque-giving direction and the duty ratio.

In the active stroke motion (positive stroke motion), the rotational torque generated by the motor 68 acts as a propulsive force on the stroke motion. In the passive stroke motion (negative stroke motion), the rotational torque generated by the motor 68 acts as a damping force on the stroke motion. That is, in the latter case, though the motor 68 gives the rotational torque, the motor is in a state in which the motor 68 is rotated in an opposite direction by a force that exceeds the rotational torque. In this state, the rotational direction of the motor 68 and the torque-giving direction are opposite to each other, and the motor 68 is operated in the so-called regenerative braking state or the so-called plugging braking state.

Figure 6:
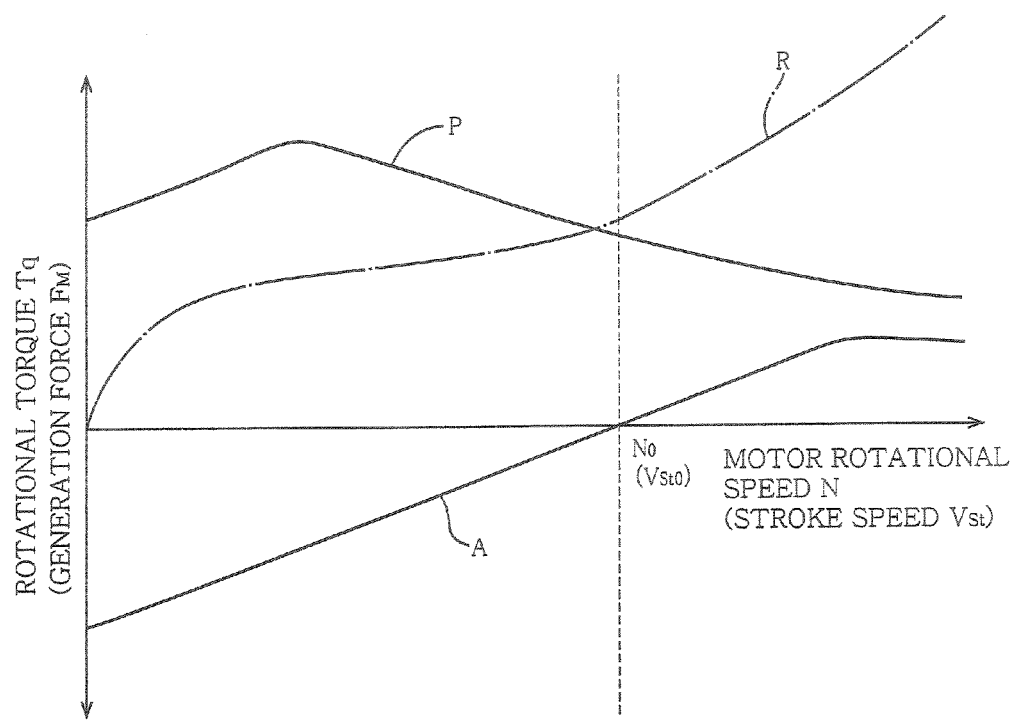
FIG. 6 is a graph showing a rotational-speed•rotational-torque characteristic of the electromagnetic motor of the absorber of FIG. 2.

FIG. 6 shows a rotational-speed•rotational-torque characteristic (N-T characteristic) of the motor 68. The graph of FIG. 6 shows a relationship between motor rotational speed N and rotational torque Tq that can be generated. In other words, the graph shows a relationship, in the first damping-force generating device, between stroke speed $V_{St}$ which is a speed of the stroke motion and generation force $F_M$ which depends on the rotational torque Tq of the motor 68 and which can be generated with respect to the stroke motion. The generation force $F_M$ is the propulsive force in the active motion and the damping force in the passive motion. A solid line P in the graph indicates a characteristic in regard to the passive motion, i.e., a characteristic in regard to the damping force, while a solid line A in the graph indicates a characteristic in regard to the active motion, i.e., a characteristic in regard to the propulsive force.

Focusing on the line P relating to the damping force, it is apparent that, when the damping force is generated based on the rotational torque Tq of the motor 68, the generation force $F_M$ which can be generated, namely, the damping force $F_M$, increases with an increase in the stroke speed $V_{St}$ during a time period in which the stroke speed $V_{St}$ is relatively low, for the reason that an electromotive force of the motor 68 is efficiently utilized, for instance. When the stroke speed $V_{St}$ increases to a certain extent, however, the generation force $F_M$ decreases with an increase in the stroke speed $V_{St}$ due to an effect of the time constant of the motor 68, etc. That is, the motor 68 in the present embodiment is constituted as a low rotation motor capable of generating a comparatively large rotational torque Tq in a comparatively low rotation speed range. In this respect, if it is attempted to generate a comparatively large rotational torque Tq in a high rotation speed range, the motor tends to be large-sized. In view of this, the present absorber 18 employs the low rotation motor. A one-dot chain line R in the graph of FIG. 6 indicates a line indicative of the damping force that is required in the present absorber 18, i.e., a required damping-force line. As apparent from the graph of FIG. 6, because the low rotation motor is employed, the damping force $F_M$ that depends on the rotational torque Tq is not enough to satisfy the required damping force in a high-speed motion range in which the stroke speed $V_{St}$ is high.

With an increase in the stroke speed $V_{St}$, namely, with an increase in the rotational speed N of the motor 68, the electromotive force generated in the motor 68 increases. When the electromotive force exceeds a power source voltage, more specifically, when a voltage of the electromotive force normally exceeds a voltage of the battery 26, there is normally generated an electric current by reflux diodes which are provided in parallel with the respective switching elements HUS, HVS, HWS, LUS, LVS, LWS, as apparent from the circuit diagram of the inverter 22 shown in FIG. 5. As a result, the motor 68 is placed in a state in which the motor 68 cannot be sufficiently controlled according to the duty ratio. That is, a range located on a right-hand side of a vertical chain line in FIG. 6 corresponds to a range in which the electromotive force exceeds the power source voltage. More specifically explained, when the stroke speed $V_{St}$ exceeds an emf•source-voltage equalized speed $V_{St0}$ which is the stroke speed that corresponds to the motor rotational speed $N_0$, the controllability of the damping force $F_M$ is deteriorated.

iv) Auxiliary Damping Force by Cylinder Device

Figure 7:
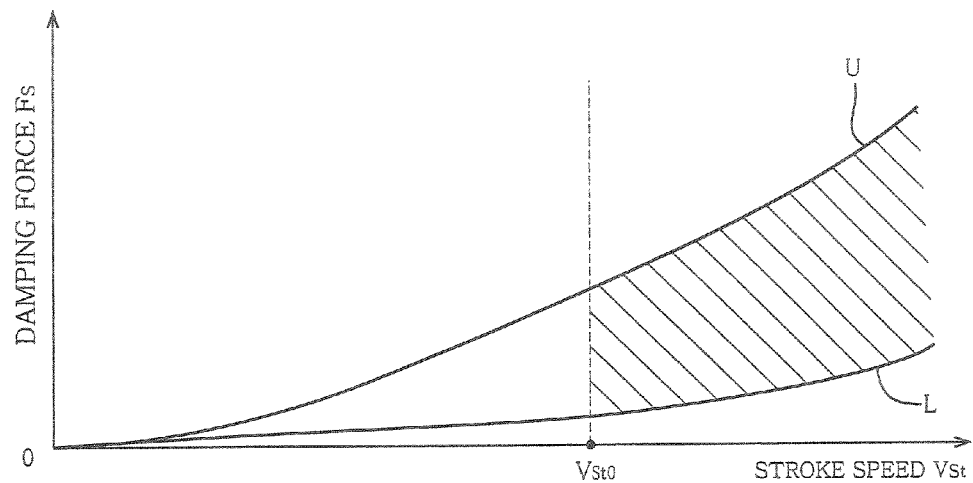
FIG. 7 is a graph showing a characteristic of a damping force generated by the cylinder device of FIG. 3 with respect to a stroke speed.

To deal with the above-described problems relating to the electromotive force and the characteristic of the damping force in the first damping-force generating device that generates the damping force based on the generation force of the motor 68, the cylinder device 64 is configured to generate the second damping force. FIG. 7 shows a graph indicating a characteristic of the damping force that depends on the action of the working fluid in the cylinder device 64, more specifically, a relationship between stroke speed $V_{St}$ and damping force $F_S$ to be generated. In the graph of FIG. 7, a solid line U indicates the damping force Fs where the solenoid 116 is in the non-energized state, namely, indicates the largest damping force Fs that can be generated. A solid line L in the graph of FIG. 7 indicates the damping force Fs in an instance where a comparatively large electric current is supplied to the solenoid 116, namely, indicates the damping force Fs that is determined by the valve-plate resistance explained above, in short, the damping force Fs that is inevitably generated.

As explained above, in the present absorber 18, the damping force $F_M$ that depends on the motor 68 is sufficiently large in a range in which the stroke speed $V_{St}$ is not higher than the emf•source-voltage equalized speed $V_{St0}$, and the controllability of the damping force is good in that range. Therefore, the electric current exceeding a prescribed value is supplied to the solenoid 116, so that the damping force Fs along the line L is generated. On the contrary, in a range in which the stroke speed $V_{St}$ exceeds the emf•source-voltage equalized speed $V_{St0}$, the shortage of the damping force $F_M$ that depends on the motor 68 is covered. Further, to cope with the deterioration of the controllability of the damping force $F_M$, the supply current to the solenoid 116 is controlled, thereby permitting an appropriate damping force $F_S$ (in a hatched area in FIG. 7) to be generated in a range between the line L and the line U.

Figure 8:
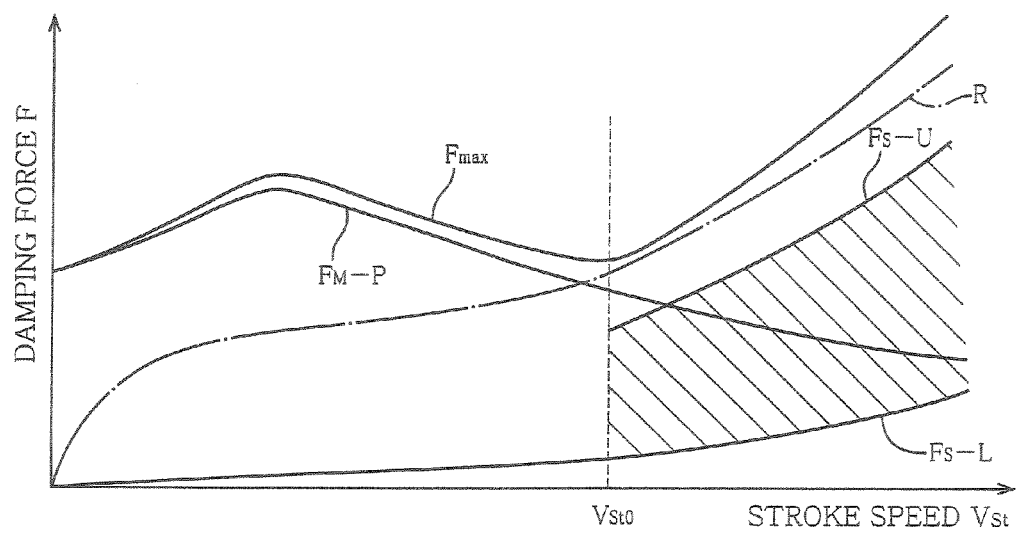
FIG. 8 is a graph showing a characteristic of a damping force which can be generated by the absorber of FIG. 2 with respect to a stroke speed.

Because the damping force by the cylinder device 64 is generated as described above, a maximum damping force $F_{MAX}$ by the absorber 18, namely, a sum of a maximum damping force $F_M$ that depends on the motor and a maximum damping force $F_S$ that depends on the cylinder device 64, is sufficient over a wide range of the stroke speed $V_{St}$, as shown in the graph of FIG. 8. Moreover, the controllability of the damping force F generated by the absorber 18 is sufficiently good over the wide range of the stroke speed $V_{St}$. The above explanation is made in relation to the damping force in the passive motion. It is noted that the damping force $F_S$ by the cylinder device 64 is generated in the active motion. The damping force $F_S$ in the active motion acts in a direction in which the damping force $F_S$ counters the propulsive force by the motor 68, namely, in a direction opposite to a direction of the propulsive force. In the light of this, the present damping-force generating system is configured such that, in the active stroke motion, the second damping force by the cylinder device 64 is minimized irrespective of the stroke speed $V_{St}$.

v) Outline of Damping-Force Active Control

In a control of the damping-force generating system according to the present embodiment, the damping force generated by each absorber 18 every moment is changed depending upon a running state of the vehicle, a posture of the vehicle, and so on, which change every moment. That is, in the control of the present system, the ECU 14 executes a damping-force active control for actively changing the damping force. Hereinafter, the damping-force active control will be explained. In the damping-force active control, each absorber 18 is not controlled so as to generate the damping force only. In some cases, each absorber 18 is controlled to give a force in the same direction as a direction of the stroke motion, namely, to give the propulsive force. In the following explanation, because the propulsive force can be considered as a negative damping force, the propulsive force is dealt with similarly to the damping force and is referred to as the damping force unless otherwise specified.

In the damping-force active control, there is initially determined a target damping force F* which is a damping force to be generated at the present moment by each absorber 18. The damping-force active control in the present suspension system is generally composed of a ride-comfort control for keeping the ride comfort of the vehicle good by coping with unevenness of a road surface, a roll-restraining control for restraining rolling of the vehicle body, and a pitch-restraining control for restraining pitching of the vehicle body such as a dive, a squat and the like. A damping force for each of the three controls is determined as a damping-force component. In the ride-comfort control, a ride-comfort-control-damping-force component $F_N$ is independently determined in each absorber 18 in accordance with the motions of each wheel 10 and the mount portion 66 of each suspension apparatus 12. In the roll-restraining control, a roll-restraining-control-damping-force component $F_R$ to be shared by each absorber 18 is determined based on roll moment of the vehicle body. In the pitch-restraining control, a pitch-restraining-control-damping-force component $F_P$ to be shared by each absorber 18 is determined based on pitch moment of the vehicle body. The target damping force F* for each absorber 18 is determined by adding those damping-force components $F_N$, $F_R$, $F_P$.

The damping-force generating system according to the present embodiment is configured such that, in the damping-force active control, the target damping force described above is distributed into the first damping force by the first damping-force generating device and the second damping force by the second damping-force generating device. For the reasons explained above, in the present absorber 18, a pattern of generation of the damping force by the cylinder device 64 differs depending upon whether or not the stroke speed $V_{St}$ exceeds the emf•source-voltage equalized speed $V_{St0}$ as a preset speed. Accordingly, the distribution of the damping force to each damping-force generating device differs depending upon the stroke speed $V_{St}$. More specifically explained, where the stroke speed $V_{St}$ is not higher than the emf•source-voltage equalized speed $V_{St0}$, a second-damping-force distribution $F_S^*$ which is a damping force distributed to the cylinder device 64 is determined to have a magnitude following the line L in FIG. 7, namely, to be minimized, while a difference obtained by subtracting the second-damping-force distribution Fs* from the target damping force F* is determined as a first-damping-force distribution $F_M^*$. On the contrary, where the stroke speed $V_{St}$ exceeds the emf•source-voltage equalized speed $V_{St0}$, it is difficult to control the first damping force $F_M$ as explained above. In this instance, almost no electric power is supplied from the battery 26 to the motor 68, whereby the first-damping-force distribution $F_M^*$ is determined to have a suitable magnitude in accordance with a short-circuit characteristic, i.e., a characteristic relating to a damping force (a braking force) to be obtained by the electromotive force when the phases of the motor are short-circuited to each other. A difference obtained by subtracting the first-damping-force distribution $F_M^*$ from the target damping force F* is determined as the second-damping-force distribution $F_S^*$.

In the damping-force active control, on the basis of the first-damping-force distribution $F_M^*$ and the second-damping-force distribution $F_S^*$ distributed as described above, the operations of the motor 68 and the solenoid 116 are controlled. More specifically explained, where the stroke speed $V_{St}$ is not higher than the emf•source-voltage equalized speed $V_{St0}$, there is supplied, to the solenoid 116, an electric current by which the cylinder device 64 generates the smallest damping force $F_S$. Further, a target duty ratio $R_D^*$ based on the first-damping-force distribution $F_M^*$ is determined, so that the motor 68 is controlled based on the target duty ratio $R_D^*$. On the contrary, where the stroke speed $V_{St}$ exceeds the emf•source voltage-equalized speed $V_{St0}$, the motor 68 is controlled with the target duty ratio $R_D^*$ determined to be 0. Further, there is supplied, to the solenoid 116, an electric current that corresponds to a target supply current $I_S^*$ which is determined based on the second-damping-force distribution $F_S^*$.

Where the target damping force F* is the propulsive force, there is supplied, to the solenoid 116, an electric current by which the cylinder device 64 generates the smallest damping force $F_S$, for preventing, to the extent possible, the propulsive force from being impaired. Further, the first-damping-force distribution $F_M^*$ is determined based on the target damping force F* which is the propulsive force while taking account of a decrease amount of the propulsive force due to the damping force $F_S$ of the cylinder device 64. The motor 68 is controlled based on the target duty ratio $R_D^*$ in accordance with the determined first-damping-force distribution $F_M^*$.

vi) Outline of Active-Motion Control

In the present suspension system, an active-motion control (positive-motion control) is executed other than the damping-force active control described above. The active-motion control and the damping-force active control are selectively executed. When the wheel 10 passes a large degree of uneven road surface, namely, a large convexity or a bump and a large concavity or a dent, the speed of the stroke motion becomes considerably high. Accordingly, it may be anticipated that a sufficient damping force cannot be obtained in spite of the auxiliary second damping force by the cylinder device 64. In this instance, a bound stopper and a rebound stopper which define ends of the stroke motion and which are disposed between each lower arm 16 and the corresponding side member of the vehicle body work, so that the ride comfort of the vehicle is deteriorated by an impact generated upon working of the bound stopper and the rebound stopper. The present active-motion control aims at responding to or coping with the large concavity and convexity on the load surface and includes a concavity-responsive control and a convexity-responsive control (hereinafter collectively referred to as "unevenness-responsive control" where appropriate) for permitting the active stroke motion (positive stroke motion) to be performed by the drive force of the motor 68 before the wheel 10 pass the concavity and the convexity.

The unevenness-responsive control is executed in the following manner. On the basis of image data obtained by the two CCD cameras 54 disposed at the front of the vehicle, the image processing unit 56 processes the image data, thereby specifying, as a target concavity or a target convexity, a concavity or a convexity existing on a line on which the wheel 10 is expected to pass (hereinafter referred to as "expected wheel passing line" where appropriate), more specifically, a concavity or a convexity with respect to which the bound stopper or the rebound stopper is expected to work when the wheel 10 passes the concavity or the convexity. The unevenness-responsive control is executed for the specified target concavity or convexity. Subsequently, there is calculated a time required for the wheel 10 to reach the target concavity or the target convexity (hereinafter referred to as "reach time"). When the calculated reach time becomes not greater than a determined reference time, a prescribed active stroke motion is initiated. To cope with the target concavity, there is carried out, as the prescribed active motion, a motion in which a stroke position is equal to a preset bound-side position near to a bound end, for preventing the rebound stopper from working when the wheel 10 passes the concavity. In other words, to secure a rebound stroke prior to reaching of the wheel 10 to the target concavity, the active stroke motion is carried out by the drive force of the motor 68 such that the wheel 10 and the mount portion 66 are moved toward each other by a predetermined distance. To cope with the target convexity, there is carried out, as the prescribed active motion, a motion in which the stroke position is equal to a preset rebound-side position near to a rebound end, for preventing the bound stopper from working when the wheel 10 passes the convexity. In other words, to secure a bound stroke prior to reaching of the wheel 10 to the target convexity, the active stroke motion is carried out by the drive force of the motor 68 such that the wheel 10 and the mount portion 66 are moved away from each other by a predetermined distance. In this connection, the reference time is determined, on the basis of the wheel speed, generally as a time required for the prescribed active stroke motion to be completed upon reaching the target concavity or the target convexity.

vii) Control Flow of Damping-Force Generating System

Figure 9:
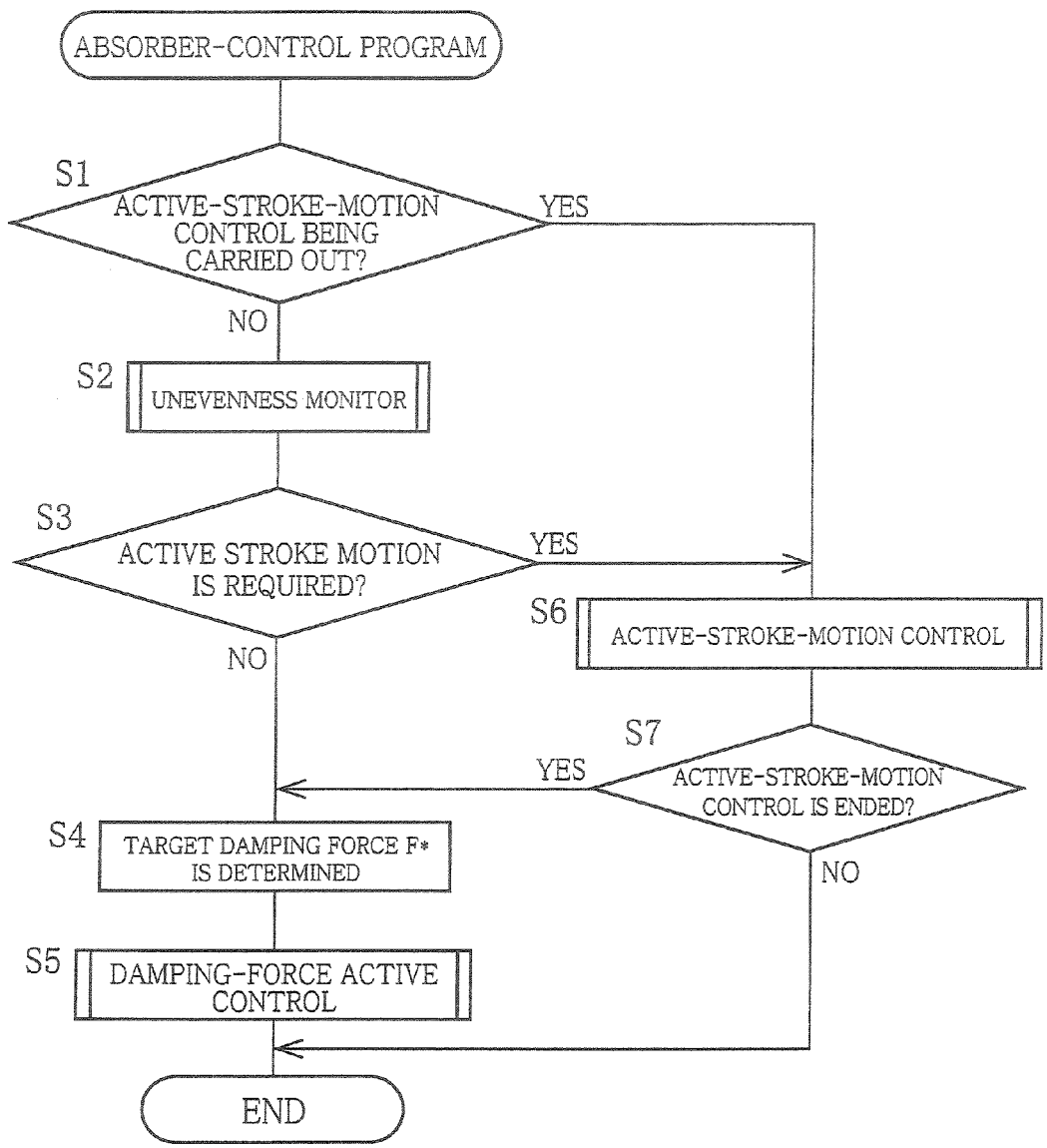
FIG. 9 is a flow chart showing a main routine of an absorber-control program as a control program for the damping-force generating system according to the first embodiment.

The control in the damping-force generating system, more specifically, the control of the absorber 18, is executed such that an absorber-control program indicated by a flow chart of FIG. 9 showing a main routine is repeatedly implemented by the ECU 14 at considerably short time intervals, e.g., from several milliseconds to several tons of milliseconds, with an ignition switch of the vehicle placed in an ON state. Hereinafter, there will be explained in detail a concrete control of the absorber 18 according to a flow of the absorber-control program. While, in the present suspension system, the control is executed for each of the four absorbers independently of each other, the following explanation is made for the control of one absorber 18 in the interest of brevity. It is noted that the control similar to that described below is executed for other absorbers 18.

Figure 10:
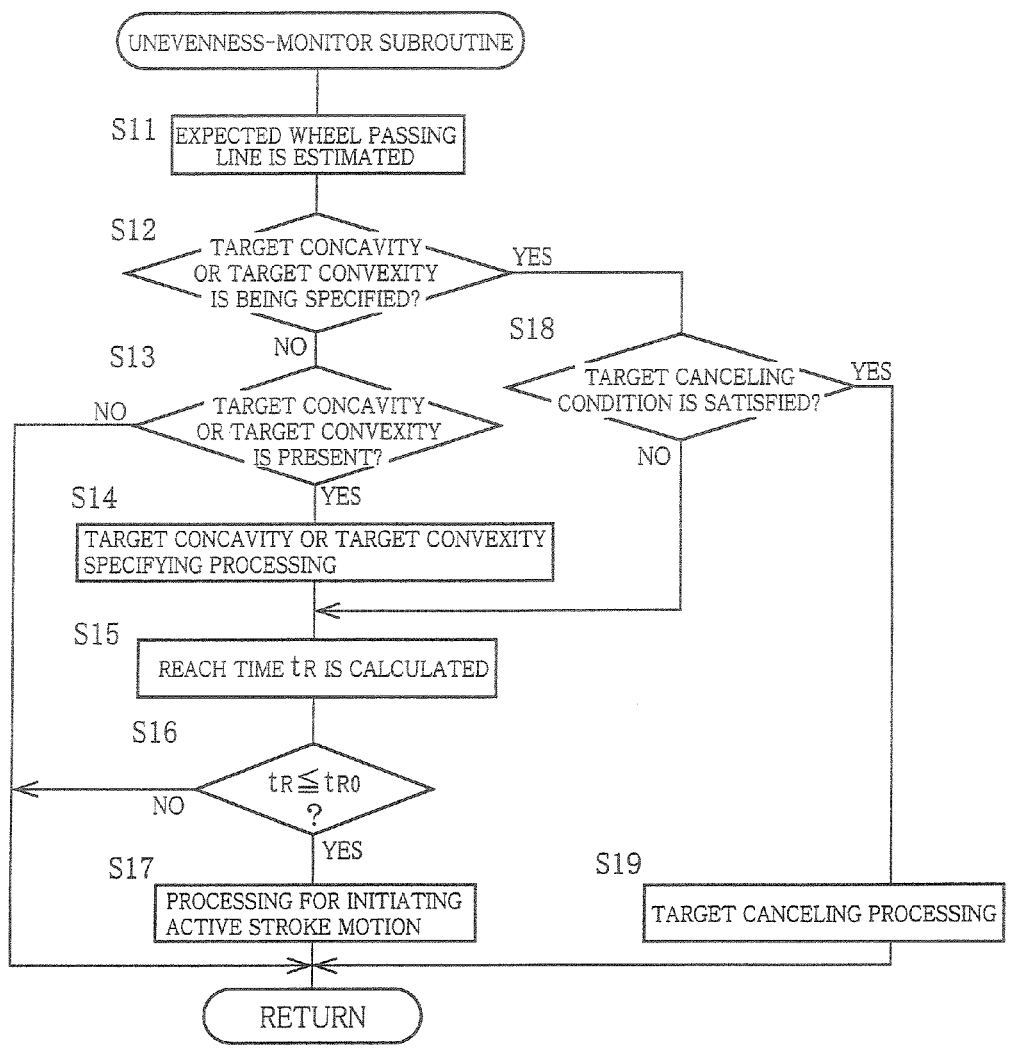
FIG. 10 is a flow chart showing an unevenness-monitor subroutine executed by execution of the absorber-control program in a control of the damping-force generating system according to the first embodiment.

The absorber-control program starts with step S1 (hereinafter "step" is omitted where appropriate) to judge whether or not the active stroke motion according to the unevenness-responsive control is being carried out. Described more specifically, the judgment is made based on whether an active-stroke-motion-initiation flag is in an ON state or not. The flag is placed in an OFF state when the program is initially implemented.

Where the active stroke motion is not being carried out, there is executed, in S2, an unevenness-monitor subroutine indicated by a flow chart of FIG. 10. The subroutine is for judging whether there exists a concavity or a convexity on the road surface for which the active stroke motion is required to be carried out, for specifying a target concavity or a target convexity when required, and for determining whether the active stroke motion needs to be initiated. In the subroutine, there is estimated, in S11, the expected wheel passing line on which the wheel 10 is expected to pass. Described in detail, on the basis of a value detected by the operation-angle sensor 44, there is estimated an expected running line of the vehicle along which the vehicle is expected to run. On the basis of the expected running line, there is specified data of the expected passing line of the wheel 10 for which the absorber 18 is provided, and the specified data is transmitted to the image processing unit 56. Next, it is judged in S12 whether the target concavity or the target convexity is already specified. Explained in detail, the judgment is made based on whether a target-specifying flag which will be explained is in an ON state or not. The target-specifying flag is placed in the ON state when the target concavity or the target convexity is specified. An explanation as to a case in which the target is specified will be made later, and an explanation here is made as to a case in which the target is not yet specified.

Where it is judged in S12 that the target concavity or the target convexity is not specified, S13 is implemented to judge whether there exists, on the expected wheel passing line, any concavity or convexity for which the active stroke motion is required to be carried out. On the basis of the data of the expected wheel passing line which has been transmitted and the image data obtained by the two CCD cameras 54 disposed at the front of the vehicle, the image processing unit 56 processes the image data, whereby there is specified, as the target concavity or the target convexity, a concavity or a convexity which exists on the expected wheel passing line and which has a size exceeding a predetermined size, namely, a concavity or a convexity whose step gradient is larger than a predetermined gradient and whose step amount is larger than a predetermined amount. A processing as to a case in which the target concavity or the target convexity exists will be made later, and an explanation here is made as to a case in which the target concavity or the target convexity does not exist. Accordingly, where the target concavity or the target convexity does not exist, the execution of the subroutine is ended with S13. As an algorism for specifying the target concavity or the target convexity by the image processing, there is employed a known algorism in which two images are handled as stereo images, thereby making it possible to specify a position, a size, etc., of a target object. The algorism is not so relevant to the technical features of the claimable invention and a detailed explanation of which is omitted here.

Where the execution of the unevenness-monitor subroutine is ended, it is judged in S3 of the main routine whether the active stroke motion needs to be carried out immediately. This judgment is made based on whether the active-stroke-motion-initiation flag which will be explained is in the ON state or not. An explanation as to a case in which the active stroke motion needs to be carried out immediately will be made later, and an explanation here is made as to a case in which the active stroke motion does not need to be carried out immediately.

Where it is judged in S3 that the active stroke motion does not yet need to be carried out, S4 is implemented to determine the target damping force F* for executing the damping-force active control. As explained above, the target damping force F* is determined as follows. Initially, the ride-comfort-control-damping-force component $F_N$, the roll-restraining-control-damping-force component $F_R$, and the pitch-restraining-control-damping-force component $F_P$ are determined. On the basis of those damping-force components, $F_N$, $F_R$, and $F_P$, the target damping force F* is calculated according to the following equation:

$$F^* = \alpha_N \cdot F_N + \alpha_R \cdot F_R + \alpha_P \cdot F_P$$

wherein $\alpha_N$, $\alpha_R$, and $\alpha_P$ are respectively suitable gains. More specifically explained, the ride-comfort-control-damping-force component $F_N$ is determined by obtaining a current state of the stroke motion which includes a stroke position, a stroke direction, a stroke speed, stroke acceleration, etc., on the basis of the values respectively detected by the sprung G sensor 30, the unsprung G sensor 32, and the stroke sensor 34, and by referring to map data which is stored in the ECU 14 and which depends on a ride-comfort-control rule. The roll-restraining-control-damping-force component $F_R$ is determined by referring to map data which is stored in the ECU 14 and which depends on predetermined roll stiffness distribution and a roll-restraining-control rule, on the basis of estimated lateral acceleration based on the values detected by the operation-angle sensor 44 and the wheel-speed sensor 46, actual lateral acceleration based on the value detected by the lateral G sensor 36, and a roll rate based on the value detected by the roll-rate sensor 40. The pitch-restraining-control-damping-force component $F_N$ is determined by referring to map data which is stored in the ECU 14 and which depends on a pitch-restraining-control rule, on the basis of actual longitudinal acceleration based on the value detected by the longitudinal G sensor 38 and a pitch rate based on the value detected by the pitch-rate sensor 42. In determining the damping-force components $F_N$, $F_R$, $F_P$, known control rules are used. The control rules are not so relevant to the technical features of the claimable invention and a detailed explanation of which is dispensed with. Values of the respective gains $\alpha_N$, $\alpha_R$, $\alpha_P$ are stored in the ECU 14 as values according to the known control rules.

Figure 11:
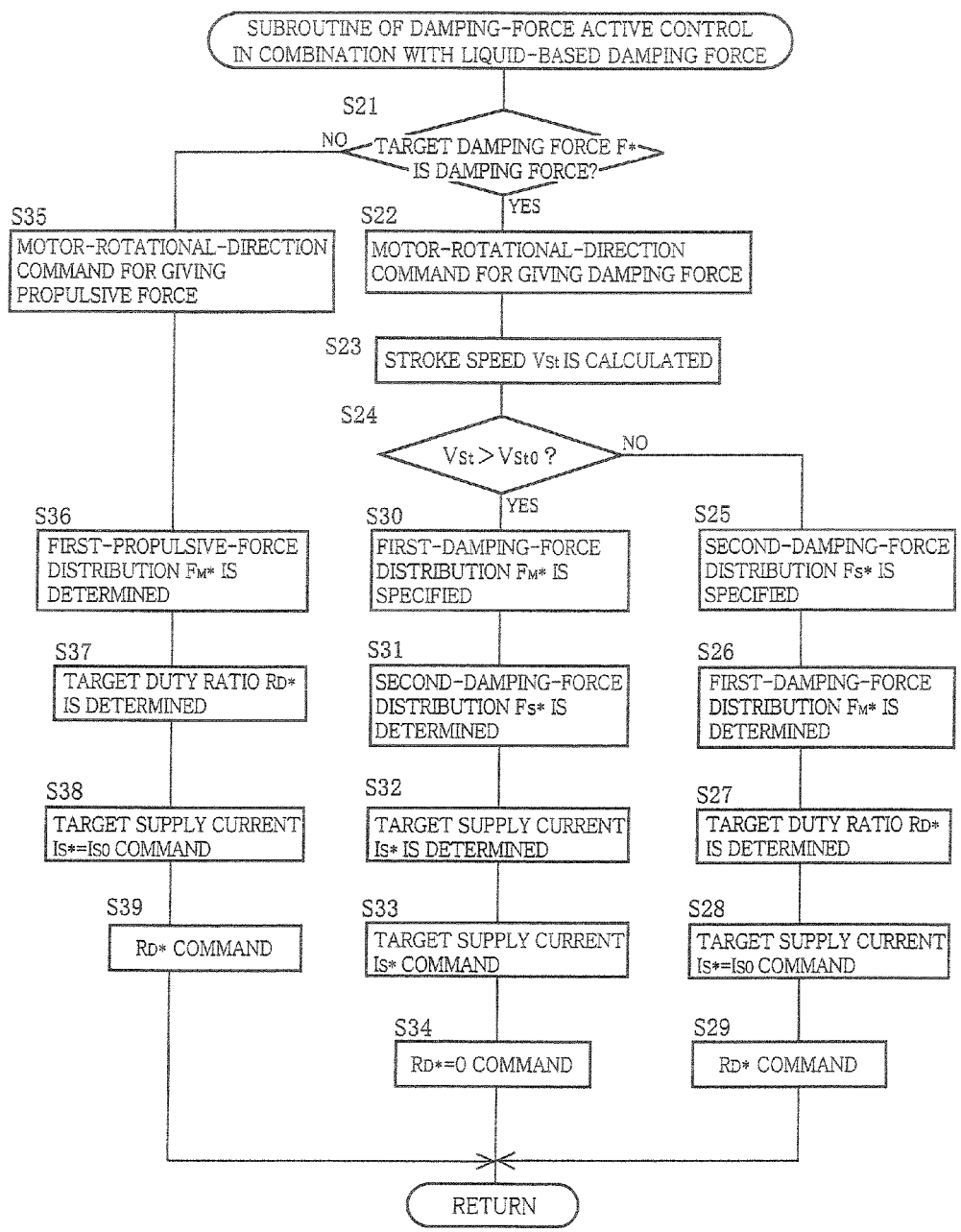
FIG. 11 is a flow chart showing a subroutine of damping-force active control in combination with liquid-based damping force, the subroutine being executed by execution of the absorber-control program in the control of the damping-force generating system according to the first embodiment.

After the target damping force F* is determined, there is executed in S5 a subroutine of damping-force active control in combination with liquid-based damping force, indicated by the flow chart of FIG. 11. In the subroutine, it is judged in S21 whether the target damping force F* determined in S4 is a damping force or a propulsive force. That is, the determined target damping force F* is judged to be the damping force where the rotational force of the motor 68 acts in a direction opposite to the direction of the stroke motion while the determined target damping force F* is judged to be the propulsive force where the rotational force of the motor 68 acts in the same direction as the direction of the stroke motion. Where the target damping force F* is the damping force, S22 is implemented to determine, as the torque-giving direction, a direction in which the damping force is given and to issue, to the inverter 22, a command to control the motor 68 to rotate in the direction. By this command, a changing pattern of phases to be electrified (i.e., electrified phases) is set in the inverter 22. Subsequently, in S23, the stroke speed $V_{St}$ is calculated. More specifically explained, the stroke speed $V_{St}$ is determined as a difference between a detected value by the stroke sensor 34 in the preceding execution of the present program and a detected value in the current execution of the program. After the stroke speed $V_{St}$ is calculated, it is judged in S24 whether the stroke speed $V_{St}$ exceeds the emf·source-voltage equalized speed $V_{St0}$ explained above.

Where it is judged in S24 that the stroke speed $V_{St}$ does not exceed the emf·source-voltage equalized speed $V_{St0}$, there are executed a series of processings in S25 and the subsequent steps. Initially, in S25, there is specified the second-damping-force distribution $F_S^*$ which is distribution of the damping force to the cylinder device 64. In a case where the stroke speed $V_{St}$ does not exceed the emf·source voltage-equalized speed $V_{St0}$, the solenoid 116 is placed in the energized state shown in FIG. 4(a) in which the cross sectional area of the fluid passage 94a is maximized to minimize the second damping force. Because the second damping force in that state is stored in the ECU 14 as map data according to the line L in the graph of FIG. 7, the second-damping-force distribution $F_S^*$ is specified referring to the data in the processing of S25. Subsequently, S26 is implemented to determine the first-damping-force distribution $F_M^*$ which is distribution of the damping force that depends on the force of the motor 68. Explained in more detail, the second-damping-force distribution $F_S^*$ specified in S25 is subtracted from the determined target damping force F*, and a value obtained by the subtraction is determined as the first-damping-force distribution $F_M^*$. Subsequently, in S27, the target duty ratio $R_D^*$ used in the electrifying control of the motor 68 is determined. The target duty ratio $R_D^*$ for the first-damping-force distribution $F_M^*$ is stored in the ECU 14 as map data. By referring to the map data, the target duty ratio $R_D^*$ is determine. Next, in S28, there is issued, to the driver 24, a command to set a target supply current value $I_S^*$ to the solenoid 116 at a preset current value, namely, a preset current value $I_{S0}$ which is preset so as to permit the cross sectional area of the fluid passage 94a to be maximized. Subsequently, in S29, there is issued, to the inverter 22, a command to control the motor 68 according to the determined target duty ratio $R_D^*$. Based on the commands described above, the driver 24 and the inverter 22 respectively control the solenoid 116 and the motor 68 to be operated.

Where it is judged at S24 that the stroke speed $V_{St}$ exceeds the emf·source-voltage equalized speed $V_{St0}$, a series of processings in S30 and the subsequent steps are executed. Initially, in S30, the first-damping-force distribution $F_M^*$ is specified. As explained above, in a case where the stroke speed $V_{St}$ exceeds the emf·source-voltage equalized speed $V_{St0}$, the damping force cannot be controlled sufficiently. In view of this, the first-damping-force distribution $F_M^*$ is determined to be a value of the damping force in a state in which the electric current is not supplied to the motor 68 from the battery, namely, a prescribed value according to the above-indicated short-circuit characteristic. The prescribed value is stored in the ECU 14 and the first-damping-force distribution $F_M^*$ is specified on the basis of the stored prescribed value. Next, in S31, the second-damping-force distribution $F_S^*$ is determined. Explained in more detail, the first-damping-force distribution $F_M^*$ specified in S31 is subtracted from the determined target damping force F*, and a value obtained by the subtraction is determined as the second-damping-force distribution $F_S^*$. Subsequently, in S32, the target supply current value $I_S^*$ to be supplied to the solenoid 116 is determined on the basis of the determined second-damping-force distribution $F_S^*$. There is stored, in the ECU 14, map data according to the graph of FIG. 7, more specifically, data of the target supply current value $I_S^*$ with respect to the stroke speed $V_{St}$ and the second-damping-force distribution $F_S^*$. The target supply current value $I_S^*$ is determined referring to the data. S32 is followed by S33 in which the determined target supply current value $I_S^*$ is sent to the driver 24 as a command. Subsequently, in S34, the target duty ratio $R_D^*$ is made zero, and there is issued, to the inverter 22, a command to control the motor 68 according to the target duty ratio $R_D^*$ that is determined to be zero. Based on the commands described above, the driver 24 and the inverter 22 respectively control the solenoid 116 and the motor 68 to be operated.

Where it is judged in S21 that the target damping force F* is the propulsive force, S35 is implemented to determine, as the torque-giving direction, a direction in which the propulsive force is given and to issue, to the inverter 22, a command to control the motor 68 to rotate in the direction. By this command, the changing pattern of the electrified phases is set in the inverter 22. Subsequently, in S36, there is determined a first-propulsive-force distribution $F_M^*$. As explained above, in generating the propulsive force also, the solenoid 116 is placed in the energized state in which the cross sectional area of the fluid passage 94a is maximized, and the cylinder device 64 generates a certain degree of damping force in a direction to counter the propulsive force. Accordingly, the damping force is identified referring to the map data explained above, and the first-propulsive-force distribution $F_M^*$ is determined to be a value which compensates a decrease in the target damping force F* determined as the propulsive force, which decrease corresponds to the damping force as identified above. Subsequently, in S37, the target duty ratio $R_D^*$ for the electrifying control of the motor 68 is determined referring to the map data explained above. S37 is followed by S38 in which there is issued, to the driver 24, a command to set the target supply current value $I_S^*$ to be supplied to the solenoid 116 at the preset current value $I_{S0}$ which is set so as to permit the cross sectional area of the fluid passage 94a to be maximized. Then in S39, there is issued, to the inverter 22, a command to control the motor 68 according to the determined target duty ratio $R_D^*$. Based on the commands described above, the driver 24 and the inverter 22 respectively control the solenoid 116 and the motor 68 to operate.

Next, there will be explained a control flow in the case where the target concavity or the target convexity exists in execution of the unevenness-monitor subroutine of S2. Where it is judged in S13 that the target concavity or the target convexity exists, namely, where it is judged that there is obtained information from the image processing unit 56 that the target concavity or the target convexity exists, S14 is implemented to perform a processing for specifying the target concavity or the target convexity. More specifically explained, there is obtained from the image processing unit 56, information that the existing target is either the concavity or the convexity and information such as a distance of the target concavity or the target convexity from the wheel 10, a width of the target concavity or the target convexity, a position of the target concavity or the target convexity in the vehicle width direction with respect to the wheel 10 as a reference, etc. Further, the target-specifying flag is placed in the ON state. In the present program, because the control based on the target-specifying flag is carried out, the target concavity or the target convexity which has been once specified is kept specified until a canceling processing (which will be explained) is performed. After the specifying processing described above has been performed, S15 is implemented to calculate the reach time $t_R$ which is a time required for the wheel 10 to reach the target concavity or the target convexity. Explained more specifically, the required reach time $t_R$ is obtained by dividing the distance from the wheel 10 to the target concavity or the target convexity by the vehicle running speed based on the value detected by the wheel-speed sensor 46. Subsequently, it is judged in S16 whether the reach time $t_R$ is not greater than the reference time $t_{R0}$. The reference time $t_{R0}$ is so defined that the active stroke motion needs to be initiated when the reach time $t_R$ becomes equal to the reference time $t_{R0}$. More specifically described, if the active stroke motion is initiated when the reach time to becomes equal to the reference time $t_{R0}$, the active stroke motion will have been completed at a time when the wheel 10 reaches the target concavity or the target convexity. The reference time $t_{R0}$ is determined depending upon the vehicle running speed each time when S15 is implemented. Where the reach time $t_R$ is not greater than the reference time $t_{R0}$, there is performed, in S17, a processing for initiating the active stroke motion, namely, a processing to place the active-stroke-motion-initiation flag in the ON state, and the current execution of the subroutine is ended. On the other hand, where the reach time $t_R$ is larger than the reference time $t_{R0}$, the flag is kept placed in the OFF state, and the current execution of the subroutine is ended.

Where it is judged in S13 that the target concavity or the target convexity exists and the processing for specifying the target concavity or the target convexity has been performed in S14, it is judged in S12 that the target concavity or the target convexity is already specified, based on the fact that the target-specifying flag is set at the ON state, in the subsequent execution of the program. In this instance, S18 is implemented to judge whether a target canceling condition is satisfied or not to thereby judge whether the specified target concavity or convexity should be canceled or not. The target canceling condition is so determined as to include a criterion that the target concavity or the target convexity is not on the expected wheel passing line estimated in S11. More specifically, it is judged whether the target canceling condition is satisfied or not, on the basis of the width, the position in the vehicle width direction, of the target concavity or the target convexity, and the like. Where it is judged in S18 that the target canceling condition is not satisfied, the specified target concavity or convexity is maintained, and the processings in S15 and the subsequent steps explained above are conducted. In this instance, in the processing of S15, the reach time $t_R$ is updated based on a time elapsed after the previous execution of the program, and the vehicle running speed. On the other hand, where it is judged in S18 that the target canceling condition is satisfied, S19 is implemented to conduct, as the target canceling processing, a processing to place the target-specifying flag being set at the ON state into the OFF state, and the current execution of the program is ended.

Figure 12:
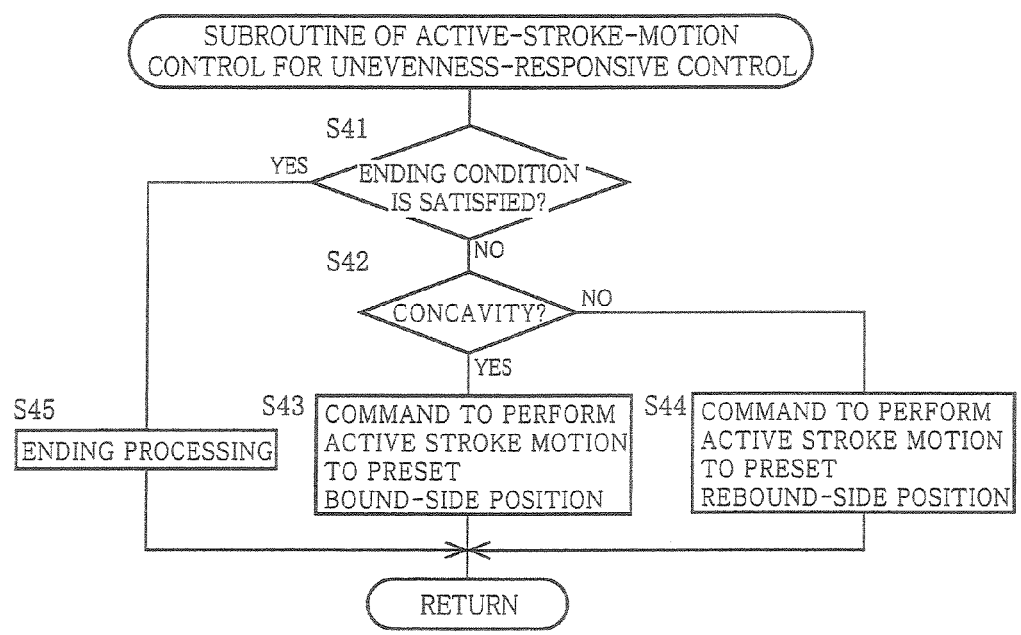
FIG. 12 is a flow chart showing a subroutine of active-stroke-motion control for unevenness-responsive control executed by execution of the absorber-control program in the control of the damping-force generating system according to the first embodiment.

When the execution of the unevenness-monitor subroutine in S2 is ended, it is judged in S3 that an active-stroke-motion control needs to be immediately executed where the active-stroke-motion-initiation flag is in the ON state. In this instance, there is executed in S6 a subroutine of active-stroke-motion control for unevenness-responsive control, indicated by a flow chart of FIG. 12. The subroutine is started with S41 to judge whether an ending condition for ending the active stroke motion being already performed are satisfied or not. The ending condition includes the following two criteria: (1) the reach time $t_R$ falls within a predetermined time close to zero; and (2) the stroke position is located at the preset bound-side position or the preset rebound-side position explained below. Where either one of the two criteria is satisfied, it is judged that the ending condition is satisfied. In this respect, the judgment whether the stroke position is located at the preset bound-side position or the preset rebound-side position is made based on the value detected by the stroke sensor 34. As a result of the judgment in S41, in short, where it is considered that the wheel 10 has already reached the target concavity or the target convexity or where it is considered that the active stroke motion has been completed, the active-stroke-motion control is arranged to be ended.

Where the ending condition is not satisfied, S42 is implemented to judge whether the target is either the concavity or the convexity, on the basis of the information obtained in the target-specifying processing. Where the target is the concavity, S43 is implemented to issue a command to carry out the active stroke motion in which the wheel 10 and the mount portion 66 move relative to each other to the preset bound-side position which is set as a relative position near to the bound-side end in the range of the stroke motion, on the basis of the detected value of the stroke sensor 34. The active stroke motion is desirably carried out at a comparatively high speed. In the light of this, there is set, as the target duty ratio $R_D^*$, a duty ratio by which a large propulsive force is obtained. Accordingly, there is issued, to the inverter 22, a command to control the motor 68 according to the target duty ratio $R_D^*$ for the purpose of giving the propulsive force in a direction toward the preset bound-side position. Further, in order to minimize the damping force to be generated by the cylinder device 64, there is issued, to the driver 24, the command to set the target supply current value $I_S^*$ to be supplied to the solenoid 116 at the preset current value $I_{S0}$, as explained above. By the controls based on those commands, the active stroke motion toward the preset bound-side position is carried out to secure a stroke amount in the rebound direction upon passing the concavity.

Where it is judged in S42 that the target is the convexity, S44 is implemented to issue a command to carry out the active stroke motion in which the wheel 10 and the mount portion 66 move relative to each other to the preset rebound-side position which is set as a relative position near to the rebound-side end in the range of the stroke motion, on the basis of the detected value of the stroke sensor 34. As in S43, there is issued, to the inverter 22, a command to control the motor 68 according to the target duty ratio $R_D^*$ for the purpose of giving the propulsive force in a direction toward the preset rebound-side position. Further, there is issued, to the driver 24, the command to set the target supply current value $I_S^*$ to be supplied to the solenoid 116 at the preset current value $I_{s0}$, as explained above. By the controls based on those commands, the active stroke motion toward the preset rebound-side position is carried out to secure a stroke amount in the bound direction upon passing the convexity.

Where it is judged in S41 that the above-described ending condition is satisfied, there are issued no commands relating to the active stroke motion, and the control flow goes to S45 to perform, as an ending processing, a processing to place the active-stroke-motion-initiation flag into the OFF state. When the active-stroke-motion-initiation flag is in the OFF state, the damping-force active control according to the processings of S4, S5 is executed. Owing to the control flow described above, the damping-force active control and the active-stroke-motion control are selectively executed in the program. It is noted that, once the active stroke motion has been initiated, the active stroke motion is continued to be executed, based on the judgment in S1, in subsequent execution of the program until the above-described ending condition is satisfied.

vii) Functional Structure of Electronic Control Unit

Figure 13:
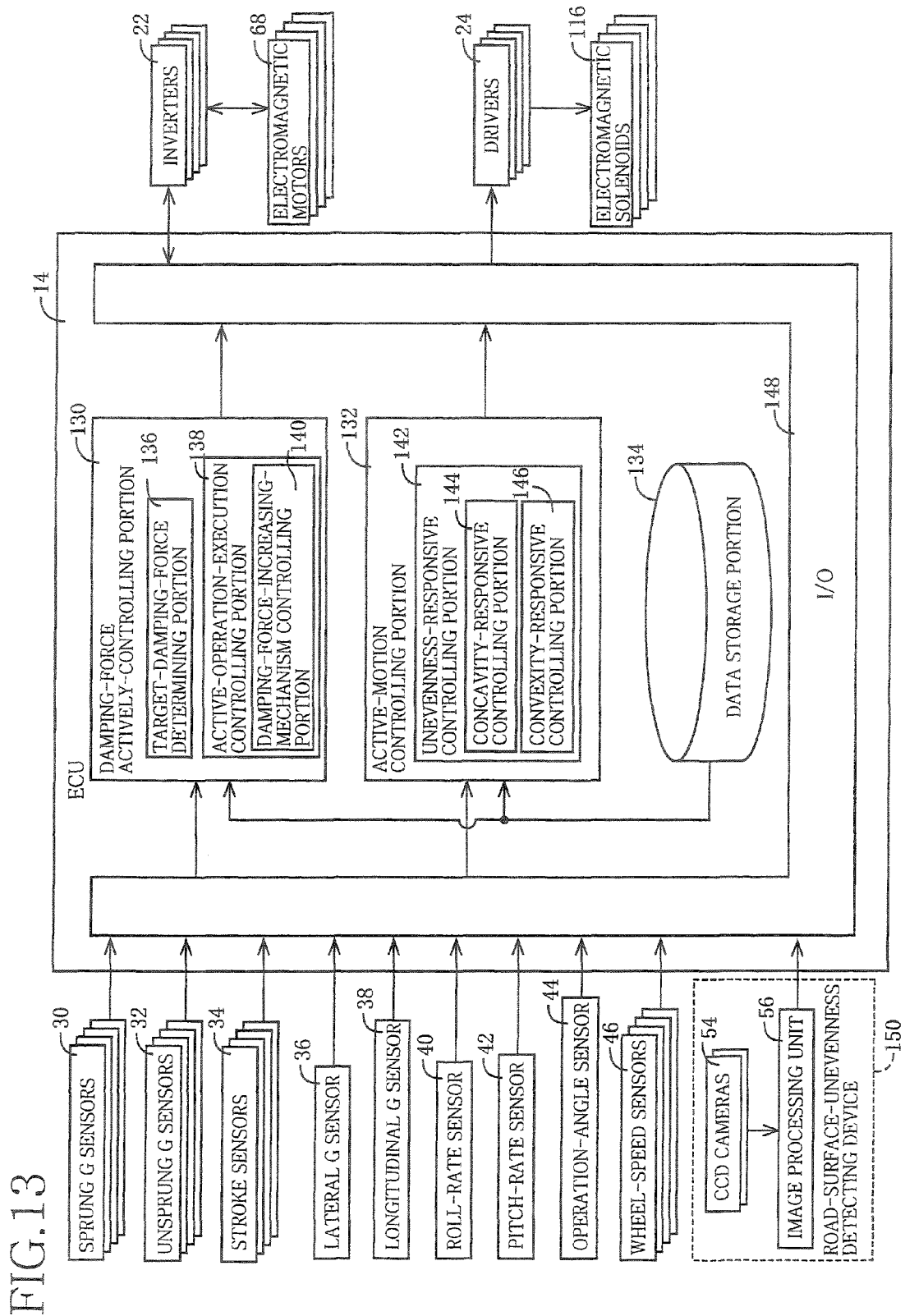
FIG. 13 is a block diagram relating to functions of an electronic control unit (ECU) of the suspension system of FIG. 1.

The functional structure of the ECU 14 which executes the control based on the above-described control flow is shown in FIG. 13. That is, the ECU 14 includes a damping-force actively-controlling portion 130 as a functional portion to execute the processings in S4 and S5, an active-motion controlling portion 132 as a functional portion to execute the processings in S2, S3, etc., and a data storage portion 134 which stores various data such as the above-indicated map data used in the controls by those functional portions. More specifically explained, the damping-force actively-controlling portion 130 includes a target-damping-force determining portion 136 as a functional portion to execute the processing in S4 and an active-operation-execution controlling portion 138 as a functional portion to execute the processing in S5. In the control by the active-operation-execution controlling portion 138, it is judged in the processing in S24 whether the stroke speed $V_{St}$ exceeds the emf•source-voltage equalized speed $V_{St0}$. Where the stroke speed $V_{St}$ exceeds the emf•source-voltage equalized speed $V_{St0}$, the processings in S30 and the subsequent steps are executed to increase the second damping force, as compared with the processings in S25 and the subsequent steps Accordingly, the active-operation-execution controlling portion 138 is configured to include a damping-force-increasing-mechanism controlling portion 140. The active-motion controlling portion 132 includes, as a functional portion to execute the unevenness-responsive control, an unevenness-responsive controlling portion 142 that includes a concavity-responsive controlling portion 144 to execute the processing in S43 and a convexity-responsive controlling portion 146 to execute the processing in S44. The functional portions indicated above are configured to obtain the detected signals and the like from the sensors 30-46 and the image processing unit 56 via an input/output interface 148 and to issue commands to the inverters 22 and the drivers 24. The thus structured ECU 14 according to the present embodiment functions as a damping-force-increasing-mechanism controlling device and as an active-motion controlling device. Further, a road-surface-unevenness detecting device 150 is constituted by including the two CCD cameras 54 and the image processing unit 56 ix) Modified Example

Figure 14:
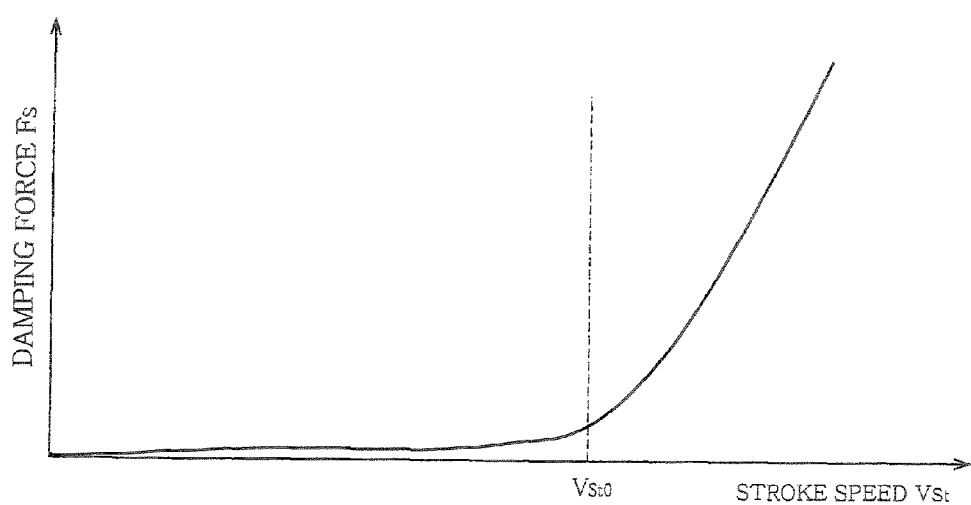
FIG. 14 is a graph showing a characteristic of a damping force generated by the cylinder device with respect to a stroke speed, the characteristic being employable in the damping-force generating system according to the first embodiment and different from the characteristic shown in the graph of FIG. 7.

In the illustrated first embodiment, the cylinder device 64 functioning as the second damping-force generating device is configured to generate the damping force $F_S$ shown in the graph of FIG. 7 and to steplessly vary the second damping force $F_S$ when the stroke speed $V_{St}$ exceeds the emf•source voltage-equalized speed $V_{St0}$ as explained above. In place of such a configuration, the cylinder device 64 may be configured to increase the second damping force $F_S$ up to a predetermined value without steplessly varying the second damping force $F_S$. For instance, the cylinder device 64 may be configured to generate the second damping force $F_S$ along the line U in the graph of FIG. 7 by placing the solenoid 116 into the non-energized state when the stroke speed $V_{St}$ exceeds the emf•source-voltage equalized speed $V_{St0}$. Further, in the illustrated first embodiment, the cylinder device 64 is configured to increase the second damping force $F_S$ owing to the actuation of the solenoid 116. Instead of employing such a mechanism, the cylinder device 64 may be configured to generate the second damping force $F_S$ with a large magnitude when the stroke speed $V_{St}$ exceeds the emf•source-voltage equalized speed $V_{St0}$, by appropriately designing the mechanical structure of the orifice-functioning portion of the fluid passage of the piston 94. For instance, the cylinder device 64 may be configured such that a gradient of an increase in the second damping force $F_S$ with respect to an increase in the stroke speed $V_{St}$ is made larger when the stroke speed $V_{St}$ exceeds the emf•source-voltage equalized speed $V_{St0}$, than when the stroke speed $V_{St}$ does not exceed the emf•source-voltage equalized speed $V_{St0}$, as shown in the graph of FIG. 14. By employing various second damping-force generating devices exemplified above, it is possible to appropriately deal with the problems experienced in the first damping-force generating device that depends on the motor 68, such as the deterioration of the controllability and the insufficiency of the damping force in the high-speed motion.

In the illustrated first embodiment, the control is executed based on the emf•source-voltage equalized speed $V_{St0}$ as a preset speed. It is possible to execute a control based on other preset speed that is related or non-related to the emf•source-voltage equalized speed $V_{St0}$. Further, in the illustrated first embodiment, the unevenness-responsive control is executed as the active-motion control. The unevenness-responsive control may not be executed. Further, instead of the unevenness-responsive control, there may be executed an unevenness-following control which will be explained below, for instance.

2. Second Embodiment

There will be next explained a second embodiment which relates to a damping-force generating system including two electromagnetic absorber devices which respectively employ electromagnetic motors and which have mutually different damping-force characteristics, in more detail, a damping-force generating system in which the characteristics of the rotational torque of the two electromagnetic motors are different form each other. In the second embodiment and the following embodiments, the same reference numerals as used in the illustrated first embodiment are used to identify the corresponding components and a detailed explanation of which is dispensed with.

i) Overall Structure of Suspension System

A suspension system for a vehicle in which is employed a damping-force generating system according to the second embodiment has an overall structure similar to that of the system according to the illustrated first embodiment shown in FIG. 1. It is noted, however, that the hydraulic absorber device used in the system of the first embodiment is not employed in the system of the second embodiment and that the system of the second embodiment does not include the drivers 24 used in the system of the first embodiment. In contrast, since each absorber device includes the two electromagnetic motors, each suspension apparatus 12 includes two inverters 22 which are distinguished from each other, if necessary, as "first inverter 22A" and "second inverter 22B".

ii) Structure of Absorber

Figure 15:
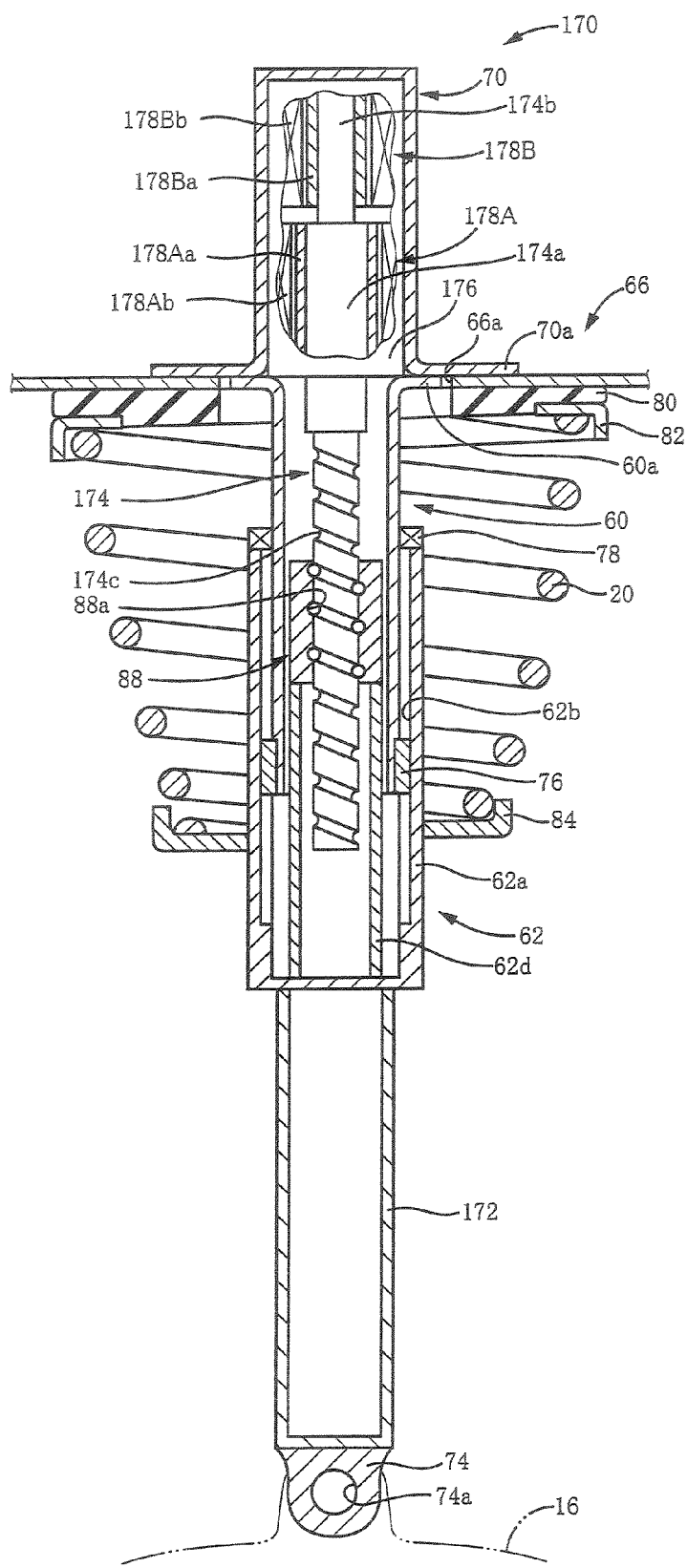
FIG. 15 is a cross-sectional view of an absorber of a damping-force generating system according to a second embodiment of the claimable invention.

FIG. 15 shows a cross-sectional view of an absorber in each suspension apparatus. The absorber 170 in the second embodiment does not include the cylinder device 64, unlike the absorber 18 (FIG. 2) in the first embodiment. In place of the cylinder device 64, the absorber 170 includes a lower cylindrical member 172 which has a closed end and which is fixed at its upper end to an outer surface of a bottom of the main body 62a of the lower tube 62. The support tube 62d that supports the nut member 88 is fixed to an inner surface of the bottom of the main body 62a of the lower tube 62. Since the absorber 170 does not have the cylinder device 64, the absorber 170 does not have the piston rod 96, unlike the absorber 18 in the first embodiment. Further, a rod member 174 of the absorber 170 is not hollow.

The absorber 170 includes two electromagnetic motors disposed coaxially with each other, namely, a first motor 178A and a second motor 178B accommodated in a common housing 176. The first motor 178A is disposed at a lower portion in the housing 176 while the second motor 178B is disposed at an upper portion in the housing 176. In the absorber 170, the rod member 174 extends into the housing 176 and functions as motor shafts of the first and second motors 178A, 178B. More specifically explained, a plurality of first permanent magnets 178Aa functioning as a rotor of the first motor 178A are attached to an outer circumference of a first motor-shaft portion 174a which is a portion of the rod member 174 functioning as the motor shaft of the first motor 178A. Similarly, a plurality of second permanent magnets 178Ba functioning as a rotor of the second motor 178B are attached to an outer circumference of a second motor-shaft portion 174b which is a portion of the rod member 174 functioning as the motor shaft of the second motor 178B. A plurality of first coils 178Ab functioning as a stator of the first motor 178A and a plurality of second coils 178Bb functioning as a stator of the second motor 178B are fixed to an inner circumferential surface of the housing 176 so as to face the first permanent magnets 178Aa and the second permanent magnets 178Ba, respectively. As will be explained in detail, the first motor 178A is configured as a low rotation motor (a low speed motor) while the second motor 178B is configured as a high rotation motor (a high speed motor). The second motor-shaft portion 174b of the rod member 174 has an outside diameter smaller than that of the first motor-shaft portion 174a of the rod member 174, thus contributing to a reduction in the inertia of the second motor 178B as the high rotation motor.

The rod member 174 on which an external thread 174c is formed is held in engagement with the nut member 88 through a boll screw mechanism. In the thus constructed absorber 170, when the stroke motion is carried out, the rod member 174 which functions as the motor shafts of the respective two motors 178A, 178B rotate in association with the relative movement of the rod member 174 and the nut member 88 in the axis direction, namely, the two motors 178A, 178B are rotated at the same rotational speed. In this instance, it is possible to generate, owing to the rotational force of at least one of the two motors 178A, 178B, the damping force or the propulsive force with respect to the stroke motion, as in the illustrated first embodiment.

The absorber 170 constructed as described above is equipped with two damping-force generating devices, i.e., two absorber devices. Explained in more detail, the absorber 170 includes, as a first damping-force generating device which is one of the two damping-force generating devices, an electromagnetic damping-force generating device constituted by including the first motor 178A, the rod member 174, the nut member 88, etc., and also includes, as a second damping-force generating device which is the other of the two damping-force generating devices, an electromagnetic damping-force generating device constituted by including the second motor 178B, the rod member 174, the nut member 88, etc. It may be considered that the first and second damping-force generating devices employ a common motive-force-converting mechanism constituted by the rod member 174 and the nut member 88 which are held in engagement with each other, namely, a common decelerating mechanism. Further, in the absorber 170, the first and second damping-force generating devices are configured to generate a first damping force and a second damping force, respectively, as in the illustrated first embodiment, and a sum of the first damping force and the second damping force corresponds to the damping force generated by the absorber 170.

iii) Damping Force by Two Motors

Like the motor 68 in the first embodiment, each of the two motors 178A, 178B of the absorber 170 is a star-connected, three-phase DC brushless motor. The first and the second motors 178A, 178B are respectively controlled by the inverter 22A and the inverter 22B similar to the inverter 22 in the first embodiment shown in FIG. 5.

Figure 16:
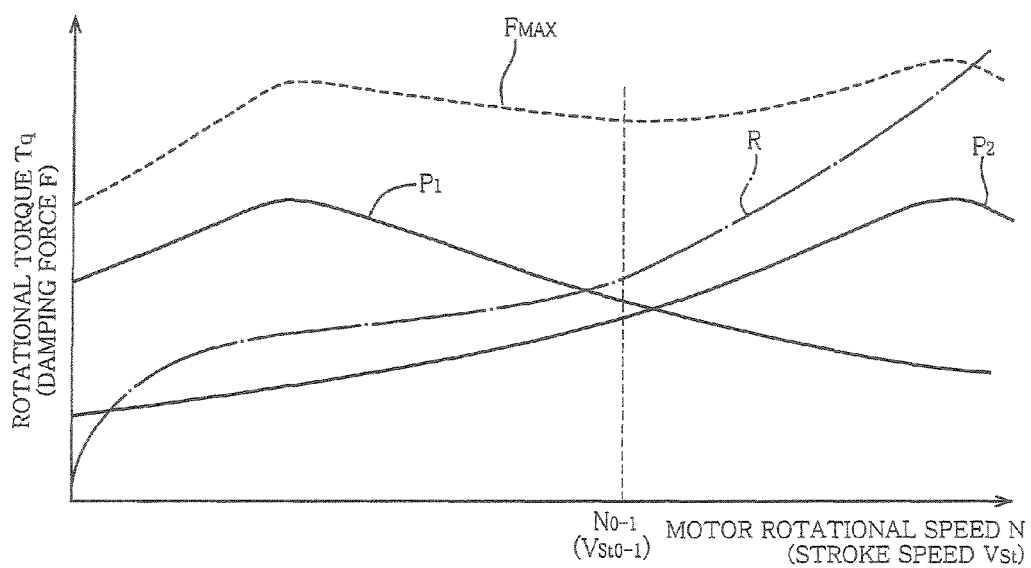
FIG. 16 is a graph showing rotational-speed•rotational-torque characteristics of two electromagnetic motors of the absorber of FIG. 15.

FIG. 16 is a graph showing rotational-speed•rotational-torque characteristics of the two motors 178A, 178B. Like the graph of FIG. 6 explained above, the graph of FIG. 16 indicates a relationship between motor rotational speed N and rotational torque Tq that can be generated. That is, the graph indicates a relationship between stroke speed $V_{St}$ which is a speed of the stroke motion and generation force F that can be generated with respect to the stroke motion, in the first and second damping-force generating devices constituted by including the motor 178A and the motor 178B, respectively. In the graph of FIG. 16, however, a characteristic line with respect to the active motion of each motor 178A, 178B is omitted and there are shown only characteristic lines $P_1$ and $P_2$ indicative of the damping forces that can be generated, with respect to the passive motion, by the first and second damping-force generating devices, respectively.

As apparent from the graph of FIG. 16, the first motor 178A is constructed as the low rotation motor which has the rotational-speed•rotational-torque characteristic substantially similar to that of the motor 68 in the illustrated first embodiment. In contrast, the second motor 178B is constructed as the high rotation motor by making the time constant small, for instance. That is, concerning the characteristic with respect to the passive motion, the second motor 178B is constructed as a motor capable of generating a large rotational torque in the high rotation speed range, i.e., as a motor capable of giving a large damping force with respect to the high-speed stroke motion. Accordingly, a sum of the first damping force that can be generated by the first damping-force generating device and the second damping force that can be generated by the second damping-force generating device, namely, a maximum damping force to be obtained in the absorber 170, has a characteristic indicated by a line $F_{MAX}$ (a broken line) in the graph of FIG. 16. It is noted that the maximum damping force exceeds, in a substantially entire range of the operational speed, the damping force demanded of the absorber 170 indicated by a line R (a one-dot chain line). In other words, by utilizing the low rotation motor and the high rotation motor in combination, a sufficient damping force can be obtained over a wide range of the stroke speed without upsizing the motor.

The two motors will be explained from the viewpoint of a relationship between electromotive force and power source voltage. In the first motor 178A, the stroke speed $V_{St}$ reaches the emf•source-voltage equalized speed $V_{St0-1}$ at a level similar to that in the motor 68 of the first embodiment. In contrast, in the second motor 178B constructed as the high rotation motor, the emf•source-voltage equalized speed $V_{St0-2}$ is high and the stroke speed $V_{St}$ within the range shown in the graph of FIG. 16 does not reach the emf•source-voltage equalized speed $V_{St0-2}$. In the absorber 170, therefore, it is possible to sufficiently cover a deterioration in the controllability of the damping force generated by the first motor 178A caused when the stroke speed $V_{St}$ exceeds the emf•source-voltage equalized speed $VS_{t0-1}$, by controlling the damping force generated by the second motor 178B.

iv) Outline of Damping-Force Active Control

In the damping-force generating system according to the second embodiment, the damping-force active control is also executed. More specifically explained, the target damping force F* is determined based on the vehicle running condition, the vehicle posture, and so on. The determined target damping force F* is suitably distributed to the first damping force by the first damping-force generating device and the second damping force by the second damping-force generating device. On the basis of the distribution, the first and second damping-force generating devices are operated while being suitably controlled. The determination of the target damping force F* is conducted according to a manner similar to that in the illustrated first embodiment, and a detailed explanation of which is not given here.

In the damping-force generating system according to the second embodiment, there are three modes in relation to the distribution of the target damping force F*, i.e., a damping-force-equal-distribution mode, a one-motor-non-electrifying mode, and a one-motor-regenerative-operation mode. These modes are arbitrarily selected by a user of the vehicle on which the present damping-force generating system is installed. That is, in the present damping-force generating system, there is executed one of three kinds of damping-force active control, i.e., a damping-force-equal-distribution control, a one-motor-non-electrifying control, and a one-motor-regenerative-operation control, selected by the user. Hereinafter, the outlines of the respective three controls are explained.

In the damping-force-equal-distribution control, a first-damping-force distribution $F_1^*$ which is a distribution of the target damping force F* for the first damping force and a second-damping-force distribution $F_2^*$ which is a distribution of the target damping force F* for the second damping force $F_2^*$ are basically made equal to each other. It is noted that, where the stroke speed $V_{St}$ exceeds the emf•source-voltage equalized speed $V_{St0-1}$ for the first motor 178A, the first-damping-force distribution $F_1^*$ is determined to have a suitable magnitude according to the short-circuit characteristic of the first motor 178A as explained above in the illustrated first embodiment or the first-damping-force distribution $F_1^*$ is determined to be made substantially zero by placing the first motor 178A into a non-electrified state as explained below. However, where the target damping force F* is equally distributed for the first-damping-force distribution $F_1^*$ and the second-damping-force distribution $F_2^*$, the damping force may be insufficient relative to the target damping force F* in some cases, due to the damping-force characteristic of any one of the first damping force and the second damping force. In this instance, the first-damping-force distribution $F_1^*$ and the second-damping-force distribution $F_2^*$ are determined so as to cover the above-described shortage of the damping force by increasing the first damping force when the stroke speed $V_{St}$ is not higher than the emf•source-voltage equalized speed $V_{St0-1}$ and by increasing the second damping force where the stroke speed $V_{St}$ exceeds the emf•source-voltage equalized speed $V_{St0-1}$. Then, on the basis of the first-damping-force distribution $F_1^*$ and the second-damping-force distribution $F_2^*$ determined as described above, there is determined the target duty ratio $R_{D-1}^*$, $R_{D-2}^*$ or an operational form for each of the first and second motors 178A, 178B, based on which the first motor 178A and the second motor 178B are operated while being controlled.

In the one-motor-non-electrifying control, the target damping force F* is distributed basically to only one of the first damping-force generating device and the second damping-force generating device, and one of the first and the second motors 178A, 178B of the other of the first and the second damping-force generating devices is placed in the non-electrified state. The term "non-electrified state" used herein means an operational form of the motor in which all of the six switching elements of the inverter 22 are placed in the open (OFF) state. For instance, such an operational form can be established by cutting off connection between the motor and the inverter by means of another switch which is operated by the inverter. In the operational form described above, there is generated no electromotive force in the motor, whereby the rotational resistance of the motor can be made as small as a cogging torque. In this connection, where the stroke speed $V_{St}$ is not higher than the emf•source-voltage equalized speed $V_{St0-1}$, the motor may be placed in the non-electrified state by setting the duty ratio at substantially zero while changing the electrified phases of the motor. By employing the non-electrified state, it is possible to effectively prevent the damping-force generating device whose motor is placed in the non-electrified state from adversely influencing the damping force of the other damping-force generating device. In the one-motor-non-electrifying control, where the stroke speed $V_{St}$ is not higher than the emf•source-voltage equalized sped $V_{St0-1}$, the first-damping-force distribution $F_1^*$ is determined to be equal to the target damping force F* while the second motor 178B is kept in the non-electrified state. On the other hand, where the stroke speed $V_{St}$ exceeds the emf•source-voltage equalized speed $V_{St0-1}$, the second-damping-force distribution $F_2^*$ is determined to be equal to the target damping force F* while the first motor 178A is kept in the non-electrified state. However, in a case where only one of the first damping force and the second damping force is insufficient relative to the target damping force F*, the first-damping-force distribution $F_1^*$ and the second-damping-force distribution $F_2^*$ are determined such that the other of the first damping force and the second damping force covers the shortage. Then, on the basis of the first-damping-force distribution $F_1^*$ and the second-damaging-force distribution $F_2^*$ determined as described above, there is determined the target duty ratio $R_{D-1}^*$, $R_{D-2}^*$ or an operational form for each of the first and second motors 178A, 178B, based on which the first motor 178A and the second motor 178B are operated while being controlled.

In the one-motor-regenerative-operation control, as a rule, one of the first motor 178A and the second motor 178B is preferentially controlled to perform the regenerative operation. That is, the first-damping-force distribution $F_1^*$ and the second-damping-force distribution $F_2^*$ are determined such that one of the two motors 178A, 178B is placed in a regenerative braking state to the extent possible. The term "regenerative braking state" used herein means an operational form in which the battery 26 is charged with the electromotive force of the motor. In short, the regenerative braking state is an operational form established in a state in which there is generated a damping force smaller than a specific threshold damping force that is specified in relation to the motor rotational speed. In the regenerative braking state, the electric power of the battery 26 is not consumed. In this respect, the one-motor-regenerative-operation control is excellent in power saving. In the one-motor-regenerative operation control, the first-damping-force distribution $F_1^*$ and the second-damping-force distribution $F_2^*$ are determined such that the first motor 178A is placed in the regenerative braking state where the stroke speed $V_{St}$ is not higher than the emf•source-voltage equalized speed $V_{St0-1}$ while the second motor 178B is placed in the regenerative braking state where the stroke speed $V_{St}$ exceeds the emf•source-voltage equalized speed $V_{St0-1}$. However, when the damping force is insufficient relative to the target damping force F* even if one of the two motors 178A, 178 is kept in the regenerative braking state and the damping-force generating device having the other of the two motors 178A, 178B generates the damping force to the fullest extent, the first-damping-force distribution $F_1^*$ and the second-damping-force distribution $F_2^*$ are determined such that the above-indicated one motor is placed in a plugging state. The term "plugging state" used herein means an operational form in which the electric current substantially supplies from the battery 26 to the motor. In such an operational form, though the electric power of the battery 26 is consumed, a large rotational torque can be generated. In short, the plugging state is an operational form established in a state in which there is generated a damping force larger than the above-indicated threshold damping force. On the basis of the first-damping-force distribution $F_1^*$ and the second-damping-force distribution $F_2^*$ determined as described above, there is determined the target duty ratio $R_{D-1}^*$, $R_{D-2}^*$ or an operational form for each of the first and second motors 178A, 178B, based on which the first motor 178A and the second motor 178B are operated while being controlled.

In any of the above-described three controls, where the target damping force $F^*$ is the propulsive force, the target damping force $F^*$ is preferentially distributed for the second damping force for the reason that the second motor 178B can generate the propulsive force at a higher rotational speed.

v) Outline of Active-Motion Control

As in the suspension system according to the illustrated first embodiment, the active-motion control (positive-motion control) is executed in addition to the damping-force active control, in the suspension system according to the second embodiment. The active-motion control and the damping-force active control are selectively executed. The active-motion control in the present embodiment aims at stabilizing the posture of the vehicle body by positively moving the wheel 10 upward and downward along a large extent of unevenness (i.e., the concavity and the convexity) of the road surface in view of the fact that the damping-force active control cannot adequately deal with such unevenness of the road surface as explained above. In other words, the present active-motion control is an unevenness-following control for permitting the active stroke motion (positive stroke motion) to be carried out by the drive force of the motors 178A, 178B such that the movement of the wheel 10 follows a configuration of the concavity or the convexity of the road surface when passing the concavity or the convexity.

As in the unevenness-responsive control in the illustrated first embodiment, in the unevenness-following control, the concavity or the convexity that cannot be dealt with by the damping-force active control is specified as the target concavity or the target convexity. The unevenness-following control is executed for the specified target concavity or convexity. As in the control in the first embodiment, the reach time required for the wheel 10 to reach the target concavity or the target convexity is calculated. On the basis of the calculated reach time, the judgment of reaching of the wheel 10 to the target concavity or the target convexity is made, and the active stroke motion is executed during passage of the target concavity or the target convexity, such that the wheel 10 is moved upward and downward following the configuration of the target convexity or the target concavity obtained in the specification.

vi) Control Flow of Damping-Force Generating System

Like the control in the damping-force generating system according to the first embodiment, the control in the damping-force generating system according to the second embodiment is carried out such that absorber-control program indicated by the flow chart of FIG. 9 showing the main routine is repeatedly implemented by the ECU 14 at considerably short time intervals, e.g., from several milliseconds to several tens of milliseconds, with an ignition switch of the vehicle placed in an ON state. In the program of the present control, the main routine is the same as that in the first embodiment, but subroutines are different from those in the first embodiment. Accordingly, the control in the second embodiment is different from the control in the first embodiment. In the interest of brevity, the following explanation will be made mainly in reference to portions of the control in the second embodiment different from the control in the first embodiment. Further, while the following explanation refers to utilization of various kinds of map data, such map data is stored in the data storage portion of the ECU 14 unless otherwise specified.

Figure 17A:
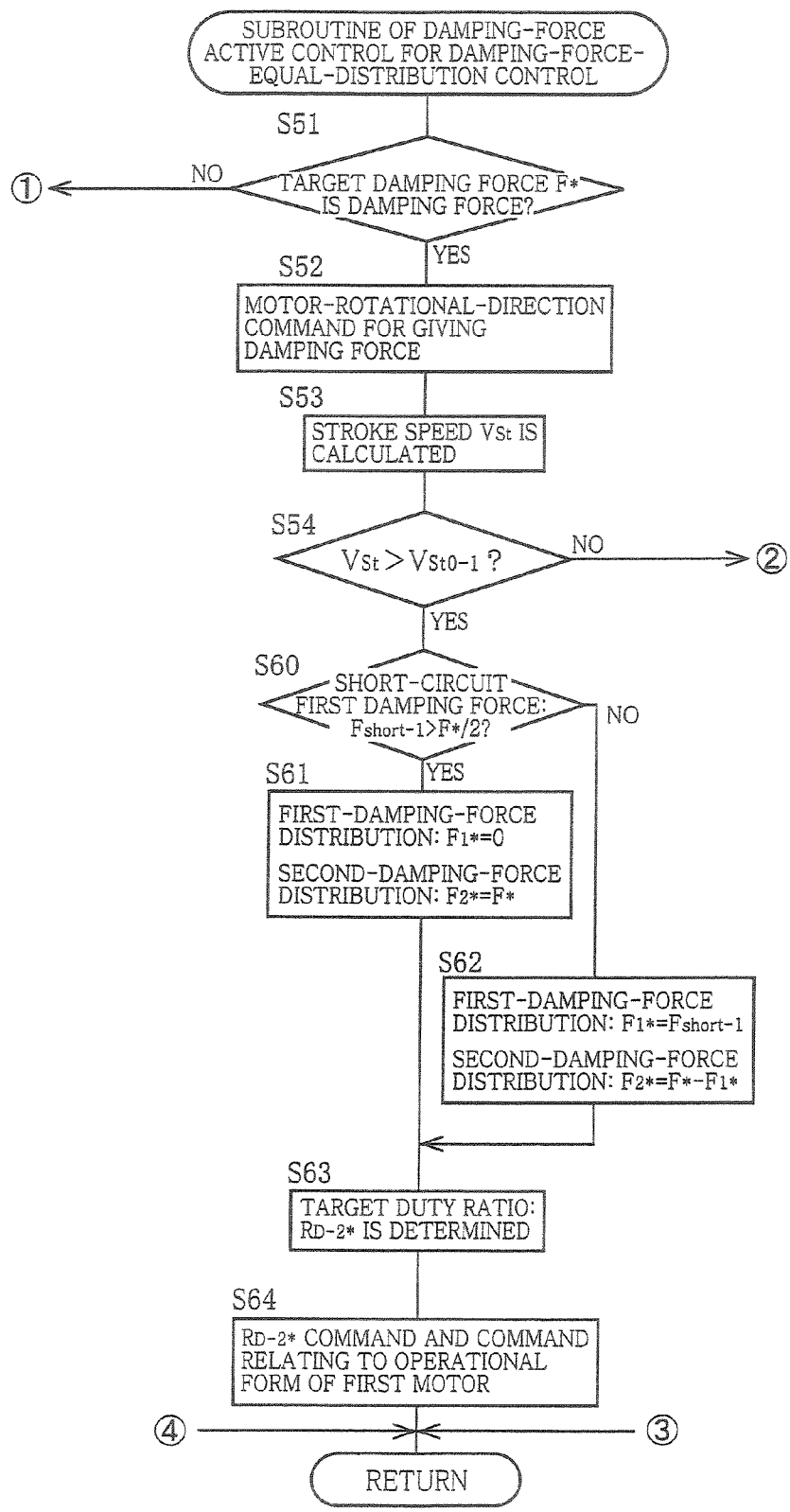
FIGS. 17A-17C show a flow chart indicating a subroutine of damping-force active control for damping-force-equal-distribution control executed by execution of the absorber-control program in a control of the damping-force generating system according to the second embodiment.
Figure 17B:
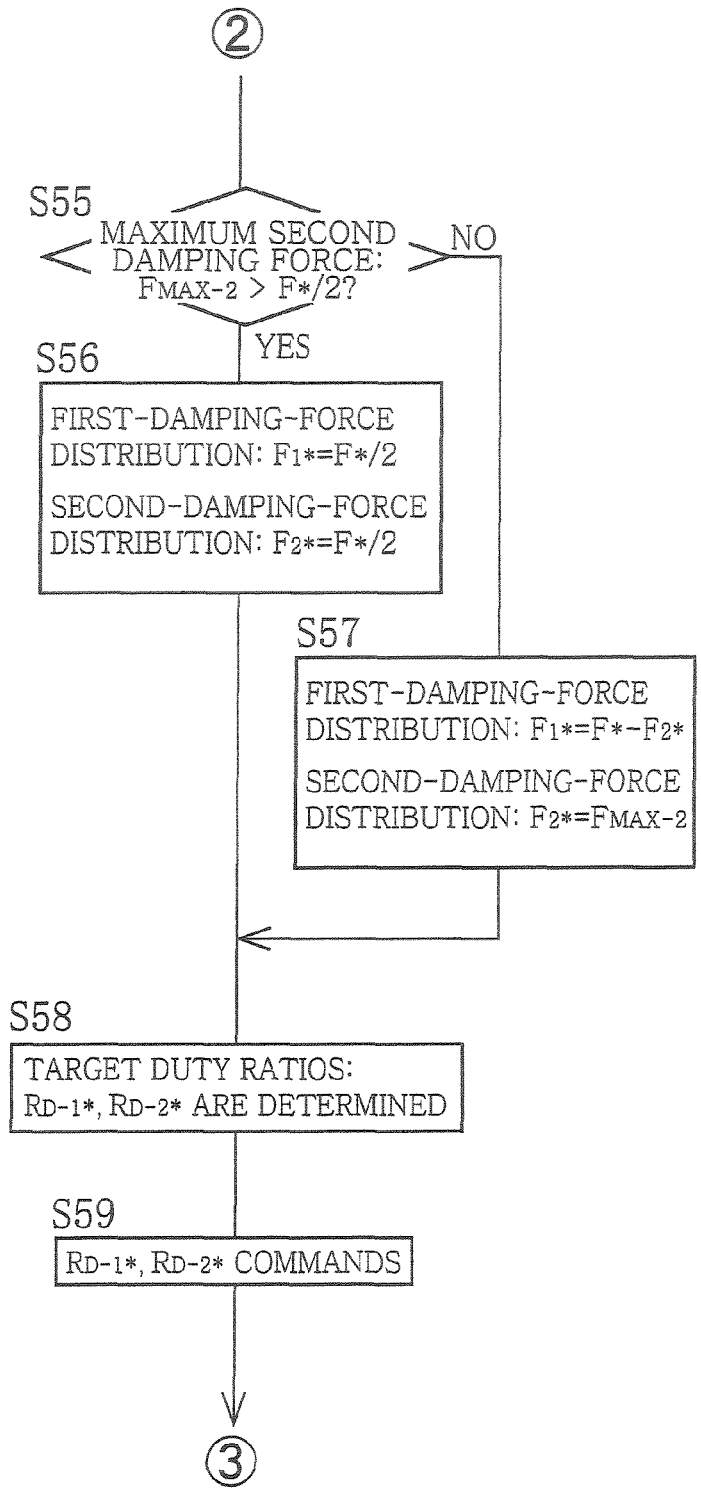
Figure 17C:
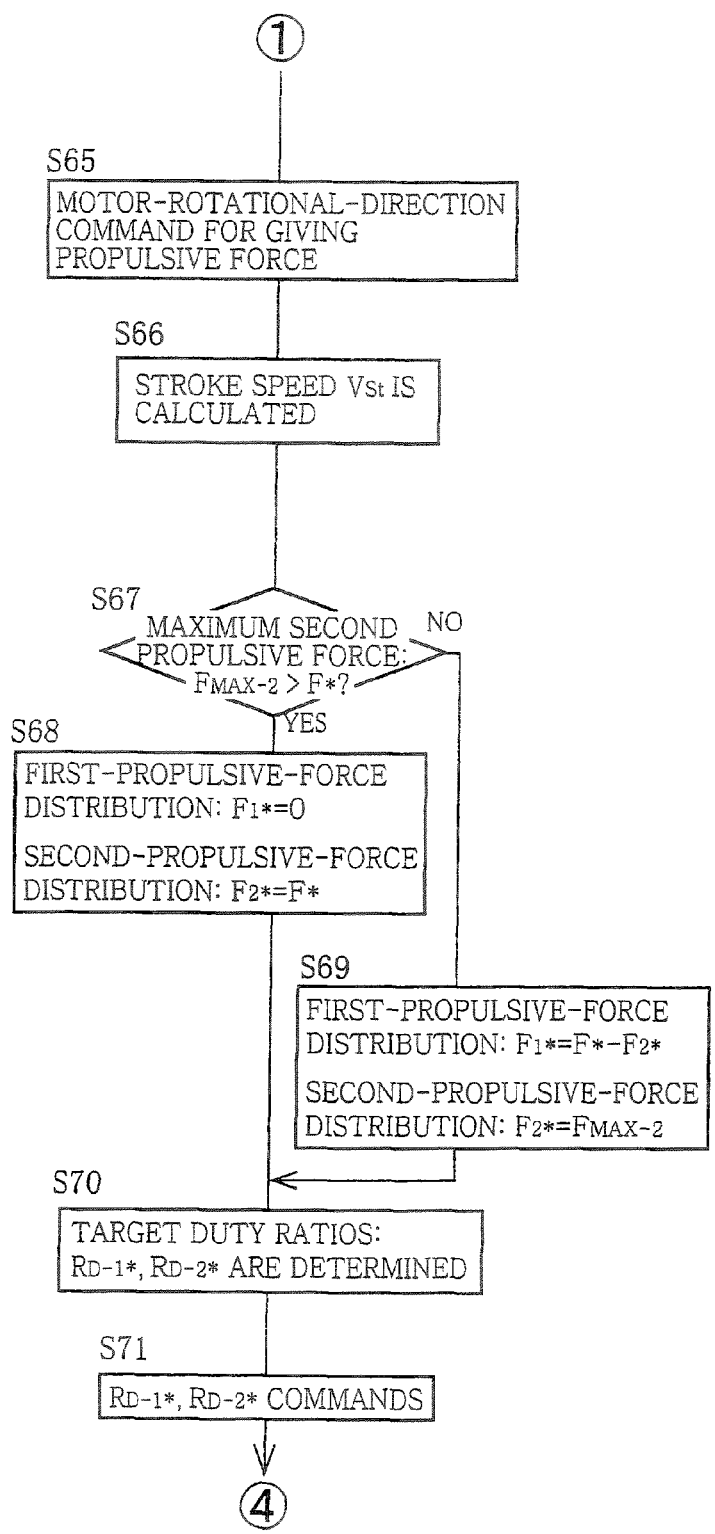
Figure 18A:
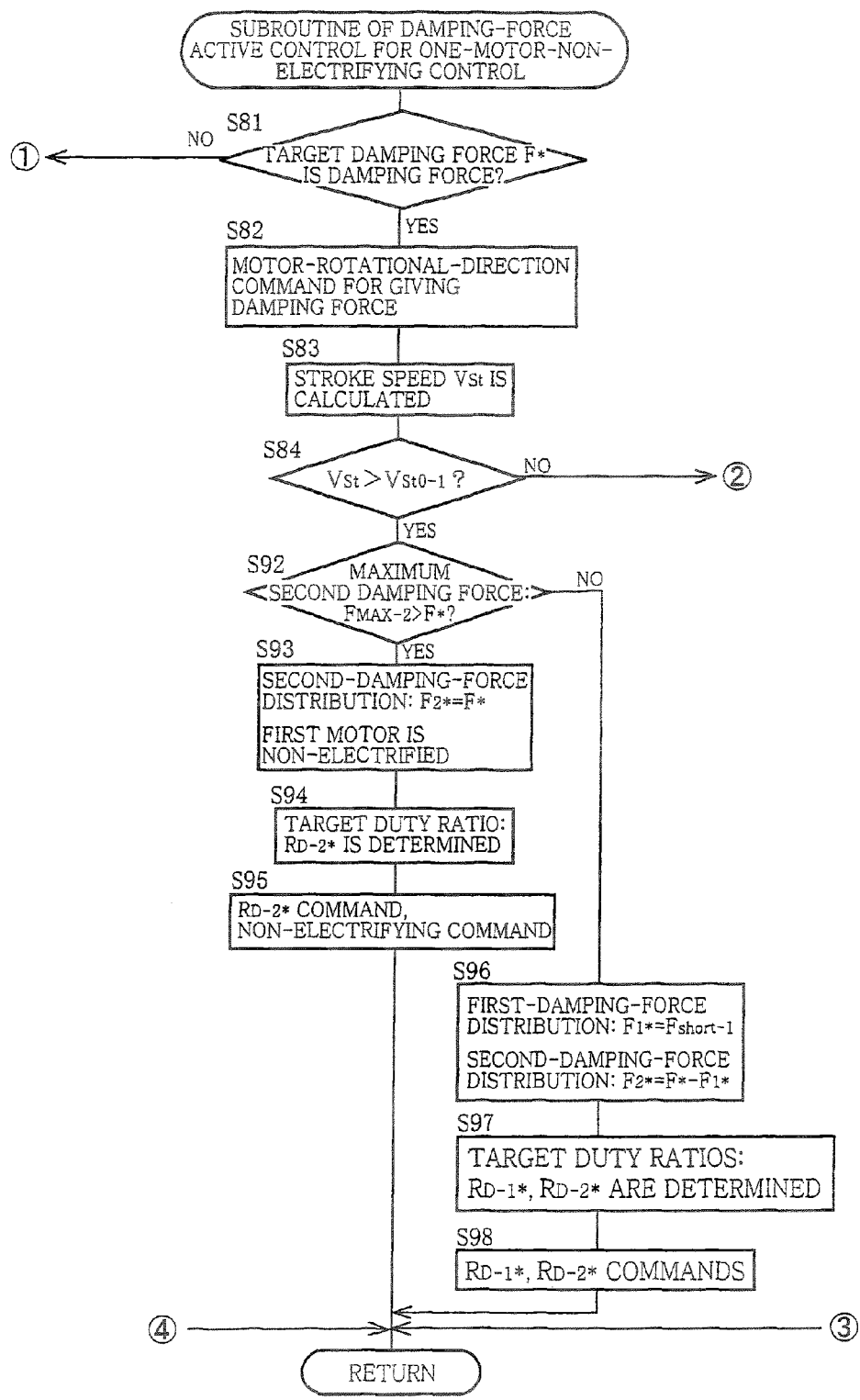
FIGS. 18A-18C show a flow chart indicating a subroutine of damping-force active control for one-motor-non-electrifying control.
Figure 18B:
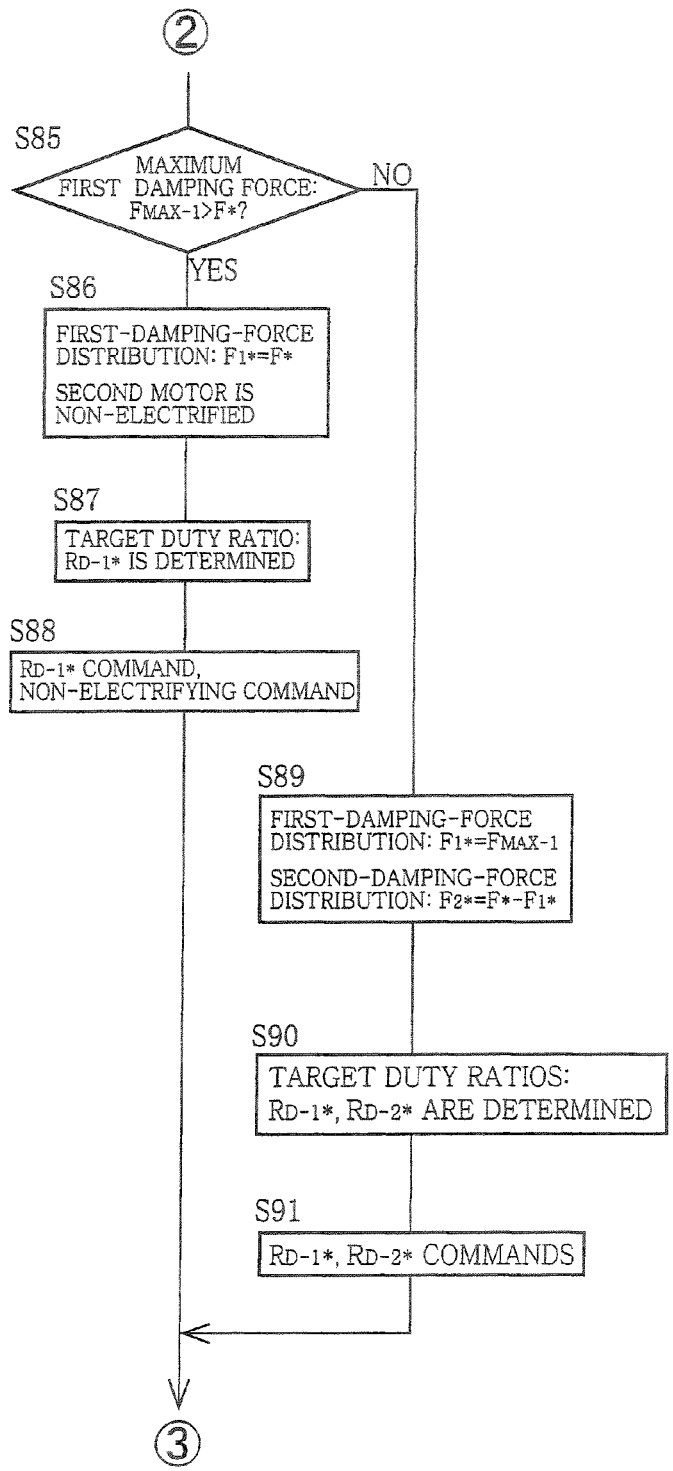
Figure 18C:
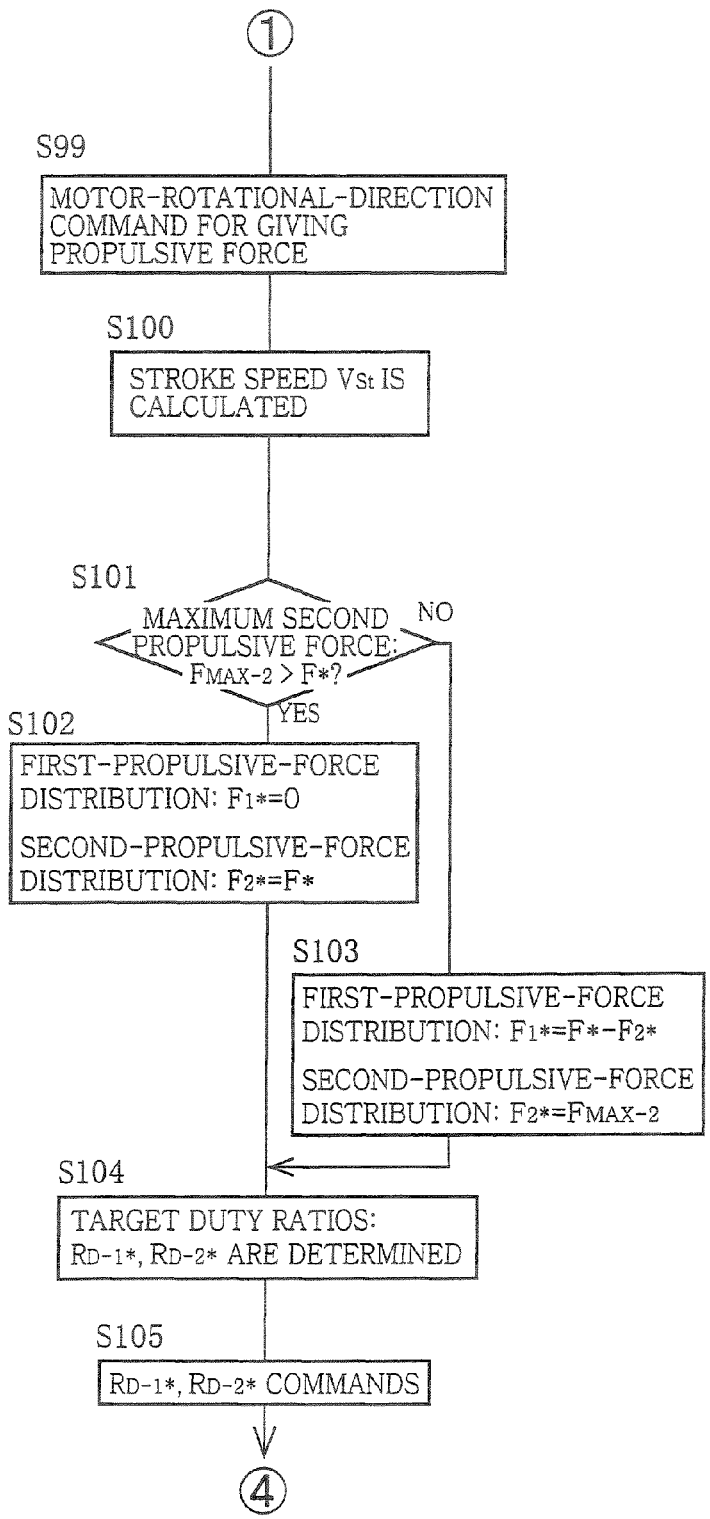
Figure 19:
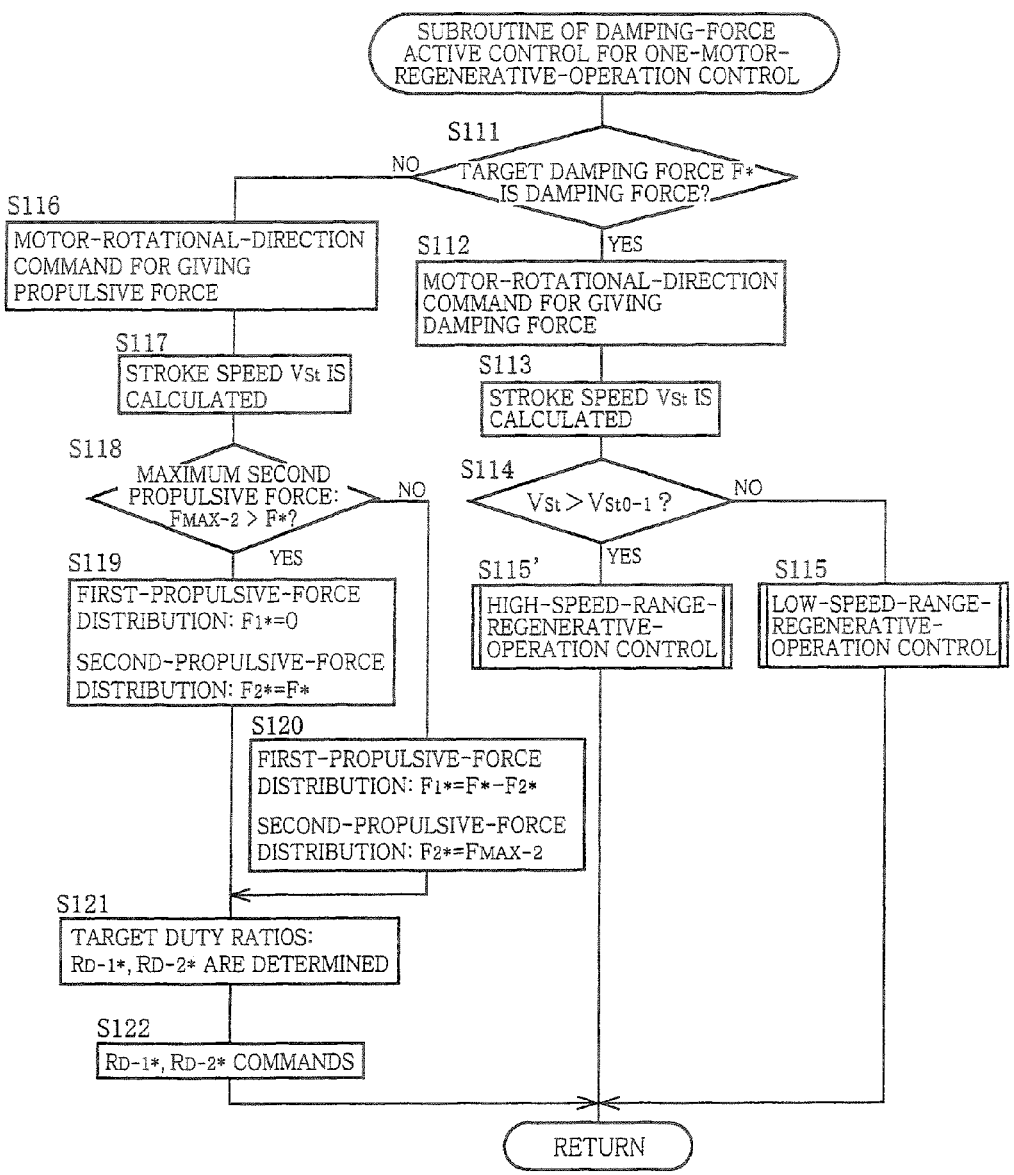
FIG. 19 shows a flow chart indicating a subroutine of damping-force active control for one-motor-regenerative-operation control.

As in the control in the illustrated first embodiment, where the active stroke motion is not being executed and the active stroke motion need not be immediately executed, the target damping force $F^*$ is determined in S4 to execute the damping-force active control. A specific processing for the determination of the target damping force $F^*$ is similar to the processing in the control in the first embodiment. Next, S5 is implemented to execute the subroutine of damping-force active control. As explained above, in the damping-force active control according to the second embodiment, there is executed any one of the damping-force-equal-distribution control, the one-motor-non-electrifying control, and the one-motor-regenerative-operation selected by the user. In those three controls, mutually different subroutines are implemented. Hereinafter, the three control flows are explained.

Where the damping-force-equal-distribution control is selected, there is executed, in S5, a subroutine of damping-force active control for damping-force-equal-distribution control, indicated by a flow chart of FIG. 17. In this subroutine, it is judged in S51 whether the target damping force $F^*$ determined in S4 is a damping force or a propulsive force, as in the control in the first embodiment. Where the target damping force $F^*$ is the damping force, S52 is implemented to issue, the inverters 22A, 22B, respective commands indicative of the torque-giving directions of the respective motors 178A, 178B, whereby the changing pattern of the electrified phases of each motor 178A, 178B is set in the corresponding inverter 22A, 22B. Subsequently, S53 is implemented to calculate the stroke speed $V_{St}$ and S54 is implemented to judge whether the stroke speed $V_{St}$ exceeds the emf•source-voltage equalized speed $V_{St0-1}$ for the first motor 178A to execute a control which takes account of the relationship between the electromotive force in the first motor 178A and the power source voltage.

Where it is judged in S54 that the stroke speed $V_{St}$ is not higher than the emf•source-voltage equalized speed $V_{St0-1}$, there are executed a series of processings in S55 and the subsequent steps. In S55, it is judged whether the target damping force $F^*$ can be equally distributed to the first damping force and the second damping force. Since the damping force that can be generated at the current stroke speed $V_{St}$ is smaller in the second damping-force generating device, it is judged in S55 by referring to the map data according to the graph of FIG. 16 whether a maximum second damping force $F_{MAX-2}$ which can be generated by the second damping-force generating device is larger than a half of the target damping force $F^*$. Where the maximum second damping force $F_{MAX-2}$ is larger than the half of the target damping force $F^*$, it is judged that the target damping force $F^*$ can be equally distributed. Accordingly, in S56, a first-damping-force distribution $F_1^*$ which is a distribution of the target damping force $F^*$ for the first damping-force generating device and a second-damping-force distribution $F_2^*$ which is a distribution of the target damping force $F^*$ for the second damping-force generating device are respectively determined so as to be equal to the half of the target damping force $F^*$. By the processing, the target damping force $F^*$ is equally distributed. Where the maximum second damping force $F_{MAX-2}$ is equal to or less than the half of the target damping force $F^*$, it is judged that the target damping force $F^*$ cannot be equally distributed. Accordingly, in S57, the second-damping-force distribution $F_2^*$ is determined to be equal to the maximum second damping force $F_{MAX-2}$ and the first-damping-force distribution $F_1^*$ is determined to be equal to a value as the remainder of the target damping force $F^*$ obtained by subtracting the maximum second damping force $F_{MAX-2}$ from the target damping force $F^*$. By the processing, when the target damping force $F^*$ cannot be equally distributed in a case where the stroke speed $V_{St}$ is relatively low, the first damping force is increased. On the basis of the first-damping-force distribution $F_1^*$ and the second-damping-force distribution $F_2^*$ determined as descried above, there are determined in S58 by referring to the map data a first-motor target duty ratio $R_{D-1}^*$ and a second-motor target duty ratio $R_{D-2}^*$ which are target duty ratios for the respective first motor 178A and second motor 178B. Subsequently, in S59, there are issued, to the inverters 22A, 22B, respective commands of the target duty ratios $R_{D-1}^*$, $RD_{-2}^*$.

Where it is judged in S54 that the stroke speed $V_{St}$ exceeds the emf•source-voltage equalized speed $V_{St0}$, a series of processings in S60 and the subsequent steps are executed as processings to be executed when the target damping force $F^*$ cannot be equally distributed due to instability in the control of the first motor 178A. Initially, S60 is implemented to obtain by referring to the map data, short-circuit first damping force $F_{short-1}$ which is the first damping force having a suitable magnitude according to the short-circuit characteristic of the first motor 178A explained above and to judge whether the short-circuit first damping force $F_{short-1}$ is larger than the half of the target damping force $F^*$. Where the short-circuit first damping force $F_{short-1}$ is larger than the half of the target damping force $F^*$, S61 is implemented to determine the first-damping-force distribution $F_1^*$ to be equal to zero and to determine the second-damping-force distribution $F_2^*$ to be equal to the target damping force $F^*$ for permitting the second damping force to bear all of the target damping force $F^*$. On the other hand, where the short-circuit first damping force $F_{short-1}$ is not larger than the half of the target damping force $F^*$, S62 is implemented to determine the first-damping-force distribution $F_1^*$ to be equal to the short-circuit first damping force $F_{short-1}$ and to determine the second-damping-force distribution $F_2^*$ to be equal to a value obtained by subtracting the short-circuit first damping force $F_{short-1}$ from the target damping force $F^*$ for permitting the second damping force to bear the remainder of the target damping force $F^*$. Subsequently, S63 is implemented to determine the second-motor duty ratio $R_{D-2}^*$ based on the second-damping-force distribution $F_2^*$ by referring to the map data, and S64 is implemented to issue, to the inverter 22B, a command of the target duty ratio $R_{D-2}^*$ and to issue, to the inverter 22A, a command as to the operational form of the first motor 178A. The command as to the operational form of the first motor 178A is a command to place the first motor 178A into the non-electrified state in a case where the first-damping-force distribution $F_1^*$ is determined to be equal to zero and is a command to set the target duty ratio $R_{D-1}^*$ at substantially zero in a case where the first-damping-force distribution $F_1^*$ is determined to be equal to the short-circuit first damping force $F_{short-1}$. By the processings described above, the first-damping-force distribution $F_1^*$ and the second-damping-force distribution $F_2^*$ are determined with the second damping force generally increased larger than the first damping force, when the target damping force $F^*$ cannot be equally distributed in a case where the stroke speed $V_{St}$ is relatively high.

Where it is judged in S51 that the target damping force $F^*$ determined in S4 is the propulsive force, S65 is implemented to issue, to the inverters 22A, 22B, respective commands indicative of the torque-giving directions of the respective motors 178A, 178B, as in the case where the target damping force $F^*$ is judged to be the damping force. Subsequently, in S66, the stroke speed $V_{St}$ is calculated. While not explained above, the second motor 178B as the high rotation motor can assist, for the propulsive force, the stroke motion over the higher stroke speed range, as compared with the first motor 178A. Accordingly, in a case where the target damping force $F^*$ is the propulsive force, a series of processings in S67 and the subsequent steps are executed to distribute the target damping force $F^*$ as the propulsive force preferentially to the second damping force. Initially, in S67, it is judged by referring to the map data according to the graph of FIG. 16 whether a maximum second propulsive force $F_{MAX-2}$ that can be generated by the second damping-force generating device at the current stroke speed $V_{St}$ is larger than the target damping force $F^*$. Where the maximum second propulsive force $F_{MAX-2}$ is larger than the target damping force $F^*$, S68 is implemented to determine the second-propulsive-force distribution $F_2^*$ to be equal to the target damping force $F^*$ and to determine a first-propulsive-force distribution $F_1^*$ to be equal to zero. Where the maximum second propulsive force $F_{MAX-2}$ is not larger than the target damping force $F^*$, S69 is implemented to determine the second-propulsive-force distribution $F_2^*$ to be equal to the maximum second propulsive force $F_{MAX-2}$ and to determine the first-propulsive-force distribution $F_1^*$ to be equal to a value obtained by subtracting the maximum second propulsive force $F_{MAX-2}$ from the target damping force $F^*$. Subsequently, S70 is implemented to determine, by referring to the map data, the target duty ratios $R_{D-1}^*$, $R_{D-2}^*$ on the basis of the first-propulsive-force distribution $F_1^*$ and the second-propulsive-force distribution $F_2^*$ determined as described above. Then, in S71, there are issued, to the inverters 22A, 22B, respective commands of the target duty ratios $R_{D-1}^*$. $R_{D-2}^*$.

Where the one-motor-non-electrifying control is selected, there is executed, in S5, a subroutine of damping-force active control for one-motor-non-electrifying control, indicated by a flow chart of FIG. 18. As in the control described above, it is initially judged in S81 whether the target damping force $F^*$ determined in S4 is a damping force or a propulsive force. Where the target damping force $F^*$ is the damping force, S82 is implemented to issue commands indicative of the torque-giving directions of the respective motors 178A, 178B. Subsequently, S83 is implemented to calculate the stroke speed $V_{St}$, and S84 is implemented to judge whether the stroke speed $V_{St}$ exceeds the emf•source-voltage equalized speed $V_{St0-1}$ for the first motor 178A, for determining which one of the first motor 178A and the second motor 178B should be placed into the non-electrified state. Processings in S99-S105 to be executed when it is judged in S81 that the target damping force $F^*$ is the propulsive force are the same as those in S65-S71 in the control explained above, a detailed explanation of the processings in S99-S105 is not given here.

Where it is judged in S84 that the stroke speed $V_{St}$ is not higher than the emf•source-voltage equalized speed $V_{St0-1}$, a series of processings in S85 and the subsequent steps are executed to place the second motor 178B into the non-electrified state to the extent possible. Initially, S85 is implemented to obtain, by referring to the map data according to the graph of FIG. 16, the maximum first damping force $F_{MAX-1}$ that can be generated by the first damping-force generating device at the current stroke speed $V_{St}$ and to judge whether the maximum first damping force $F_{MAX-1}$ is larger than the target damping force $F^*$, for determining whether there is a need to generate the second damping force. Where the maximum first damping force $F_{MAX-1}$ is larger than the target damping force $F^*$, S86 is implemented to determine the first-damping-force distribution $F_1^*$ to be equal to the target damping force $F^*$ and to make a determination that the second motor 178B is placed into the non-electrified state. Subsequently, S87 is implemented to determine the first-motor target duty ratio $R_{D-1}^*$ by referring to the map data, and S88 is implemented to issue, to the inverters 22A, 22B, a command of the target duty ratio $R_{D-1}^*$ and a command to place the second motor 178B in the non-electrified state, respectively. Where the maximum first damping force $F_{MAX-1}$ is not larger than the target damping force $F^*$, S89 is implemented to determine the first-damping-force distribution $F_1^*$ to be equal to the maximum first damping force $F_{MAX-1}$ and to determine the second-damping-force distribution $F_2^*$ to be equal to a value as the remainder of the target damping force $F^*$ obtained by subtracting the first-damping-force distribution $F_1^*$ from the target damping force $F^*$. Subsequently, in S90, the target duty ratios $R_{D-1}^*$, $R_{D-2}^*$ for the respective first motor 178A and second motor 178B are determined referring to the map data. Then S91 is implemented to issue, to the inverters 22A, 22B, respective commands of the target duty ratios $R_{D-1}^*$, $R_{D-2}^*$.

Where it is judged in S84 that the stroke speed $V_{St}$ exceeds the emf•source-voltage equalized speed $V_{St0-1}$, a series of processings in S92 and the subsequent steps are executed to place the first motor 178A into the non-electrified state to the extent possible. Initially, S92 is implemented to obtain the maximum second damping force $F_{MAX-2}$ by referring to the map data according to the graph of FIG. 16 and to judge whether the maximum second damping force $F_{MAX-2}$ is larger than the target damping force $F^*$, for determining whether there is a need to generate the first damping force. Were the maximum second damping force $F_{MAX-2}$ is larger than the target clamping force $F^*$, S93 is implemented to determine the second-damping-force distribution $F_2^*$ to be equal to the target damping force $F^*$ and to make a determination that the first motor 178A is placed into the non-electrified state. Subsequently, S94 is implemented to determine the second-motor target duty ratio $R_{D-2}^*$ by referring to the map data, and S95 is implemented to issue, to the inverters 22A, 22B, a command of the target duty ratio $R_{D-2}^*$ and the command to place the first motor 178A into the non-electrified state, respectively. Where the maximum second damping force $F_{MAX-2}$ is not larger than the target damping force $F^*$, S96 is implemented to obtain the above-indicated short-circuit first damping force $F_{short-1}$ by referring to the map data and to determine the first-damping-force distribution $F_1^*$ to be equal to the short-circuit first damping force $F_{short-1}$ while determining the second-damping-force distribution $F_2^*$ to be equal to a value as to remainder of the target damping force $F^*$ obtained by subtracting, from the target clamping force $F^*$, the first-damping-force distribution $F_1^*$, namely, the short-circuit first damping force $F_{short-1}$. Subsequently, in S97, the second-motor target duty ratio $R_{D-2}^*$ is determined referring to the map data and the first-motor target duty ratio $R_{D-1}^*$ is determined to be zero. Then S98 is implemented to issue, to the inverters 22A, 22B, respective commands of the target duty ratios $R_{D-1}^*$, $R_{D-2}^*$.

Where the one-motor-regenerative-operation control is selected, there is executed in S5 a subroutine of damping-force active control for one-motor-regenerative-operation control, indicated by a flow chart of FIG. 19. As in the control described above, it is initially judged in S111 whether the target damping force $F^*$ determined in S4 is a damping force or a propulsive force. Where the target damping force $F^*$ is the damping force, S112 is implemented to issue commands indicative of the torque-giving directions of to respective motors 178A, 178B. Subsequently, S113 is implemented to calculate the stroke speed $V_{St}$, and S114 is implemented to judge whether the stroke speed $V_{St}$ exceeds the emf•source-voltage equalized speed $V_{St0-1}$ for the first motor 178A, for determining which one of the first motor 178A and the second motor 178B should be preferentially placed into the regenerative-braking state. Processings in S116-S122 to be executed when it is judged in S111 that the target damping force $F^*$ is the propulsive force are the same as those in S65-S71 in the control explained above, a detailed explanation of the processings in S116-S122 are not given here.

Figure 20:
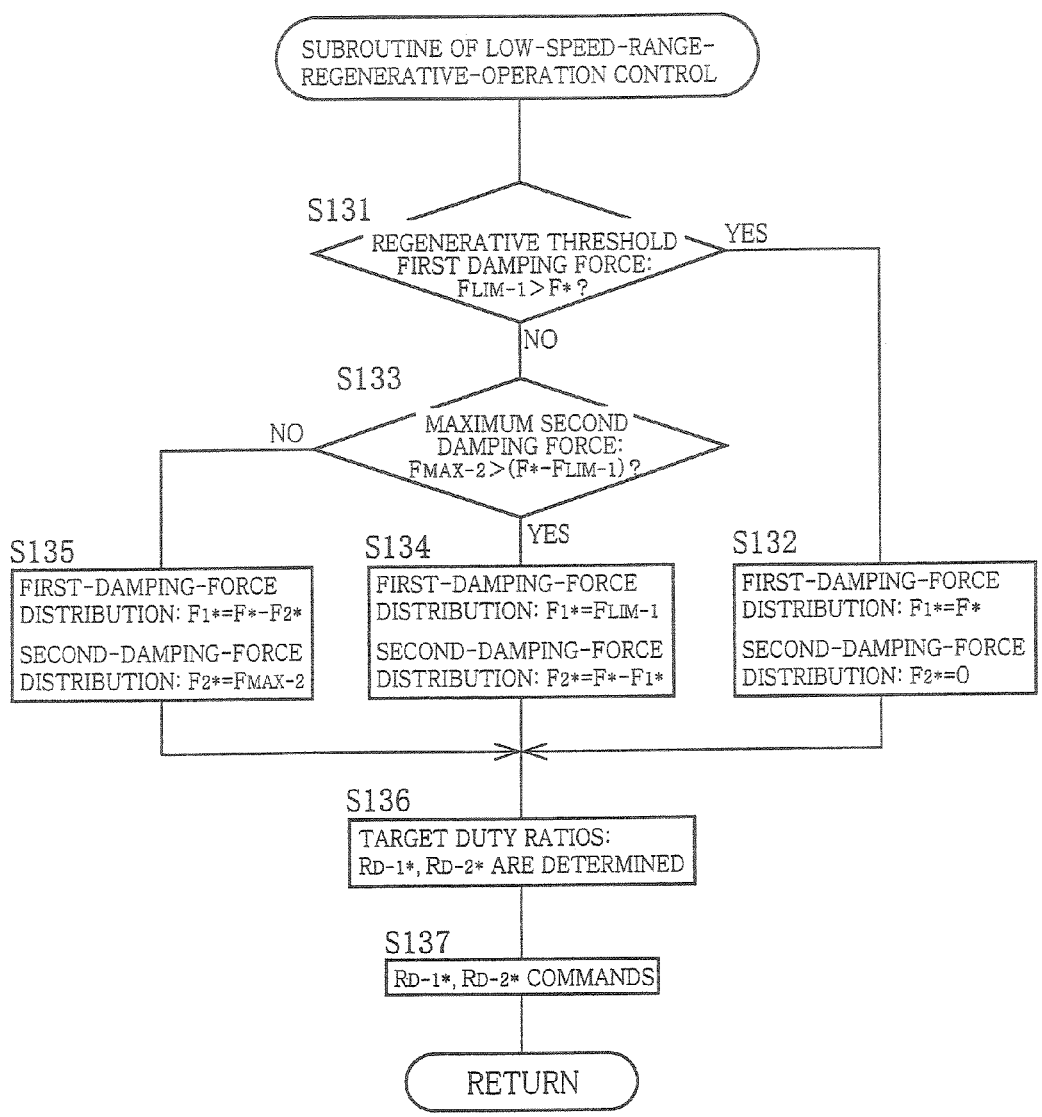
FIG. 20 is a flow chart showing a subroutine of low-speed-range-regenerative-operation control executed in the subroutine of damping-force active control for the one-motor-regenerative-operation control of FIG. 19.
Figure 21:
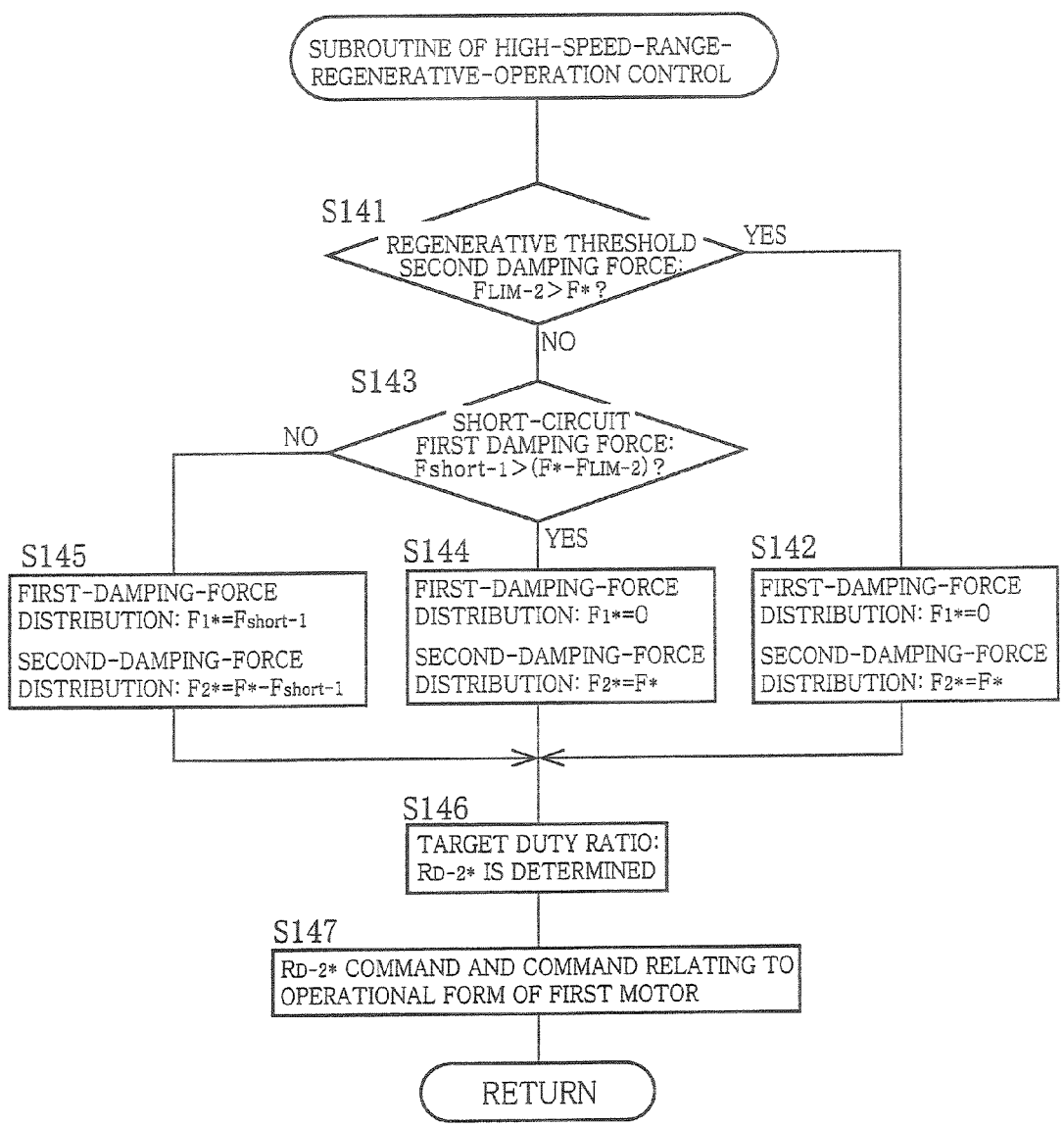
FIG. 21 is a flow chart showing a subroutine of high-speed-range-regenerative-operation control executed in the subroutine of active damping-force control for the one-motor-regenerative-operation control of FIG. 19.

As explained above, whether the motor is placed into the regenerative-braking state or the plugging state is determined depending upon the stroke speed $V_{St}$ at the time point, namely, the motor rotational speed, and the magnitude of the damping force generated at the time point. It may be considered that the motor is placed into the regenerative braking state where the damping force is not larger than a certain threshold damping force while the motor is placed into the plugging state where the damping force exceeds the threshold damping force. The threshold damping force is recognized in advance for each of the first motor 178A and the second motor 178B as a regenerative threshold first damping force $F_{LIM-1}$ and a regenerative threshold second damping force $F_{LIM-2}$, respectively. The values $F_{LIM-1}$, $F_{LIM-2}$ are stored in the ECU 14 as map data in relation to the stroke speed $V_{St}$. In the one-motor-regenerative-operation control, one of the first motor 178A and the second motor 178B is controlled to perform the regenerative operation to the extent possible, on the basis of the regenerative threshold first damping force $F_{LIM-1}$ and the regenerative threshold second damping force $F_{LIM-2}$ stored in the ECU 14.

Where it is judged in S114 that the stroke speed $V_{St}$ is not higher than the emf•source-voltage equalized speed $V_{St0-1}$, there is executed, in S115, a subroutine of low-speed-range-regenerative-operation control, indicated by a flow chart of FIG. 20. In the subroutine, the following processings are executed to preferentially control the first motor 178A to perform the regenerative operation. Initially, S131 is implemented to judge whether the regenerative threshold first damping force $F_{LIM-1}$ is larger than the target damping force $F^*$. Where the regenerative threshold first damping force $F_{LIM-1}$ is larger than the target damping force $F^*$, S132 is implemented to determine the first-damping-force distribution $F_1^*$ to be equal to the target damping force $F^*$ and to determine the second-damping-force distribution $F_2^*$ to be equal to zero. According to the determination, only the first motor 178A is placed into the regenerative braking state. On the other hand, where the regenerative threshold first damping force $F_{LIM-1}$ is not larger than the target damping force $F^*$, S133 is implemented to judge whether the maximum second damping force $F_{MAX-2}$ is larger than a value obtained by subtracting the regenerative first damping force $F_{LIM-1}$ from the target damping force $F^*$, namely, a difference between $F^*$ and $F_{LIM-1}$. That is, it is judged in S133 whether the second damping-force generating device can compensate a shortage in the target damping force $F^*$ that cannot be covered by the regenerative operation of the first motor 178. Where the maximum second damping force $F_{MAX-2}$ is larger than the difference between the regenerative threshold first damping force $F_{LIM-1}$ and the target damping force $F^*$, S134 is implemented to determine the first-damping-force distribution $F_1^*$ to be equal to the regenerative threshold first damping force $F_{LIM-1}$ and to determine the second-damping-force distribution $F_2^*$ to be equal to a value obtained by subtracting the first-damping-force distribution $F_1^*$ from the target damping force $F^*$, as the remainder of the target damping force $F^*$. On the other hand, where the maximum second damping force $F_{MAX-2}$ is not larger than the difference between the regenerative threshold first damping force $F_{LIM-1}$ and the target damping force $F^*$, S135 is implemented to determine, referring to the map data, the second-damping-force distribution $F_2^*$ to be equal to the maximum second damping force $F_{MAX-2}$ and to determine the first-damping-force distribution $F_1^*$ to be equal to a value obtained by subtracting the second-damping-force distribution $F_2^*$ from the target damping force $F^*$, as the remainder of the target damping force $F^*$. According to the determinations described above, the first motor 178A is controlled to perform the regenerative operation to the extent possible. After the determinations have been made, S136 is implemented to determine, by referring to the map data, the target duty ratios $R_{D-1}^*$, $R_{D-2}^*$ on the basis of the first-damping-force distribution $F_1^*$ and the second-damping-force distribution $F_2^*$ determined as described above. Subsequently, S137 is implemented to issue, to the inverters 22A, 22B, respective commands of the target duty ratios $R_{D-1}^*$, $R_{D-2}^*$.

Where it is judged in S114 that the stroke speed $V_{St}$ exceeds the emf·source-voltage equalized speed $V_{St0-1}$, there is executed, in S115', a subroutine of high-speed-range-regenerative-operation control, indicated by a flow chart of FIG. 21. In the subroutine, the following processings are executed to preferentially control the second motor 178B to perform the regenerative operation. The subroutine is started with S141 to judge whether the regenerative threshold second damping force $F_{LIM-2}$ is larger than the target damping force $F^*$. Where the regenerative threshold second damping force $F_{LIM-2}$ is larger than the target damping force $F^*$, S142 is implemented to determine the first-damping-force distribution $F_1^*$ to be equal to zero and to determine the second-damping-force distribution $F_2^*$ to be equal to the target damping force $F^*$. According to the determinations, only the second motor 178B is placed into the regenerative-braking state. On the other hand, where the regenerative threshold second damping force $F_{LIM-2}$ is not larger than the target damping force $F^*$, S143 is implemented to judge whether the short-circuit damping force $F_{short-1}$ explained above is larger than a value obtained by subtracting the regenerative threshold second damping force $F_{LIM-2}$ from the target damping force $F^*$, namely, a difference between $F^*$ and $F_{LIM-2}$. Where the short-circuit damping force $F_{short-1}$ is larger than the difference between $F_{LIM-2}$ and $F^*$, S144 is implemented to determine the first-damping-force distribution $F_1^*$ to be equal to zero and to determine the second-damping-force distribution $F_2^*$ to be equal to the target damping force $F^*$. Where the short-circuit damping force $F_{short-1}$ is not larger than the difference between $F^*$ and $F_{LIM-2}$, S145 is implemented to determine the first-damping-force distribution $F_1^*$ to be equal to the short-circuit first damping force $F_{short-1}$ and to determine the second-damping-force distribution $F_2^*$ to be equal to a value obtained by subtracting the first-damping-force distribution $F_1^*$ from the target damping force $F^*$, as the reminder of the target damping force $F^*$. According to the determinations described above, the second motor 178B is controlled to perform the regenerative operation to the extent possible while maintaining adequate controllability of the damping force. After the determinations have been made, S146 is implemented to determine, by referring to the map data, the second-motor target duty ratio $R_{D-2}^*$ on the basis of the first-damping-force distribution $F_1^*$ and the second-damping-force distribution $F_2^*$ determined as described above. Subsequently, S147 is implemented to issue, to the inverter 22B, a command of the second-motor target duty ratio $RD_{-2}^*$ and to issue, to the inverter 22A, a command as to the operational form of the first motor 178A. As explained above, the operational form of the first motor 178A is the non-electrified state when the first-damping-force distribution $F_1^*$ is equal to zero and the electrified state in which the target duty ratio $R_{D-1}^*$ is substantially zero when the first-damping-force distribution $F_1^*$ is equal to the short-circuit first damping force $F_{short-1}$.

Even where any of the above-indicated three controls are executed, the damping force of the absorber 170 is actively controlled depending upon the vehicle running condition, the vehicle posture, and so on. The explanation made hereinabove is about the flow of the damping-force active control. Hereinafter, there will be explained a flow of the active-motion control.

The unevenness-monitor subroutine of S2 executed in the control of the damping-force generating system according to the second embodiment is substantially similar to that in the first embodiment indicated by the flow chart of FIG. 10. However, in the processing for specifying the target concavity or the target convexity in S14, there is obtained from the image processing unit 56 not only the information on the distance of the target concavity or the target convexity from the wheel 10, the width of the target concavity or the target convexity, the position of the target concavity or the target convexity in the vehicle width direction with respect to the wheel 10 as a reference, but also information on the configuration of the target concavity or the target convexity. More specifically explained, information on a depth of the target concavity, a height of the target convexity, an inclination angle of the target concavity or the target convexity and the like is also obtained from the image processing unit 56. In the specifying processing according to the second embodiment, on the basis of the information described above, there is specified the configuration of the concavity or the convexity, more specifically, a path to be taken by the wheel 10 upon passing the concavity or the convexity. Since the active stroke motion is initiated at a time point when the wheel 10 reaches the target concavity or the target convexity in the present embodiment, the reference time $t_{RO}$ used in the judgment in S16 as to the initiation of the active stroke motion is set at a value close to zero.

Figure 22:
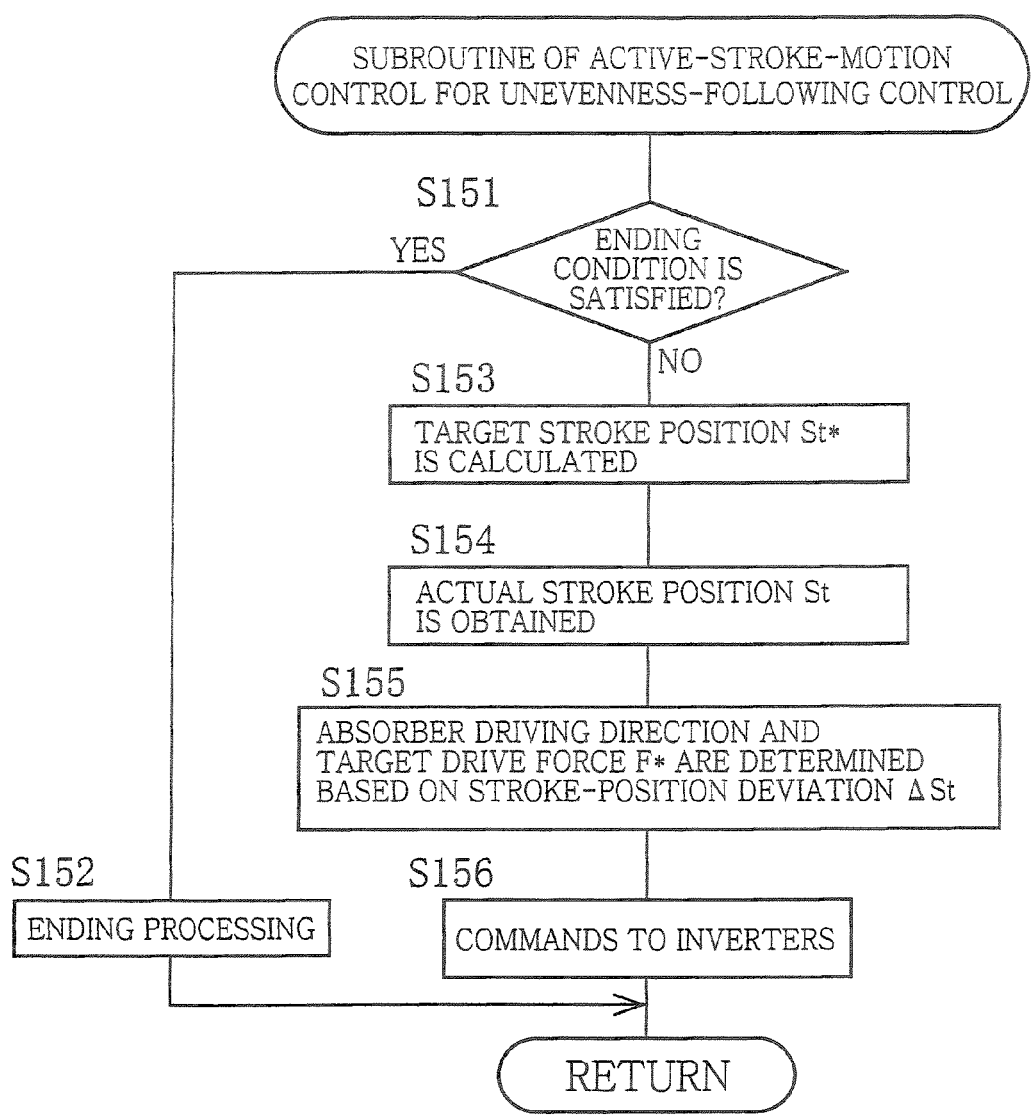
FIG. 22 is a flow chart showing a subroutine of active-stroke-motion control for unevenness-following control.

The subroutine of active-stroke-motion control executed in S6 is arranged as a subroutine of active-stroke-motion control for unevenness-following control, indicated by a flow chart of FIG. 22. The subroutine is started with S151 to judge whether the active stroke motion should be ended or not. An ending condition for ending the active stroke motion is so determined as to include a criterion that the wheel 10 has passed the target concavity or the target convexity, namely, a motion along the path as specified above has been completed. Where the ending condition is satisfied, S152 is implemented to execute, as an ending processing, a processing of placing the active-stroke-motion-initiation flag into the OFF state. Where the ending condition is not satisfied, the execution of the active stroke motion is continued, and a series of processings in S153 and the subsequent steps are executed.

In the series of processings, S153 is initially implemented to calculate, on the basis of the path of the wheel 10 specified as described above and the vehicle running speed, a target stroke position St* which is a target position of the stroke motion in the current execution of the program. Subsequently, S154 is implemented to obtain an actual stroke position St on the basis of a value detected by the stroke sensor 34. Then S155 is implemented to obtain a stroke-position deviation ΔSt which is a deviation of the actual stroke position St from the target stroke position St*, thereby determining, on the basis of the deviation ΔSt, a driving direction which is a direction of the stroke motion of the absorber 170 and a target drive force F* (mainly as the propulsive force) for a force to realize the stroke motion. Subsequently, S156 is implemented to issue commands to the inverters 22A, 22B on the basis of the driving direction and the target drive force F* determined as described above. More specifically explained, there is executed a processing similar to that executed in the above-described damping-force active control when the target damping force F* is the propulsive force, thereby issuing, to the inverters 22A, 22B, respective commands indicative of the torque-giving directions of the respective first and second motors 178A, 178B and respective commands of the target duty ratios $R_{D-1}^*R_{D-2}^*$ of the respective first and second motors 178A, 178B.

The details of the active-motion control other than the explanation made above are similar to those in the illustrated first embodiment, and a detailed explanation of which is dispensed with. By the processings according to the above-described control flow, the unevenness-following control is executed, so that the posture of the vehicle body can be stabilized even when encountered a comparatively large concavity or convexity.

vii) Functional Structure of Electronic Control Unit

Figure 23:
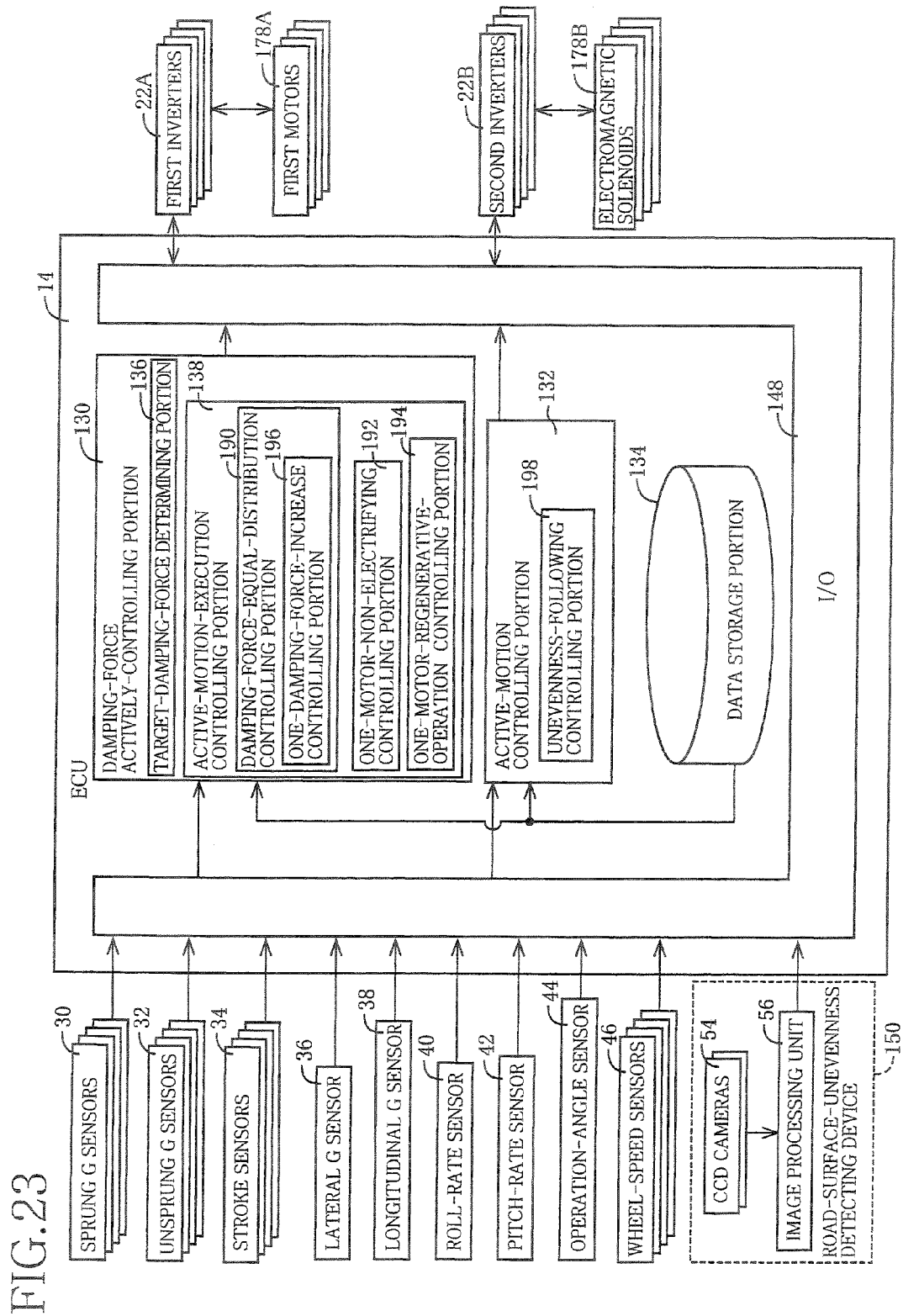
FIG. 23 is a block diagram relating to functions of an electronic control unit (ECU) of the damping-force generating system according to the second embodiment.

The functional structure of the ECU 14 which executes the control based on the above-described control flow is shown in FIG. 23. The functional structure will be explained referring mainly to portions of the ECU 14 different from those in the illustrated first embodiment. The active-operation-execution controlling portion 138 in the present embodiment includes: a damping-force-equal-distribution controlling portion 190 as a functional portion to execute the processing according to the subroutine of damping-force active control for damping-force-equal-distribution control; a one-motor-non-electrifying controlling portion 192 as a functional portion to execute the processing according to the subroutine of damping-force active control for one-motor-non-electrifying control; and a one-motor-regenerative-operation controlling portion 194 as a functional portion to execute the processing according to the subroutine of damping-force active control for one-motor-regenerative-operation control. The damping-force-equal-distribution controlling portion 190 includes a one-damping-force-increase controlling portion 196 as a functional portion to execute the processing which is to be executed when the target damping force cannot be equally distributed to the two damping-force generating devices, among the processing according to the subroutine of damping-force active control for damping-force-equal-distribution control. The active-motion controlling portion 132 includes an unevenness-following controlling portion 198 as a functional portion to execute the unevenness-following control. It is noted that ECU 14 in the present embodiment functions as a motor-operation controlling device.

viii) Modified Example Using Two Motors Having Identical Construction

In the illustrated second embodiment, the two motors, i.e., the high rotation motor and the low rotation motor, are used, and the damping-force characteristics of the two damping-force generating devices which respectively employ the high rotation motor and the low rotation motor are made different from each other. In place of the structure described above, the damping-force characteristics of the two damping-force generating devices can be made different from each other using two motors which are identical in construction. The following modified example relates to such a structure.

Figure 24:
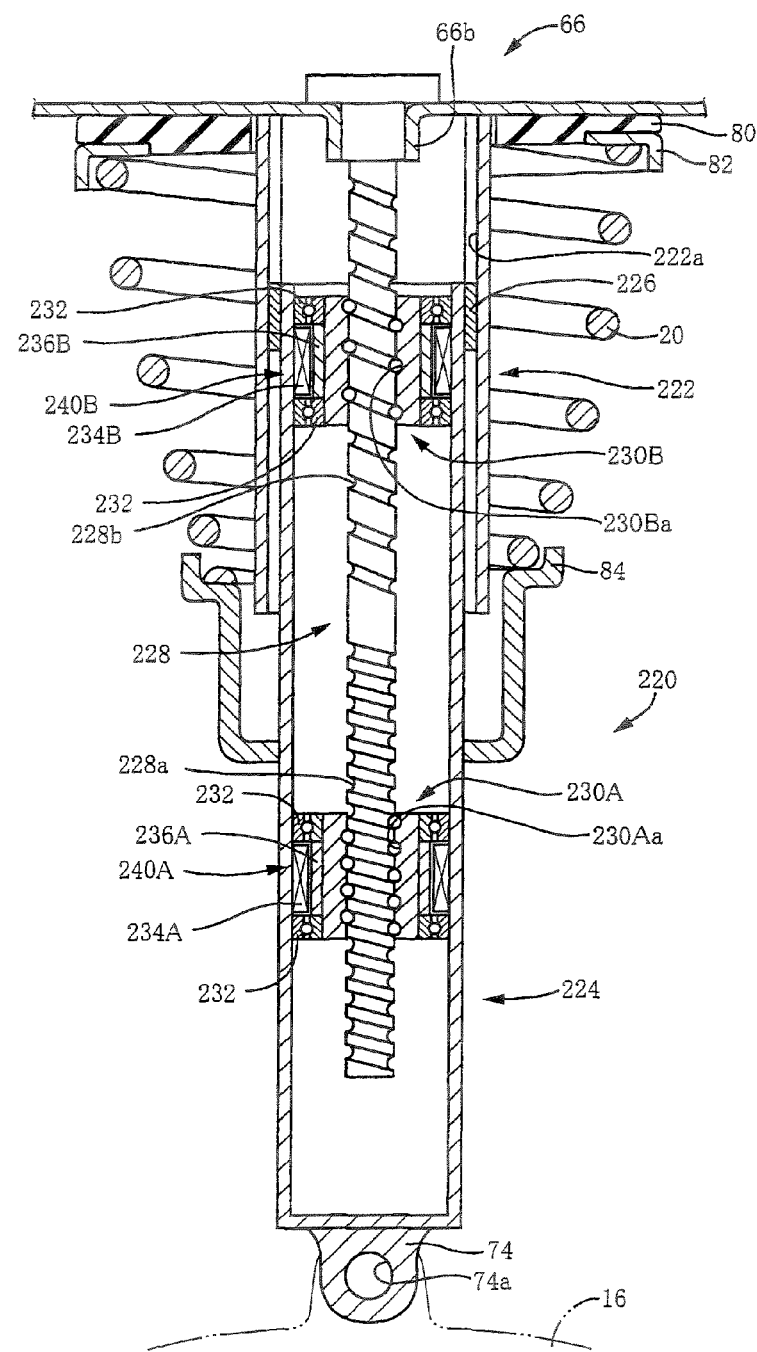
FIG. 24 is a cross-sectional view of an absorber of a damping-force generating system according to a modified example of the second embodiment.

FIG. 24 shows an absorber 220 of a damping-force generating system according to the modified example. The absorber 220 includes: an outer tube 222 fixed at its upper end to the mount portion 66; and an inner tube 224 which is a cylindrical shape having a closed end which is connected at its lower end to the lower arm 16 via the connecting member 74. An upper portion of the inner tube 224 is inserted in the outer tube 222 such that the inner tube 224 is movable in the axis direction in association with the stroke motion. At an outer circumferential portion of an upper end portion of the inner tube 224, two keys 226 are fixed so as to be fitted in respective two key grooves 222a, 222a formed on an inner surface of the outer tube 222. The arrangement inhibits a relative rotation of the outer tube 222 and the inner tube 224 about the axis.

The mount portion 66 is provided with a boss portion 66b from which a rod member 228 extends downward along the axis line with its head fixed to the boss portion 66b. On the rod member 228, there are formed two external threads 228a, 228b having mutually different pitches. A first external thread 228a formed at a lower portion of the rod member 228a has a lead angle smaller than that of a second external thread 228b formed at an upper portion of the rod member 228. Within the inner tube 224, there are disposed two nut members, i.e., a first nut member 230A on which an internal thread 230Aa is formed and a second nut member 230B on which an internal thread 230Ba is formed, such that each of the two nut members 230A, 230B is provided via a pair of bearings 232 on an inner surface of the inner tube 224 so as to be rotatable and axially immovable. The internal threads 230Aa, 230Ba of the respective nut members 230A, 230B are held in engagement with the external threads 228a, 228b of the rod member 228, respectively, via bearing balls. According to the structure, the two nut members 230A, 230B are rotated in accordance with the stroke motion of the wheel 10 and the mount portion 66. Further, by rotatably driving at least one of the two nut members 230A, 230B, the stroke motion of the wheel 10 and the mount portion 66 is carried out.

Two coils 234A, 234B are fixed to the inner tube 224 along its inner circumference such that the coil 234A is disposed between the pair of bearings 232 holding the upper and the lower ends of the first nut member 230A while the coil 234B is disposed between the pair of bearings 232 holding the upper and the lower ends of the second nut member 230B. Two permanent magnets 236A, 236B are fixed to the outer circumferential portions of the respective nut members 230A, 230B at positions respectively corresponding to the coils 234A, 234B. The coil 234A and the permanent magnet 236A constitute a first motor 240A while the coil 234B and the permanent magnet 236B constitute a second motor 240B. The first and the second motors 240A, 240B are electromagnetic motors each as a DC brushless motor. According to the structure described above, when the stroke motion is carried out, there is generated a damping force or a propulsive force with respect to the stroke motion by the rotational force of at least one of the two motors 240A, 240B, as in the illustrated second embodiment. In the absorber 220, a first damping-force generating device is constituted by including the first motor 240A, the first nut member 230A, and the rod member 228 while a second damping-force generating device is constituted by including the second motor 240B, the second nut member 230B, and the rod member 228. The nut members 230A, 230B and the rod member 228 constitute a converting mechanism between a rotational force and a linear force and also functions as a decelerating mechanism because a rotational speed and a speed of a linear motion are arranged to have a predetermined ratio. In the light of this, a first decelerating mechanism is constituted by including the first nut member 230A and the rod member 228 which constitute the first damping-force generating device while a second decelerating mechanism is constituted by including the second nut member 230B and the rod member 228 which constitute the second damping-force generating device. Where it is considered that the rotational speeds of the first motor 240A and the second motor 240B are decelerated down to the stroke speed $V_{St}$, the first decelerating mechanism has a reduction ratio larger than that of the second decelerating mechanism.

While the first motor 240A and the second motor 240B are identical with each other in construction, the two motors 240A, 240B have mutually different rotational speeds N with respect to a certain stroke speed $V_{St}$. More specifically explained, the first motor 240A located at a lower part of the absorber 220 has the rotational speed N higher than that of the second motor 240B located at an upper part of the absorber 220, with respect to the same stroke speed $V_{St}$. Accordingly, in the light of the operational forms of the motors, the relationship between electromotive force and source voltage, the time constant and so on, the emf•source-voltage equalized speed $V_{St0}$ is on a lower-speed side in the first motor 240A than in the second motor 240B. Further, with an increase in the stroke speed $V_{St}$, a decrease in the rotational torque Tq becomes larger in the first motor 240A than in the second motor 240B. Therefore, as apparent from the graph of FIG. 16, the first motor 240A presents a characteristic of the low rotation motor while the second motor 240B presents a characteristic of the high rotation motor. In view of this, it is possible to employ, in the damping-force generating system equipped with the absorber 220, the control relating to the distribution of the target damping force F* to the first damping force and the second damping force in the illustrated second embodiment. In the absorber 220 employing the two motors which are identical in construction, the damping-force characteristics of the respective first and second damping-force generating devices are made different from each other by making the reduction ratios of the first decelerating mechanism and the second decelerating mechanism different from each other.

The overall structure of the suspension system, the control flow, the functional structure of the ECU 14, etc., in a case where the absorber 220 is employed are the same as in the illustrated second embodiment, and a detailed explanation thereof is dispensed with.

ix) Other Modified Examples

In the illustrated second embodiment, the control is executed based on the emf•source-voltage equalized speed $V_{St0}$ as a preset speed. It is possible to execute a control based on other preset speed that is related or non-related to the emf•source-voltage equalized speed $V_{St0}$. In other words, the control of the two motors and the control of the distribution of the damping force to the two damping-force generating devices are widely applicable to a control of a damping-force generating system equipped with two motors having mutually different characteristics and two damping-force generating devices, irrespective of the emf•source-voltage equalized speed $V_{St0}$. Moreover, it is possible to employ the hydraulic damping-force generating device explained in the first embodiment or a hydraulic damping-force generating device incapable of adjusting the damping force, in the second embodiment and its modified example. In addition, the second embodiment is arranged to execute the unevenness-following control as the active-motion control. The second embodiment may be arranged not to execute the unevenness-following control or may be arranged to execute the unevenness-responsive control explained above, in place of the unevenness-following control.

3. Third Embodiment

There will be next explained a third embodiment relating to a damping-force generating system which employs an electromagnetic absorber device and in which a variable resistor device is interposed between the electromagnetic motor of the absorber device and the power source.

i) Structure of Absorber and Overall structure of Suspension System

Figure 25:
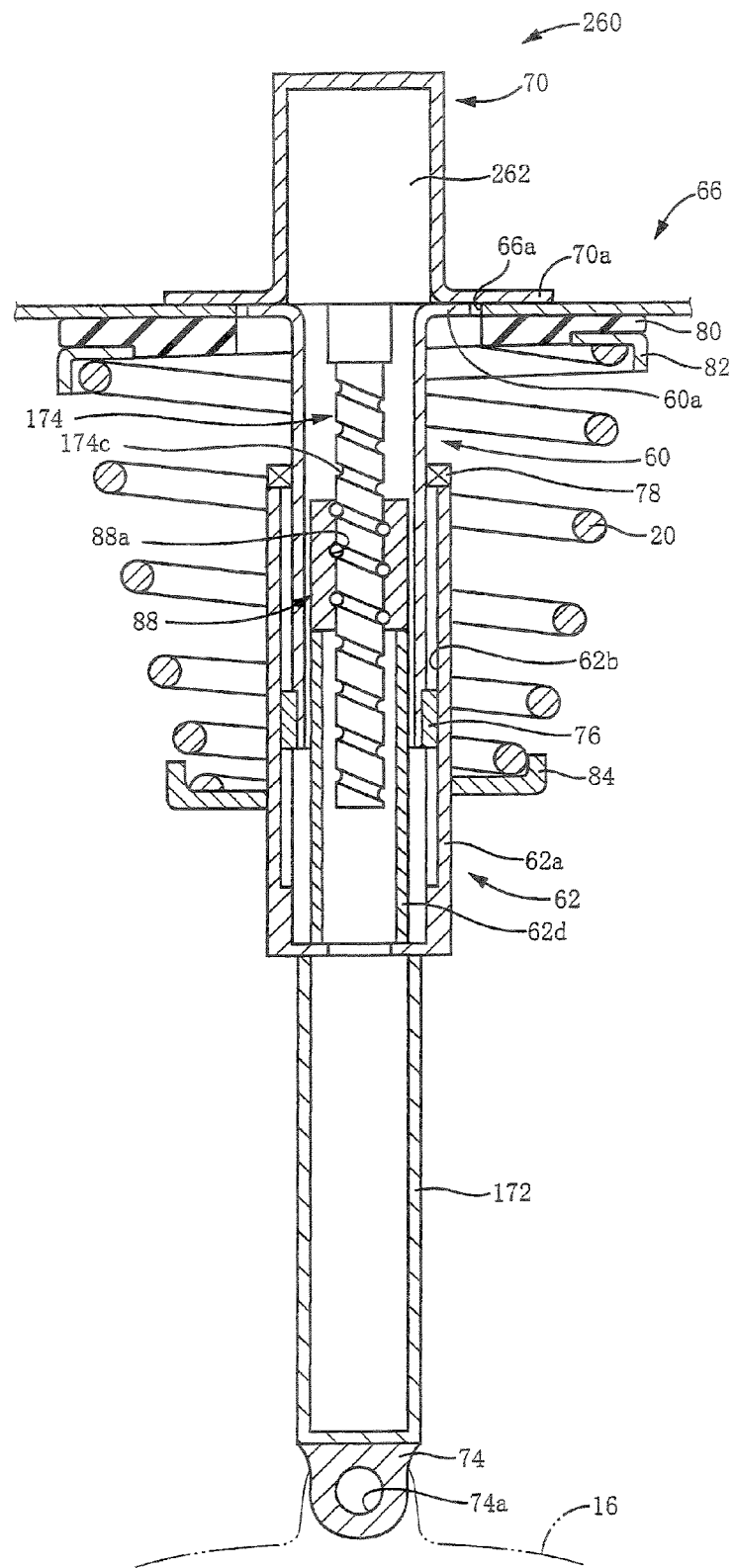
FIG. 25 is a cross-sectional view of an absorber of a damping-force generating system according to a third embodiment of the claimable invention.

FIG. 25 shows an absorber 260 of a damping-force generating system according to the third embodiment. In the absorber 260, the two motors 178A, 178B of the absorber 170 shown in FIG. 15 in the second embodiment are replaced with one electromagnetic motor 262. Other portions of the absorber 260 are the same as the absorber 170, and a detailed explanation of which is not given here. Further, the overall structure of the suspension system constituted by including the present damping-force generating system is substantially the same as that of the suspension system in the second embodiment, except that one inverter 22 is provided for each absorber 170 instead of the two inverters 22A, 22B in the second embodiment and that the CCD cameras 56 and the image processing unit 56 are not provided because the above-explained active-motion control is not executed. Accordingly, a detailed explanation of the suspension system in the present embodiment is dispensed with.

Figure 26:
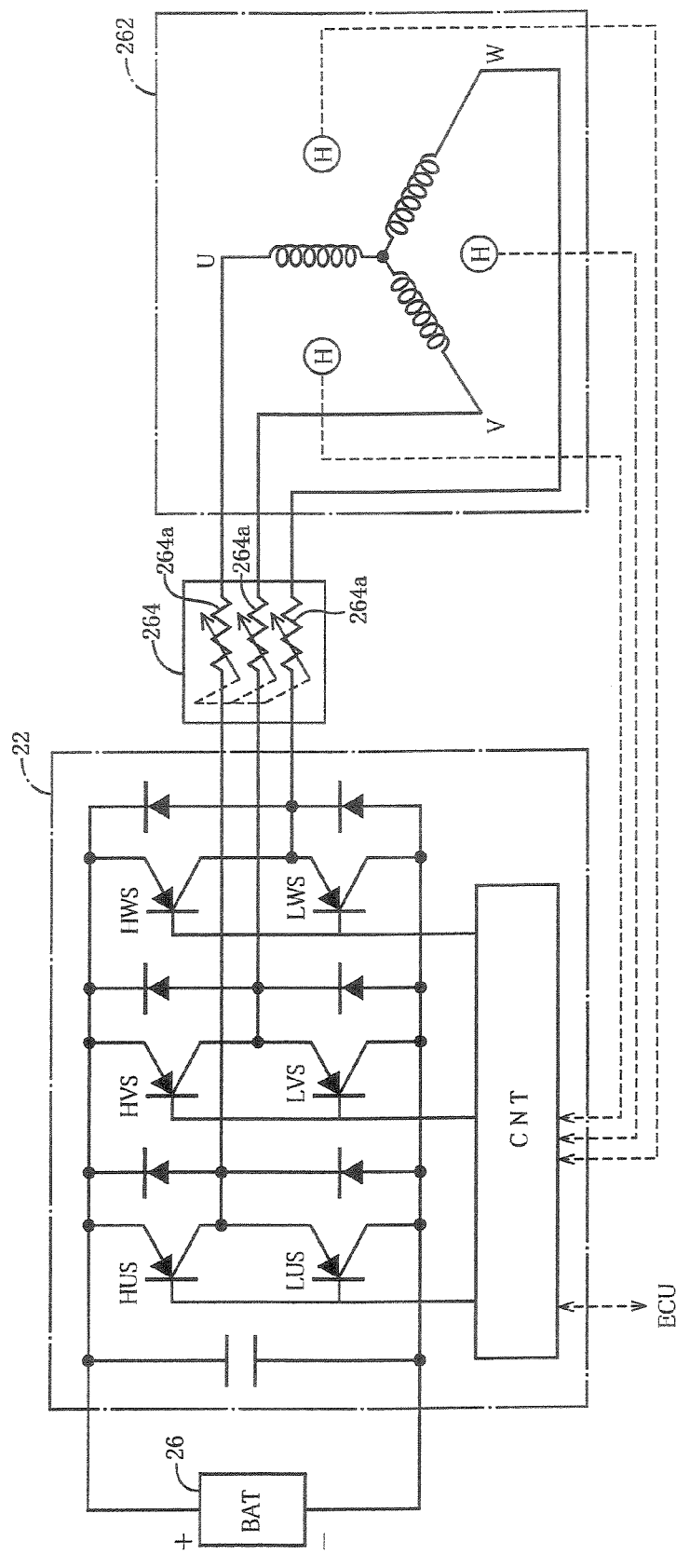
FIG. 26 is a circuit diagram showing a state in which a variable resistor device is disposed between a motor and a battery in the damping-force generating system according to the third embodiment.

In the damping-force generating system according to the present embodiment, however, a variable resistor device 264 is interposed between the battery 26 and the motor 262, more specifically, in power lines between the inverter 22 and the motor 262, as shown in FIG. 26. The variable resistor device 264 is constituted by three variable resistors 264a disposed in the power lines of the respective phases. The variable resistor device 264 is configured such that resistance values of the respective variable resistors 264a of the respective phases are variable while maintaining a state in which the resistance values of the respective variable resistors 264a are equal to each other. The variable resistor device 264 is operated by the ECU 14 via a suitable driver 266 as a drive circuit, as shown in FIG. 29.

ii) Resistance Value of Variable Resistor Device and Damping Force

The time constant of the motor, more specifically, the electric time constant of the motor, may be considered as a value obtained by dividing an inductance of the coil of the motor by a resistance of the coil. Where the variable resistor device 264 is considered to be a part of the motor 262 in the circuit diagram shown in FIG. 26, the resistance of each variable resistor 264a of the variable resistor device 264 may be considered as the resistance of the coil. Accordingly, an increase in the resistance value of each variable resistor 264a will cause a state in which the time constant of the motor 262 is decreased. As explained above, if the time constant becomes smaller, it is possible to maintain the rotational torque to a sufficient extent even in the high-speed range, so that the motor 262 presents the characteristic of the high rotation motor. On the contrary, a decrease in the resistance value of each variable resistor 264a will cause the time constant of the motor 262 to be increased, so that the motor 262 presents the characteristic of the low rotation motor. Further, where the resistance value is increased, the electromotive force of the motor can be made small, namely, the electromotive voltage can be lowered, so that the above-explained emf•source-voltage equalized speed $V_{St0}$ is shifted to the high-speed side.

Figure 27:
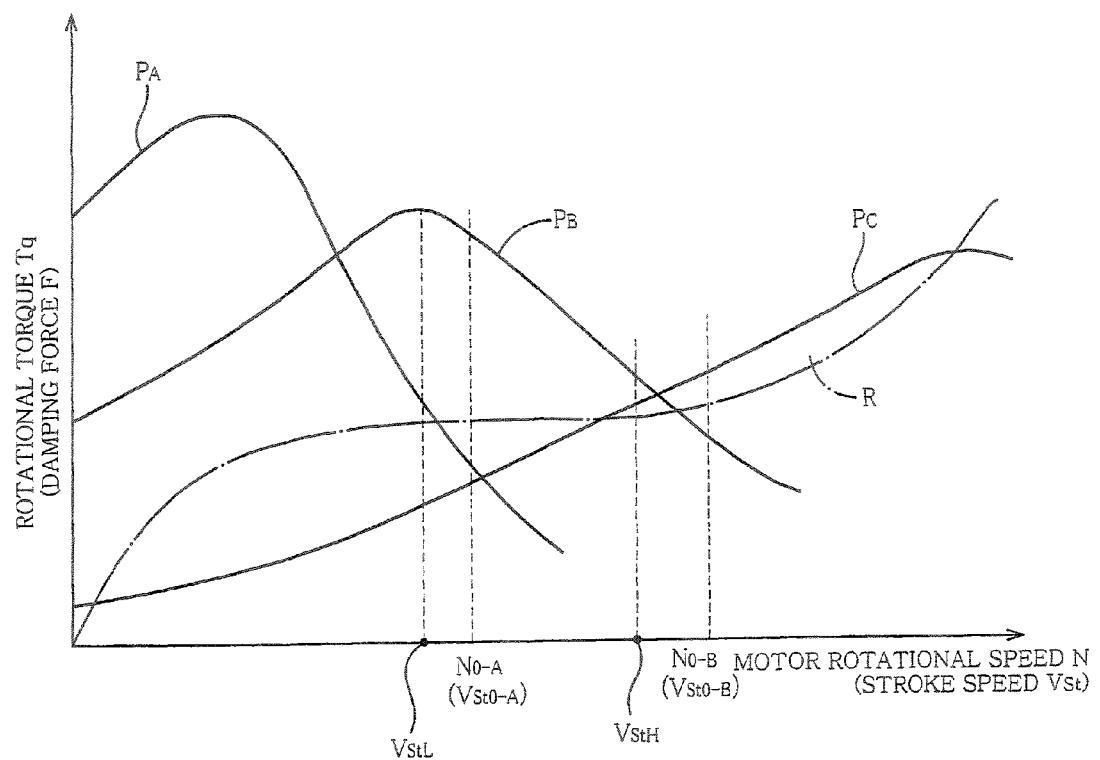
FIG. 27 is a graph showing a rotational-speed rotational-torque characteristic of an electromagnetic motor of the absorber of FIG. 25.

FIG. 27 is a graph showing a rotational speed•rotational-torque characteristic of the motor 262. Like the graph of FIG. 6 explained above, the graph of FIG. 27 shows a relationship between motor rotational speed N and rotational torque Tq that can be generated. That is, the graph of FIG. 27 shows a relationship between stroke speed $V_{St}$ which is a speed of the stroke motion and generation force F which can be generated with respect to the stroke motion, in the damping-force generating device constituted by including the motor 262. It is noted, however, that a characteristic line with respect to the active motion is omitted and only a line P which is a characteristic line indicative of the damping force with respect to the passive motion is shown in the graph of FIG. 27.

In the graph of FIG. 27, a line $P_A$ indicates a characteristic line in a case where the resistance value R of each variable resistor 264a is the lowest resistance value $R_A$, a line $P_C$ indicates a characteristic line in a case where the resistance value of each variable resistor 264a is the highest resistance value $R_C$, and a line $P_B$ is a characteristic line in a case where the resistance value of each variable resistor 264a is a middle resistance value $R_B$ that is middle between the lowest value $R_A$ and the highest value $R_C$. As apparent from the graph, with an increase in the resistance value R, the damping-force characteristic of the motor 262 changes from that of the low rotation motor to that of the high rotation motor, and the emf•source voltage-equalized speed $V_{St0}$ changes so as to shift toward the high-speed side, i.e., $V_{St0-A} \rightarrow V_{St0-B} \rightarrow V_{St0-C}$. The speed $V_{St0-C}$ is outside the graph. In this respect, in accordance with the above-described change, the magnitude of the damping force that can be generated, more specifically, a peak value in each damping-force characteristic line, decreases due to an increase in the resistance value R.

iii) Outline of Damping-Force Active Control

The damping-force active control in the damping-force generating system according to the third embodiment is executed utilizing the change in the damping-force characteristics. Explained more specifically, the damping-force active control is executed such that the resistance value R of each variable resistor 264a is increased with an increase in the stroke speed $V_{St}$, in addition to changing the duty ratio $R_D$ of the inverter 22 based on the target damping force F* as explained above. That is, two threshold speeds $V_{StL}$, $V_{StH}$ are set for the stroke speed $V_{St}$, and the resistance value R is increased in steps, i.e., $R_A \rightarrow R_B$, $R_B \rightarrow R_C$, each time when the stroke speed $V_{St}$ exceeds the threshold speeds $V_{StL}$, $V_{StH}$, respectively. As apparent from the graph of FIG. 27, in the present damping-force active control, the two threshold speeds $V_{StL}$, $V_{StH}$ are respectively set on the basis of the emf•source-voltage equalized speeds $V_{St0-A}$, $V_{St0-B}$, so as not to exceed the speeds $V_{St0-A}$, $V_{St0-B}$. As apparent from the relationship between the line R (i.e., the required damping-force line) and the line P in the graph of FIG. 27, the two threshold speeds $V_{StL}$, $V_{StH}$ are set such that a sufficient degree of damping force can be obtained over a wide speed range. As mentioned above, since the damping force is decreased when the resistance value R is increased, the duty ratio $R_D$ is arranged to be accordingly changed in accordance with the increase in the resistance value R.

iv) Control Flow in Damping-Force Generating System

Figure 28:
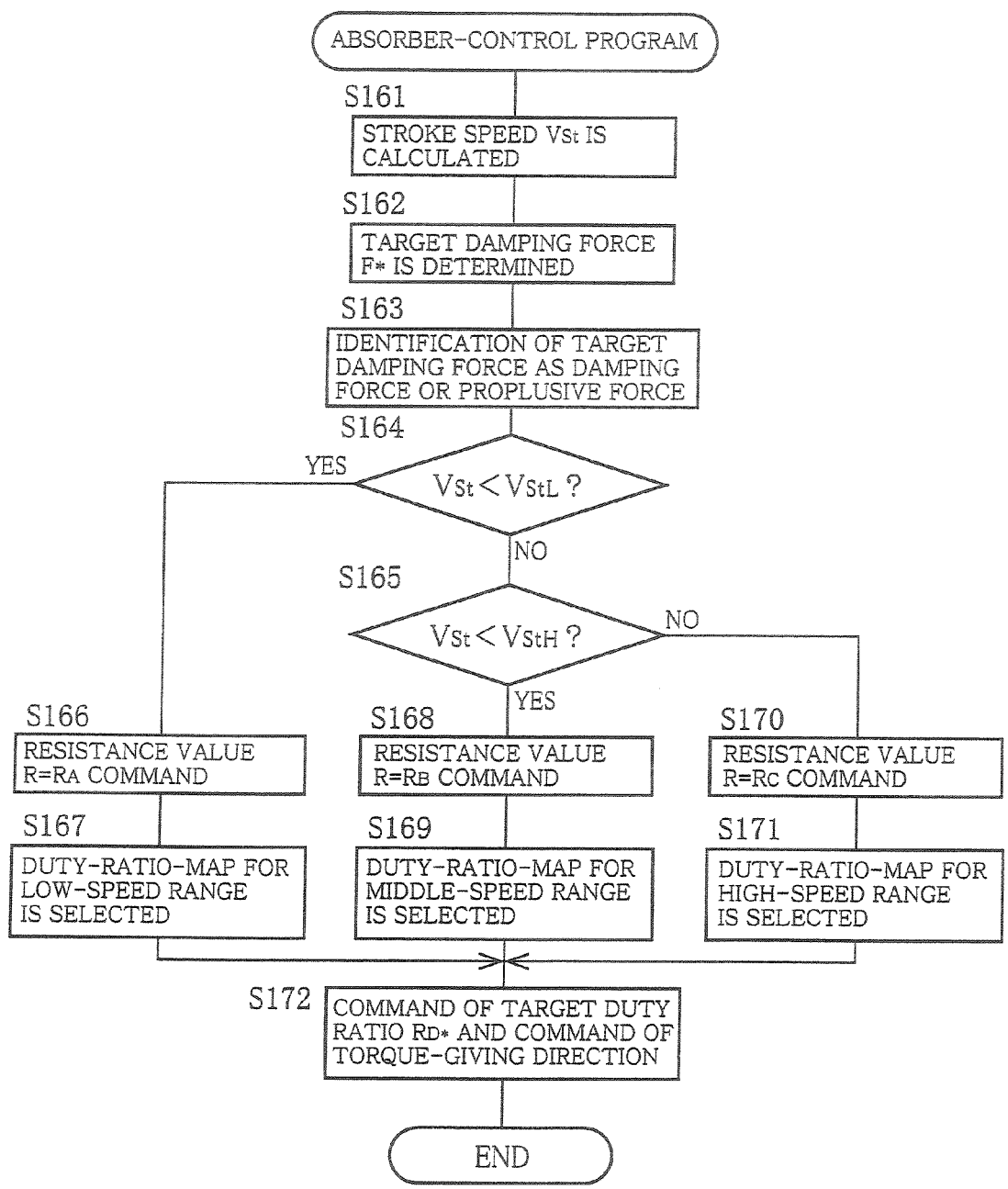
FIG. 28 is a flow chart showing a main routine of an absorber-control program as a control program for the damping-force generating system according to the third embodiment.

The control in the damping-force generating system according to the third embodiment is carried out such that an absorber-control program indicated by a flow chart of FIG. 28 is repeatedly implemented by the ECU 14 at considerably short time intervals, e.g., from several milliseconds to several tens of milliseconds, with an ignition switch of the vehicle placed in an ON state.

Initially, S161 is implemented to calculate the current stroke speed $V_{St}$. Subsequently, S162 is implemented to determine the target damping force F*. The processings in S161, S162 are similar to those in the illustrated first embodiment, and a detailed explanation of which is dispensed with. S162 is followed by S163 in which the target damping force F* is identified as either one of the damping force and the propulsive force. Subsequently, S164 is implemented to compare the calculated stroke speed $V_{St}$ with the threshold speed $V_{StL}$ and S165 is implemented to compare the calculated stroke speed $V_{St}$ with the threshold speed $V_{StH}$, thereby judging to which one of the low-speed range, the middle-speed range, and the high-speed range, the current stroke speed $V_{St}$ belongs. Where the current stroke speed $V_{St}$ is judged to belong to the low-speed range, S166 is implemented to issue, to the driver 266 of the variable resistor device 264, a command to set the resistance value R of each variable resistor 264a at the lowest resistance value $R_A$, and S167 is implemented to select a duty-ratio map for the low-speed range which is map data for determining the target duty ratio $R_D^*$. Where the current stroke speed $V_{St}$ is judged to belong to the middle-speed range, S168 is implemented to issue a command to set the resistance value R at the middle resistance value $R_B$, and S169 is implemented to select a duty-ratio map for the middle speed range. Where the current stroke speed $V_{St}$ is judged to belong to the high-speed range, S170 is implemented to issue a command to set the resistance value R at the highest resistance value $R_C$, and S171 is implemented to select a duty-ratio map for the high speed range. Then S172 is implemented to issue, to the inverter 22, a command relating to the torque-giving direction which is determined depending upon whether the target damping force F* is the damping force or the propulsive force and a command relating to the target duty ratio $R_D^*$ determined based on the selected duty-ratio map.

V) Functional Structure of Electronic Control Unit

The functional structure of the ECU 14 which executes the control based on the above-described control flow is shown in FIG. 29. The functional structure will be explained referring mainly to portions of the ECU 14 different from those in the illustrated embodiments. In the above-described damping-force active control according to the third embodiment, the resistance value of the variable resistor device 264 is increased with an increase in the stroke speed $V_{St}$. Accordingly, the damping-force actively-controlling portion 130 in the third embodiment includes a resistance-value-increase controlling portion 270. In the third embodiment, the ECU 14 functions as a resistor-device control device.

vi) Modified Example

In the damping-force generating system according to the illustrated third embodiment, the resistance value R of the variable resistor device 264 is increased in three steps in accordance with the increase in the stroke speed $V_{St}$. The resistance value R may be increased in two steps, four or more steps, or steplessly. While the active-motion control is not executed in the damping-force generating system according to the third embodiment, the unevenness-responsive control or the unevenness-following control executed in the illustrated first and second embodiments may be executed in the third embodiment. Moreover, the absorber 260 may be equipped with the hydraulic damping-force generating device of the absorber 18 in the first embodiment or other type of hydraulic damping-force generating device.

The invention claimed is:

1. A damping-force generating system which constitutes a part of a suspension system for a vehicle and which generates a damping force with respect to a stroke motion in which a wheel and a body of the vehicle move toward and away from each other, the damping-force generating system comprising:
    a first damping-force generating device which has an electromagnetic motor that operates depending upon the stroke motion and which generates a first damping force that depends on a generation force generated by the electromagnetic motor; and
    a second damping-force generating device which generates a second damping force that is different from the first damping force and that depends on an action of a liquid at least when a stroke speed which is a speed of the stroke motion is a speed at which an electromotive force generated in the electromagnetic motor exceeds a power source voltage.

2. The damping-force generating system according to claim 1, wherein the second damping-force generating device includes:
    a cylinder which is filled with a working fluid;
    a piston which is disposed in the cylinder to divide an interior of the cylinder and which moves relative to the cylinder in association with the stroke motion; and
    a fluid passage capable of giving a resistance to the fluid passing therethrough in association with the stroke motion, the second damping-force generating device generating the second damping force that depends on the resistance of the fluid passing through the fluid passage.

3. The damping-force generating system according to claim 1, wherein the second damping-force generating device is configured such that, when the stroke speed is the speed at which the electromotive force generated in the electromagnetic motor exceeds the power source voltage, a gradient of increase in the second damping force with respect to an increase in the stroke speed is made larger than that when the stroke speed is a speed at which the electromotive force does not exceed the power source voltage.

4. The damping-force generating system according to claim 1,
    wherein the second damping-force generating device includes a second-damping-force increasing mechanism which increases the second damping force owing to an action thereof, and
    wherein the damping-force generating system further comprises a damping-force-increasing-mechanism controlling device configured to control the second-damping-force increasing mechanism to act when the stroke speed exceeds a preset speed which is determined on the basis of the stroke speed at which an electromotive force generated in the electromagnetic motor is equal to a power source voltage.

5. The damping-force generating system according to claim 1, further comprising:
    a rod member which is disposed on one of the wheel and the body of the vehicle such that the rod member is immovable in a direction of the stroke motion and on which an external thread is formed; and
    a nut member which is disposed on the other of the wheel and the body of the vehicle such that the nut member is immovable in the direction of the stroke motion and on which is formed an internal thread that engages the external thread,
    wherein the rod member and the nut member are movable relative to each other in a direction in which the rod member extends while rotating relative to each other in association with the stroke motion, and
    wherein the electromagnetic motor is configured to give a counter force that counters relative rotation of the rod member and the nut member.

6. A damping-force generating system which constitutes a part of a suspension system for a vehicle and which generates a damping force with respect to a stroke motion in which a wheel and a body of the vehicle move toward and away from each other, the damping-force generating system comprising:
    a first damping-force generating device which has a first electromagnetic motor that operates depending upon the stroke motion and which generates a first damping force that depends on a generation force generated by the first electromagnetic motor;
    a second damping-force generating device which includes a second electromagnetic motor different from the first electromagnetic motor, which is configured to generate a second damping force that depends on a generation force generated by the second electromagnetic motor, and which is configured such that, when a stroke speed that is a speed of the stroke motion is low, the second damping force which can be generated is made smaller than the first damping force which can be generated and such that, when the stroke speed is high, the second damping force which can be generated is made larger than the first damping force which can be generated.

7. The damping-force generating system according to claim 6,
    wherein the first damping-force generating device and the second damping-force generating device are configured such that the first electromagnetic motor and the second electromagnetic motor operate at the same operational speed for the same stroke speed, and
    wherein the first electromagnetic motor and the second electromagnetic motor are configured such that, when the stroke speed is low, the generation force of the first electromagnetic motor which can be generated is made larger than the generation force of the second electromagnetic motor which can be generated and such that, when the stroke speed is high, the generation force of the second electromagnetic motor which can be generated is made larger than the generation force of the first electromagnetic motor which can be generated.

8. The damping-force generating system according to claim 6,
    wherein the first damping-force generating device includes a first decelerator which decelerates an operational speed of the first electromagnetic motor down to the stroke speed and the second damping-force generating device includes a second decelerator which decelerates an operational speed of the second electromagnetic motor down to the stroke speed,
    wherein the first electromagnetic motor and the second electromagnetic motor are identical with each other in construction, and
    wherein the first decelerator has a reduction ratio larger than that of the second decelerator.

9. The damping-force generating system according to claim 6, further comprising a motor-operation controlling device which controls operations of the first electromagnetic motor and the second electromagnetic motor.

10. The damping-force generating system according to claim 9, wherein the motor-operation controlling device includes: a damping-force-equal-distribution controlling portion which controls the operations of the first electromagnetic motor and the second electromagnetic motor such that the first damping force and the second damping force are of the same magnitude; and a one-damping-force-increase controlling portion which controls the operations of the first electromagnetic motor and the second electromagnetic motor so as to increase the first damping force when the stroke speed is low and so as to increase the second damping force when the stroke speed is high, in a case where the damping force generated by the damping-force generating system is insufficient in a control of the operations of the first electromagnetic motor and the second electromagnetic motor in which the first damping force and the second damping force are of the same magnitude.

11. The damping-force generating system according to claim 9, wherein the motor-operation controlling device includes a one-motor-non-electrifying controlling portion configured to control the second electromagnetic motor to be placed in a non-electrified state when the stroke speed is low and to control the first electromagnetic motor to be placed in the non-electrified state when the stroke speed is high.

12. The damping-force generating system according to claim 9, wherein the motor-operation controlling device includes a one-motor-regenerative-operation controlling portion configured to control one of the first electromagnetic motor and the second electromagnetic motor to perform a regenerative operation.

13. The damping-force generating system according to claim 6, comprising: a rod member which is disposed on one of the wheel and the body of the vehicle such that the rod member is immovable in a direction of the stroke motion and rotatable and on which an external thread is formed; a nut member which is disposed on the other of the wheel and the body of the vehicle such that the nut member is immovable in the direction of the stroke motion and unrotatable and on which is formed an internal thread that engages the external thread, the rod member and the nut member being movable relative to each other in a direction in which the rod member extends while the rod member rotates in association with the stroke motion, wherein the first damping-force generating device is constituted by including the rod member, the nut member, and a mechanism of giving a counter force by which the first electromagnetic motor counters rotation of the rod member and the second damping-force generating device is constituted by including the rod member, the nut member, and a mechanism of giving a counter force by which the second electromagnetic motor counters the rotation of the rod member.

14. The damping-force generating system according to claim 13, wherein each of the first electromagnetic motor and the second electromagnetic motor is a rotation motor and the rod member functions as a motor shaft of the first electromagnetic motor and as a motor shaft of the second electromagnetic motor.

15. The damping-force generating system according to claim 14, wherein a portion of the rod member functioning as the motor shaft of the second electromagnetic motor has a smaller diameter than a portion of the rod member functioning as the motor shaft of the first electromagnetic motor.

16. A damping-force generating system which constitutes a part of a suspension system for a vehicle and which generates a damping force with respect to a stroke motion in which a wheel and a body of the vehicle move toward and away from each other, the damping-force generating system comprising:

a damping-force generating device which has an electromagnetic motor that operates depending upon the stroke motion and which generates the damping force that depends on a generation force generated by the electromagnetic motor;

a variable resistor device which is disposed between the electromagnetic motor and a power source thereof and which is controlled such that a resistance value is variable; and a resistor-device controlling device which controls the variable resistor device and which includes a resistance-value-increase controlling portion configured to perform a control in which the resistance value of the variable resistor device when a stroke speed which is a speed of the stroke motion is high is made large.

17. The damping-force generating system according to claim 16, wherein the resistor-value-increase controlling portion is configured to perform a control in which the resistance value of the variable resistor device is increased when the stroke speed exceeds a preset speed.

18. The damping-force generating system according to claim 17, wherein the preset speed is determined on the basis of the stroke speed at which an electromotive force generated in the electromagnetic motor becomes equal to a power source voltage.

19. A damping-force generating system which constitutes a part of a suspension system for a vehicle and which generates a damping force with respect to a stroke motion in which a wheel and a body of the vehicle move toward and away from each other, the damping-force generating system comprising:

a damping-force generating device which has an electromagnetic motor that operates depending upon the stroke motion, which generates the damping force that depends on a generation force generated by the electromagnetic motor, and which is configured to perform an active stroke motion by driving the electromagnetic motor, the active stroke motion being the stroke motion by a drive force of the motor; and a road-surface-unevenness detecting device configured to detect an uneven condition of a road surface which the wheel passes and an active-motion controlling device which is configured to control the damping-force generating device to perform the active stroke motion on the basis of the uneven condition of the road surface detected by the road-surface-unevenness detecting device.

20. The damping-force generating system according to claim 19, wherein the active-motion controlling device includes a concavity-responsive controlling portion which is configured to control the damping-force generating device to perform, on the basis of a concavity detected by the road-surface-unevenness detecting device, the active stroke motion for permitting the wheel and the body of the vehicle to move toward each other, before the wheel passes the concavity.

21. The damping-force generating system according to claim 19, wherein the active-motion controlling device includes a convexity-responsive controlling portion which is configured to control the damping-force generating device to perform, on the basis of a convexity detected by the road-surface-unevenness detecting device, the active stroke motion for permitting the wheel and the body of the vehicle to move away from each other, before the wheel passes the convexity.

22. The damping-force generating system according to claim 19, wherein the active-motion controlling device includes an unevenness-following controlling portion which is configured to control the damping-force generating device to perform the active stroke motion following the uneven condition of the road surface detected by the road-surface-unevenness detecting device.

* * * * *